United States Patent
Ge et al.

(10) Patent No.: US 12,244,382 B2
(45) Date of Patent: Mar. 4, 2025

(54) CHANNEL STATE INFORMATION FEEDBACK METHOD AND COMMUNICATIONS APPARATUS

(71) Applicant: Huawei Technologies Co., Ltd., Shenzhen (CN)

(72) Inventors: Shibin Ge, Shanghai (CN); Huangping Jin, Shanghai (CN); Xiaohan Wang, Shanghai (CN); Yiling Yuan, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 382 days.

(21) Appl. No.: 17/887,209

(22) Filed: Aug. 12, 2022

(65) Prior Publication Data

US 2022/0416866 A1    Dec. 29, 2022

Related U.S. Application Data

(63) Continuation of application No. PCT/CN2020/075436, filed on Feb. 14, 2020.

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01)

(58) Field of Classification Search
None
See application file for complete search history.

(56) References Cited

U.S. PATENT DOCUMENTS 10,164,747 B2 * 12/2018 Onggosanusi ....... H04B 7/0478
2010/0322351 A1 * 12/2010 Tang ................. H04L 25/03343
                                                               455/67.11

(Continued)

FOREIGN PATENT DOCUMENTS

CN    102237984 A    11/2011
CN    108631847 A    10/2018

(Continued)

OTHER PUBLICATIONS

Huawei et al., "Rel-17 work scope on NR MIMO and sub-3GHz FDD enhancements" 3GPP TSG RAN Meeting #85, Newport Beach, USA, RP-191762, Total 12 pages, 3rd Generation Partnership Project, Valbonne, France (Sep. 16-20, 2019).

(Continued)

*Primary Examiner* — Otis L Thompson, Jr.
(74) *Attorney, Agent, or Firm* — Leydig, Voit & Mayer, Ltd.

(57) ABSTRACT

A channel state information feedback method includes: a terminal receives first indication information from a network device, and the terminal sends channel state information to the network device. The first indication information is used to indicate a type of a right multiplication matrix in a first codebook, and the first codebook satisfies a formula (I). W is the first codebook, $W_1$ is a port selection matrix, (II) is a linear superposition coefficient matrix, $W_f$ is the right multiplication matrix, and (III) is a conjugate transpose of $W_f$, and is used by the terminal to determine the channel state information based on the first codebook. According to the method, when there are a plurality of codebooks, the codebook used by the terminal to obtain the CSI can be clearly indicated.

22 Claims, 6 Drawing Sheets

(56) References Cited

U.S. PATENT DOCUMENTS

| | | | |
|---|---|---|---|
| 2011/0268207 A1* | 11/2011 | Choi | H04B 7/0639 375/267 |
| 2012/0052901 A1* | 3/2012 | Zhu | H04L 1/0031 455/517 |
| 2012/0163236 A1 | 6/2012 | Kim et al. | |
| 2013/0064129 A1* | 3/2013 | Koivisto | H04B 7/065 370/252 |
| 2013/0272439 A1* | 10/2013 | Zhang | H04B 7/0634 375/267 |
| 2014/0362939 A1* | 12/2014 | Kuo | H04B 7/0632 375/267 |
| 2016/0380734 A1* | 12/2016 | Wang | H04L 5/0048 370/329 |
| 2018/0145737 A1 | 5/2018 | Rahman et al. | |
| 2019/0103904 A1* | 4/2019 | Song | H04B 7/0417 |
| 2019/0229786 A1* | 7/2019 | Huang | H04B 7/06 |
| 2020/0322028 A1* | 10/2020 | Tosato | H04B 7/0639 |
| 2022/0361015 A1* | 11/2022 | Sun | H04L 5/0094 |

FOREIGN PATENT DOCUMENTS

| | | |
|---|---|---|
| CN | 108809374 A | 11/2018 |
| CN | 110419175 A | 11/2019 |
| CN | 110768700 A | 2/2020 |
| JP | 2018511271 A | 4/2018 |

OTHER PUBLICATIONS

Huawei et al., "Discussion on MU-CSI enhancements," 3GPP TSG RAN WG1 Meeting #98bis, Chongqing, China, R1-1910072, Total 6 pages, 3rd Generation Partnership Project, Valbonne, France (Oct. 14-20, 2019).

"3rd Generation Partnership Project; Technical Specification Group Radio Access Network; NR; Radio Resource Control (RRC) protocol specification (Release 15)," 3GPP TS 38.331 V15.8.0, Total 532 pages, 3rd Generation Partnership Project, Valbonne, France (Dec. 2019).

"Discussion on CSI enhancements," 3GPP TSG RAN WG1 Meeting #99, Reno, USA, R1-1911901, Total 2 pages, 3rd Generation Partnership Project, Valbonne, France (Nov. 18-22, 2019).

"3rd Generation Partnership Project; Technical Specification Group Radio Access Network; Evolved Universal Terrestrial Radio Access (E-UTRA); Physical layer procedures (Release 12)," 3GPP TS 36.213 V12.13.0, Total 19 pages, 3rd Generation Partnership Project, Valbonne, France (Sep. 2018).

"3rd Generation Partnership Project; Technical Specification Group Radio Access Network; Evolved Universal Terrestrial Radio Access (E-UTRA); Physical layer procedures (Release 13)," 3GPP TS 36.213 V13.16.0, Total 44 pages, 3rd Generation Partnership Project, Valbonne, France (Mar. 2020).

"3rd Generation Partnership Project; Technical Specification Group Radio Access Network; Evolved Universal Terrestrial Radio Access (E-UTRA); Physical layer procedures (Release 14)," 3GPP TS 36.213 V14.17.0, Total 66 pages, 3rd Generation Partnership Project, Valbonne, France (Jun. 2021).

"3rd Generation Partnership Project; Technical Specification Group Radio Access Network; Evolved Universal Terrestrial Radio Access (E-UTRA); Physical layer procedures (Release 15)," 3GPP TS 36.213 V15.16.0, Total 64 pages, 3rd Generation Partnership Project, Valbonne, France (Sep. 2022).

"3rd Generation Partnership Project; Technical Specification Group Radio Access Network; NR; Physical channels and modulation (Release 16)," 3GPP TS 38.211 V16.3.0, pp. 1-24, 3rd Generation Partnership Project, Valbonne, France (Sep. 2020).

"3rd Generation Partnership Project; Technical Specification Group Radio Access Network; NR; Physical layer procedures for data (Release 15)," 3GPP TS 38.214 V15.16.0, pp. 1-77, 3rd Generation Partnership Project, Valbonne, France (Mar. 2022).

NTT Docomo, "Type II CSI Enhancement for MU-MIMO Support [online]," 3GPP TSG RAN WG1 #98bis, Chongqing, China, R1-1911183, Total 9 pages, 3rd Generation Partnership Project, Valbonne, France (Oct. 14-18, 2019).

Samsung, "WID proposal for Rel. 17 enhancements on MIMO for NR [online]," 3GPP TSG RAN Meeting #86, Sitges, Spain, RP-192436, Total 5 pages, 3rd Generation Partnership Project, Valbonne, France (Dec. 9-12, 2019).

* cited by examiner

CHANNEL STATE INFORMATION FEEDBACK METHOD AND COMMUNICATIONS APPARATUS

CROSS-REFERENCE TO RELATED APPLICATIONS

This application is a continuation of International Application No. PCT/CN2020/075436, filed on Feb. 14, 2020. The disclosures of the aforementioned application is hereby incorporated by reference in its entirety.

TECHNICAL FIELD

This application relates to the field of mobile communications technologies, and in particular, to a channel state information feedback method and a communications apparatus.

BACKGROUND

A multiple-input multiple-output (MIMO) technology is a core technology of a long term evolution (LTE) system and a fifth generation (5th generation, 5G) new radio (NR) system. With the MIMO technology, when sending data to a terminal, a base station needs to perform signal precoding based on downlink channel state information (CSI).

For a frequency division duplex (Frequency Division Duplexing, FDD) system, different frequency bands are used for an uplink and a downlink. Therefore, downlink channel state information cannot be obtained by using uplink channel state information, and a downlink precoding matrix cannot be obtained. In an existing wireless communications system, an optimal downlink precoding matrix is generally obtained in a manner of feeding back a precoding matrix or a precoding matrix index (PMI) by the terminal.

The terminal feeds back the precoding matrix based on a codebook. The codebook has a significant performance advantage by linearly combining a plurality of orthogonal wave beams. Because channels are correlated in frequency domain, during channel feedback, the terminal may compress to-be-fed-back channel information by using the frequency-domain correlation, to reduce feedback overheads. Correspondingly, a CSI obtaining solution based on dual-domain compression is proposed. A codebook structure corresponding to the solution is $W=W_1\tilde{W}_2W_f^H$. W1 is a spatial-domain basis vector matrix consisting of one or more selected spatial-domain beam basis vectors, and may be a rotated discrete Fourier transform (DFT) basis matrix or a port selection matrix. $W_f$ is a frequency-domain basis vector matrix consisting of one or more selected frequency-domain basis vectors. The selected frequency-domain basis vector may be selected from a predefined DFT basis matrix or rotated DFT basis matrix. $\tilde{W}_2$ is a linear superposition coefficient matrix, and may be considered as a weighted combination coefficient of a spatial-frequency vector pair.

Although uplink and downlink channels of the FDD system are not completely reciprocal, the uplink and downlink physical channels of the FDD system are partially reciprocal, for example, the uplink and downlink physical channels are reciprocal in multipath angle and delay. Based on this, the base station may estimate a part of information, that is, multipath angle and delay information, by using uplink channel information. Then, the base station loads an obtained angle and delay onto a downlink pilot, and notifies the terminal to perform measurement and feed back supplementary information required by the base station. Finally, the base station reconstructs a downlink channel or performs precoding based on the information that is obtained through uplink pilot measurement and the supplementary information that is fed back by the terminal. Correspondingly, a new codebook structure needs to be provided to support the terminal in feeding back CSI based on the angle and delay reciprocity of the uplink and downlink physical channels. In this case, how to determine the codebook structure is a problem that needs to be resolved.

SUMMARY

This application provides a channel state information feedback method and a communications apparatus, to resolve how to determine a codebook structure corresponding to CSI feedback based on angle and delay reciprocity of uplink and downlink physical channels, thereby reducing CSI feedback overheads.

According to a first aspect, an embodiment of this application provides a channel state information feedback method. The method may be performed by a first communications apparatus. The first communications apparatus may be a communications device or a communications apparatus that can support a function required by the communications device to implement the method, for example, a chip system. The following uses an example in which the communications device is a terminal for description. The method includes the following step.

The terminal receives first indication information from a network device, and the terminal sends channel state information to the network device. The first indication information is used to indicate a type of a right multiplication matrix in a first codebook, and the first codebook satisfies a formula $W=W_1\tilde{W}_2W_f^H$. W is the first codebook, $W_1$ is a port selection matrix, $\tilde{W}_2$ is a linear superposition coefficient matrix, $W_f$ is the right multiplication matrix, and $W_f^H$ is a conjugate transpose of $W_f$, and is used by the terminal to determine the channel state information based on the first codebook.

In this embodiment of this application, the first codebook is a codebook that may be used to obtain CSI based on angle and delay reciprocity of an uplink channel and a downlink channel, and is a codebook different from a codebook in a conventional technology. For better compatibility with the conventional technology, in this embodiment of this application, improvement may be performed based on a current dual-domain compressed codebook $W=W_1\tilde{W}_2W_f^H$, for example, $W_f$ is modified, to obtain the first codebook. The network device may indicate the type of $W_f$ by using the first indication information, to indicate the terminal whether to obtain the CSI by using the first codebook or the codebook in the conventional technology. It can be learned that, according to the method provided in this embodiment of this application, when there are a plurality of codebooks, the codebook used by the terminal to obtain the CSI may be explicitly indicated. In addition, the terminal may feed back the CSI based on the angle and delay reciprocity of the uplink channel and the downlink channel, thereby reducing overheads.

Different first codebooks correspond to different $W_f$. Therefore, from this perspective, $W_f$ may be indirectly indicated by using the first codebook. That is, the first indication information indicates the first codebook. In other words, the method may alternatively include the following step.

The terminal receives first indication information from a network device. The first indication information is used to indicate a first codebook, and the first codebook is used by the terminal to determine channel state information.

The terminal sends the channel state information to the network device.

In a specific implementation, whether the first indication information indicates the first codebook or indicates $W_f$ to indicate the solution of obtaining the CSI based on the angle and delay reciprocity of the uplink channel and the downlink channel is not limited in this embodiment of this application.

According to a second aspect, an embodiment of this application provides a channel state information feedback method. The method may be performed by a second communications apparatus. The second communications apparatus may be a communications device or a communications apparatus that can support a function required by the communications device to implement the method, for example, a chip system. The following uses an example in which the communications device is a network device for description. The method includes the following step.

The network device receives channel state information from a terminal. The channel state information includes first indication information.

The network device determines a precoding matrix based on the first indication information and a first codebook. The first codebook W satisfies a formula $W=W_1\tilde{W}_2 W_f^H$. $W_1$ is a port selection matrix, $\tilde{W}_2$ is a linear superposition coefficient matrix, the first indication information is used to indicate a type of $W_f$, and $W_f^H$ is a conjugate transpose of $W_f$.

Similarly, $W_f$ varies with different first codebooks. Therefore, it may be considered that the method may alternatively include the following step.

The network device receives channel state information from a terminal. The channel state information includes first indication information, and the first indication information is used to indicate a first codebook.

The network device determines a precoding matrix based on the first codebook.

It should be understood that a technical effect brought by the second aspect is the same as the technical effect of the first aspect, and details are not described herein again.

In embodiments of the first aspect and the second aspect, the first indication information may be carried in existing signaling. For example, the first indication information is carried in a CSI reporting band CSI-ReportingBand field of radio resource control (RRC) signaling. For example, a value of the CSI-ReportingBand field is 0, indicating the type of $W_f$. Alternatively, it may be considered that a value of the CSI-ReportingBand field is 0, indicating that the terminal obtains the CSI based on the angle and delay reciprocity of the uplink channel and the downlink channel. This facilitates compatibility with existing RRC signaling.

In embodiments of the first aspect and the second aspect, $W_f$ includes but is not limited to the following several designs.

Design 1: $W_f$ is a port selection matrix. That is, the first indication information is used to indicate that the type of $W_f$ is a port selection matrix.

Design 2: $W_f$ is one or a plurality of specific column vectors. That is, the first indication information is used to indicate that the type of $W_f$ is one or a plurality of specific column vectors. For example, $W_f$ is a column vector in which all elements are 1, or $W_f$ includes a column vector in which all elements are 1. In this design solution, a channel state information reference signal (CSI-RS) port group does not need to be distinguished, thereby reducing complexity.

Design 3: $W_f$ is a DFT matrix, and includes a column vector in which all elements are 1. That is, the first indication information is used to indicate that the type of $W_f$ is a DFT matrix. Based on this design solution, the network side further needs to indicate, to the terminal, a column vector that needs to be used, for example, the column vector in which all elements are 1 in the DFT matrix. In a possible implementation, the first indication information may further indicate the column vector in which all elements are 1. Alternatively, the network device sends second indication information to the terminal, the terminal receives the second indication information, and the second indication information indicates the column vector in which all elements are 1 in the DFT matrix.

Specifically, $W_1$ in the first codebook is used to select one or a plurality of channel state information reference signal (CSI-RS) port groups, and $W_f$ is used to select one or more CSI-RS ports in the CSI-RS port group or the plurality of CSI-RS port groups.

It should be understood that $W_1$ is used to select a CSI-RS port group, and one or a plurality of CSI-RS port groups may be selected. If $W_1$ selects the CSI-RS port group, $W_f$ selects one or more CSI-RS ports in the CSI-RS port group. If $W_1$ selects the plurality of CSI-RS port groups, $W_f$ may select different or same ports for different CSI-RS port groups. For example, $W_f$ may indicate a sequence number of a CSI-RS port, to indicate to select CSI-RS ports corresponding to the sequence number in all CSI-RS port groups, that is, CSI-RS ports selected in all CSI-RS port groups are the same.

In embodiments of the first aspect and the second aspect, $W_f$ is a port selection matrix, a length of a column vector of $W_f$ may be $M_{Group}$, a length of a column vector of $W_1$ may be $2\tilde{X}_{Group}$, $M_{Group}*\tilde{X}_{Group}=X/2$, X is used to indicate a quantity of CSI-RS ports, $M_{Group}$ is an integer greater than or equal to 1, and $\tilde{X}_{Group}$ is an integer greater than or equal to 1.

In this design, $M_{Group}$, $\tilde{X}_{Group}$, and X may be agreed in a system or a protocol, or may be indicated by the network side to the terminal. For example, the network device may send third indication information to the terminal, the terminal receives the third indication information, and the third indication information may be used to indicate one or more of $\tilde{X}_{Group}$, $\tilde{X}_{Group}$, and X.

In embodiments of the first aspect and the second aspect, $W_f$ is one or a plurality of specific column vectors, a length of a column vector of $W_f$ may be $N_{RB}^0$, a length of a column vector of $W_1$ may be X, X is used to indicate a quantity of CSI-RS ports, and $N_{RB}^0$ is an integer greater than or equal to 1.

For example, $N_{RB}^0$ is related to a quantity of resource blocks (RBs) or a quantity of subbands of a CSI-RS transmission bandwidth. For example, $N_{RB}^0$ may be equal to the quantity of RBs or the quantity of subbands of the CSI-RS transmission bandwidth. This is relatively simple.

In embodiments of the first aspect and the second aspect, the terminal may feed back $W_1$ and $\tilde{W}_2$ to the network side. For example, the channel state information sent by the terminal to the network device may include feedback information, and the feedback information may be used to indicate $W_1$ and $\tilde{W}_2$. Compared with a conventional technology in which the terminal needs to feed back $W_1$, $\tilde{W}_2$, and $W_f$ to the network side, this reduces overheads.

For linear superposition coefficients corresponding to different selected receive antennas, the terminal may construct $\tilde{W}_2$ in different manners. For example, the terminal selects X linear superposition coefficients corresponding to all ports, that is, X ports, and the terminal may construct $\tilde{W}_2$ of $2\tilde{X}_{Group}*M_{Group}$ in ascending order (or descending order) of CSI-RS port numbers based on a rule of row first and column second (or column first and row second). It should be understood that one receive antenna corresponds to one $\tilde{W}_2$. Therefore, the feedback information may include $N_{Rx}$ $\tilde{W}_2$. $N_{Rx}$ is a quantity of receive antennas of the terminal. For another example, the terminal may construct a matrix of $X*N_{Rx}$ for the X linear superposition coefficients corresponding to different receive antennas, and perform singular value decomposition (SVD) decomposition on the matrix. The terminal selects a linear superposition coefficient based on a value of a rank corresponding to a precoding matrix to be calculated, and constructs $\tilde{W}_2$ of $2\tilde{X}_{Group}*M_{Group}$ in a sequence from head to tail (or from tail to head) based on a rule of row first and column second (or column first and row second). Correspondingly, the feedback information may include R $\tilde{W}_2$. R is the value of the rank corresponding to the precoding matrix.

In a specific application scenario, in different polarization directions, quantities of ports selected by the terminal may be the same or different, and sequence numbers of the ports selected by the terminal may be the same or different. For example, the quantities of the ports selected by the terminals may be the same, and the sequence numbers of the selected ports are also the same. In this way, once a port in one polarization direction is determined, a port in another polarization direction is also determined. This implementation is relatively simple. For another example, in different polarization directions, quantities of ports selected by the terminal may be the same, and sequence numbers of the selected ports are different. A selected port is not limited, so that a port can be selected relatively freely, thereby improving system performance. For still another example, in different polarization directions, quantities of ports selected by the terminal are different, and sequence numbers of the selected ports are also different, so that a port can be selected more freely, thereby further improving system performance.

For the foregoing design 2 and design 3, in different application scenarios, embodiments of this application provide several possible designs of W1, to obtain the CSI based on the angle and delay reciprocity of the uplink channel and the downlink channel.

For example, in different polarization directions, quantities of ports selected by the terminal are the same, and sequence numbers of the selected ports are the same. $W_1$ satisfies the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{ where}$$

$$E_{\frac{X}{2} \times \tilde{L}} = \begin{bmatrix} e_{\text{mod}\left(m_1, \frac{X}{2}\right)}^{\left(\frac{X}{2}\right)} & e_{\text{mod}\left(m_2, \frac{X}{2}\right)}^{\left(\frac{X}{2}\right)} & \cdots & e_{\text{mod}\left(m_{\tilde{L}-1}, \frac{X}{2}\right)}^{\left(\frac{X}{2}\right)} \end{bmatrix}.$$

X is the quantity of CSI-RS ports, $\tilde{L}$ is a quantity of CSI-RS ports selected in one polarization direction, $$E_{\frac{X}{2} \times \tilde{L}}$$

is a matrix consisting of $$e_{\text{mod}\left(i, \frac{X}{2}\right)}^{\left(\frac{X}{2}\right)}, \quad e_{\text{mod}\left(i, \frac{X}{2}\right)}^{\left(\frac{X}{2}\right)}$$

is a vector whose length is X/2, a $$\left(\text{mod}\left(i, \frac{X}{2}\right)\right)^{th}$$

element in elements included in the vector is 1 and other elements are 0, i=$m_1$, $m_2$, ..., $m_{\tilde{L}-1}$ and i is an integer greater than or equal to 0.

It should be understood that, X is a quantity, sent by the base station, of CSI-RS ports, $\tilde{L}$ is a quantity of CSI-RS ports selected by the terminal in one polarization direction, and the $$\left(\text{mod}\left(i, \frac{X}{2}\right)\right)^{th}$$

element in $$e_{\text{mod}\left(i, \frac{X}{2}\right)}^{\left(\frac{X}{2}\right)}$$

is 1, and may indicate to select a corresponding CSI-RS port.

In a specific application, CSI-RS ports selected by the terminal may be discontinuous or continuous. It should be understood that, as a variation of W1, $W_1$ satisfies the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{ where}$$

$$E_{\frac{X}{2} \times \tilde{L}} = \begin{bmatrix} e_{\text{mod}\left(m, \frac{X}{2}\right)}^{\left(\frac{X}{2}\right)} & e_{\text{mod}\left(m+1, \frac{X}{2}\right)}^{\left(\frac{X}{2}\right)} & \cdots & e_{\text{mod}\left(m+\tilde{L}-1, \frac{X}{2}\right)}^{\left(\frac{X}{2}\right)} \end{bmatrix},$$

which indicates that the CSI-RS ports selected by the terminal may be continuous.

For example, in different polarization directions, quantities of ports selected by the terminal are the same, and sequence numbers of the selected ports are different. $W_1$ satisfies the following formula:

$$W_1 = \begin{bmatrix} E_{\frac{X}{2} \times \tilde{L}} & 0 \\ 0 & \overline{E}_{\frac{X}{2} \times \tilde{L}} \end{bmatrix}, \text{where}$$

$$E_{\frac{X}{2} \times \tilde{L}} = \begin{bmatrix} e^{\left(\frac{X}{2}\right)}_{\mod\left(m_1, \frac{X}{2}\right)} & e^{\left(\frac{X}{2}\right)}_{\mod\left(m_2, \frac{X}{2}\right)} & \cdots & e^{\left(\frac{X}{2}\right)}_{\mod\left(m_{\tilde{L}-1}, \frac{X}{2}\right)} \end{bmatrix}, \text{and}$$

$$\overline{E}_{\frac{X}{2} \times \tilde{L}} = \begin{bmatrix} e^{\left(\frac{X}{2}\right)}_{\mod\left(n_1, \frac{X}{2}\right)} & e^{\left(\frac{X}{2}\right)}_{\mod\left(n_2, \frac{X}{2}\right)} & \cdots & e^{\left(\frac{X}{2}\right)}_{\mod\left(n_{\tilde{L}-1}, \frac{X}{2}\right)} \end{bmatrix},$$

where X is the quantity of CSI-RS ports, and $\tilde{L}$ is a quantity of CSI-RS ports selected in one polarization direction;

$E_{\frac{X}{2} \times \tilde{L}}$ is a matrix consisting of $$e^{\left(\frac{X}{2}\right)}_{\mod\left(i, \frac{X}{2}\right)}, \quad e^{\left(\frac{X}{2}\right)}_{\mod\left(i, \frac{X}{2}\right)},$$

is a vector whose length is X/2, a $$\left(\mod\left(i, \frac{X}{2}\right)\right)^{th}$$

element in elements included in the vector is 1 and other elements are 0, i=$m_1$, $m_2$, . . . , $m_{\tilde{L}-1}$, and i is an integer greater than or equal to 0; and $\overline{E}_{\frac{X}{2} \times \tilde{L}}$ is a matrix consisting of $$e^{\left(\frac{X}{2}\right)}_{\mod\left(i, \frac{X}{2}\right)}, \quad e^{\left(\frac{X}{2}\right)}_{\mod\left(i, \frac{X}{2}\right)},$$

is a vector whose length is X/2, a $$\left(\mod\left(i, \frac{X}{2}\right)\right)^{th}$$

element in elements included in the vector is 1 and other elements are 0, i=$n_1$, $n_2$, . . . , $n_{\tilde{L}-1}$ and i is an integer greater than or equal to 0.

Similarly, CSI-RS ports selected by the terminal may be discontinuous or continuous. It should be understood that, as a variation of W1, $W_1$ satisfies the following formula:

$$W_1 = \begin{bmatrix} E_{\frac{X}{2} \times \tilde{L}} & 0 \\ 0 & \overline{E}_{\frac{X}{2} \times \tilde{L}} \end{bmatrix}, \text{where}$$

$$E_{\frac{X}{2} \times \tilde{L}} = \begin{bmatrix} e^{\left(\frac{X}{2}\right)}_{\mod\left(m, \frac{X}{2}\right)} & e^{\left(\frac{X}{2}\right)}_{\mod\left(m+1, \frac{X}{2}\right)} & \cdots & e^{\left(\frac{X}{2}\right)}_{\mod\left(m+\tilde{L}-1, \frac{X}{2}\right)} \end{bmatrix}, \text{and}$$

$$\overline{E}_{\frac{X}{2} \times \tilde{L}} = \begin{bmatrix} e^{\left(\frac{X}{2}\right)}_{\mod\left(n, \frac{X}{2}\right)} & e^{\left(\frac{X}{2}\right)}_{\mod\left(n+1, \frac{X}{2}\right)} & \cdots & e^{\left(\frac{X}{2}\right)}_{\mod\left(n+\tilde{L}-1, \frac{X}{2}\right)} \end{bmatrix}.$$

For another example, in different polarization directions, quantities of ports selected by the terminal are different, and sequence numbers of the selected ports are different. Dimensions of $W_1$ are X*L, L≤X, X is used to indicate the quantity of CSI-RS ports, and L is a quantity of selected CSI-RS ports.

In a possible implementation, $W_1$ may be implemented based on a matrix. For example, W1 is a subset of $F_{X \times X}$, and $F_{X \times X}$ may be predefined in a system or agreed in a protocol. For example, dimensions of $F_{X \times X}$ are X*X, that is, $W_1$ selects L column vectors from X column vectors in $F_{X \times X}$, where L≤X. For example, $$F_{X \times X} = \left[ e^{(X)}_0 \ e^{\left(\frac{X}{2}\right)}_1 \ \ldots \ e^{\left(\frac{X}{2}\right)}_{(X-1)} \right].$$

$e^{(X)}_i$ is a vector whose length is X, an $i^{th}$ element in $F_{X \times X}$ is 1 and all remaining elements are 0, and i=0, 1, ..., X−1.

Similarly, CSI-RS ports selected by the terminal may be discontinuous or continuous. It should be understood that, $W_1$ may satisfy the following formula:

$W_1 = [e_{mod(m,X)}{}^{(X)}, \ldots, e_{mod(m+(\tilde{L}-1),X)}{}^{(X)}]$, which indicates that the CSI-RS ports selected by the terminal may be continuous.

According to a third aspect, an embodiment of this application provides a channel state information feedback method. The method may be performed by a first communications apparatus. The first communications apparatus may be a communications device or a communications apparatus that can support a function required by the communications device to implement the method, for example, a chip system. The following uses an example in which the communications device is a terminal for description. The method includes the following step.

The terminal receives first indication information from a network device, and sends channel state information to the network device. The first indication information is used to indicate a port selection matrix, the port selection matrix is used by the terminal to determine the channel state information based on a second codebook, and the second codebook satisfies a formula $W = W_1 \tilde{W}_2$. W is the second codebook, $W_1$ is the port selection matrix, and $\tilde{W}_2$ is a linear superposition coefficient matrix.

According to a fourth aspect, an embodiment of this application provides a channel state information feedback method. The method may be performed by a second communications apparatus. The second communications apparatus may be a communications device or a communications apparatus that can support a function required by the communications device to implement the method, for example, a chip system. The following uses an example in which the communications device is a network device for description. The method includes the following step.

The network device receives channel state information from a terminal. The channel state information includes first indication information, the first indication information is used to indicate a port selection matrix, the port selection matrix is used by the terminal to determine the channel state information based on a second codebook, and the second codebook satisfies a formula $W = W_1 \tilde{W}_2$. W is the second codebook, $W_1$ is the port selection matrix, and $\tilde{W}_2$ is a linear superposition coefficient matrix.

The network device determines a precoding matrix based on the first indication information and the second codebook.

In this embodiment of this application, the second codebook is a codebook that may be used to obtain CSI based on angle and delay reciprocity of an uplink channel and a downlink channel, and is a codebook different from a codebook in a conventional technology. The network device notifies, by using the first indication information, the terminal that a codebook to be used is the second codebook, that is, indicates a CSI obtaining solution based on the angle and delay reciprocity between the uplink channel and the downlink channel, so that the terminal feeds back the CSI based on the second codebook, thereby reducing overheads.

In embodiments of the third aspect and the fourth aspect, dimensions of $W_1$ are X*L, L≤X, X is used to indicate the quantity of CSI-RS ports, and $\tilde{L}$ is a quantity of selected CSI-RS ports.

In a specific application scenario, in different polarization directions, quantities of ports selected by the terminal may be the same, and sequence numbers of the selected ports are also the same.

Alternatively, in different polarization directions, quantities of ports selected by the terminal may be the same, and sequence numbers of the selected ports are different.

Alternatively, in different polarization directions, quantities of ports selected by the terminal are different, and sequence numbers of the selected ports are also different.

Based on different application scenarios, embodiments of this application provide the following several possible designs of W1.

For example, in different polarization directions, quantities of ports selected by the terminal are the same, and sequence numbers of the selected ports are the same. $W_1$ satisfies the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{ where}$$

$$E_{\frac{X}{2} \times \tilde{L}} = \begin{bmatrix} e^{\left(\frac{X}{2}\right)}_{\mod\left(m_1, \frac{X}{2}\right)} & e^{\left(\frac{X}{2}\right)}_{\mod\left(m_2, \frac{X}{2}\right)} & \ldots & e^{\left(\frac{X}{2}\right)}_{\mod\left(m_{\tilde{L}-1}, \frac{X}{2}\right)} \end{bmatrix}.$$

X is the quantity of CSI-RS ports, $\tilde{L}$ is a quantity of CSI-RS ports selected in one polarization direction, $$E_{\frac{X}{2} \times \tilde{L}}$$

is a matrix consisting of $$e^{\left(\frac{X}{2}\right)}_{\mod\left(i, \frac{X}{2}\right)}, e^{\left(\frac{X}{2}\right)}_{\mod\left(i, \frac{X}{2}\right)}$$

is a vector whose length is X/2, a $$(\mod(i, \frac{X}{2}))^{th}$$

element in elements included in the vector is 1 and other elements are 0, i=$m_1$, $m_2$, ..., $m_{\tilde{L}-1}$, and i is an integer greater than or equal to 0.

X is a quantity, sent by the base station, of CSI-RS ports, $\tilde{L}$ is a quantity of CSI-RS ports selected by the terminal in one polarization direction, and the $(\text{mod}(i, \frac{X}{2}))^{th}$ element in $e^{(\frac{X}{2})}_{mod(i,\frac{X}{2})}$ is 1, and may indicate to select a corresponding CSI-RS port.

Since the quantities of the ports are the same and the sequence numbers of the ports are the same, it may be considered that once a port in one polarization direction is selected, a port in another polarization direction is also selected. This implementation is relatively simple.

As a variation of W1, $W_1$ satisfies the following formula:

$$W_1 = \begin{bmatrix} E_{\frac{X}{2} \times L} & 0 \\ 0 & E_{\frac{X}{2} \times L} \end{bmatrix}, \text{ where}$$

$$E_{\frac{X}{2} \times L} = \left[ e^{(\frac{X}{2})}_{mod(m,\frac{X}{2})}, e^{(\frac{X}{2})}_{mod(m+1,\frac{X}{2})} \cdots e^{(\frac{X}{2})}_{mod(m+\tilde{L}-1,\frac{X}{2})} \right],$$

which indicates that the CSI-RS ports selected by the terminal may be continuous.

For example, in different polarization directions, quantities of ports selected by the terminal are the same, and sequence numbers of the selected ports are different. $W_1$ satisfies the following formula:

$$W_1 = \begin{bmatrix} E_{\frac{X}{2} \times L} & 0 \\ 0 & \overline{E}_{\frac{X}{2} \times L} \end{bmatrix}, \text{ where}$$

$$E_{\frac{X}{2} \times L} = \left[ e^{(\frac{X}{2})}_{mod(m_1,\frac{X}{2})}, e^{(\frac{X}{2})}_{mod(m_2,\frac{X}{2})} \cdots e^{(\frac{X}{2})}_{mod(m_{\tilde{L}-1},\frac{X}{2})} \right], \text{ and}$$

$$\overline{E}_{\frac{X}{2} \times L} = \left[ e^{(\frac{X}{2})}_{mod(n_1,\frac{X}{2})}, e^{(\frac{X}{2})}_{mod(n_2,\frac{X}{2})} \cdots e^{(\frac{X}{2})}_{mod(n_{\tilde{L}-1},\frac{X}{2})} \right],$$

where X is the quantity of CSI-RS ports, and $\tilde{L}$ is a quantity of CSI-RS ports selected in one polarization direction;

$E_{\frac{X}{2} \times L}$ is a matrix consisting of $e^{(\frac{X}{2})}_{mod(i,\frac{X}{2})}, e^{(\frac{X}{2})}_{mod(i,\frac{X}{2})}$ is a vector whose length is X/2, a $(\text{mod}(i, \frac{X}{2}))^{th}$ element in elements included in the vector is 1 and other elements are 0, i=$m_1$, $m_2$, ..., $m_{\tilde{L}-1}$, and i is an integer greater than or equal to 0; and $\overline{E}_{\frac{X}{2} \times L}$ is a matrix consisting of $e^{(\frac{X}{2})}_{mod(i,\frac{X}{2})}, e^{(\frac{X}{2})}_{mod(i,\frac{X}{2})}$ is a vector whose length is X/2, a $(\text{mod}(i, \frac{X}{2}))^{th}$ element in elements included in the vector is 1 and other elements are 0, i=$n_1$, $n_2$, ..., $n_{\tilde{L}-1}$, and i is an integer greater than or equal to 0.

As a variation of W1, $W_1$ satisfies the following formula:

$$W_1 = \begin{bmatrix} E_{\frac{X}{2} \times L} & 0 \\ 0 & \overline{E}_{\frac{X}{2} \times L} \end{bmatrix}, \text{ where}$$

$$E_{\frac{X}{2} \times L} = \left[ e^{(\frac{X}{2})}_{mod(m,\frac{X}{2})} e^{(\frac{X}{2})}_{mod(m+1,\frac{X}{2})} \cdots e^{(\frac{X}{2})}_{mod(m+\tilde{L}-1,\frac{X}{2})} \right], \text{ and}$$

$$\overline{E}_{\frac{X}{2} \times L} = \left[ e^{(\frac{X}{2})}_{mod(n,\frac{X}{2})} e^{(\frac{X}{2})}_{mod(n+1,\frac{X}{2})} \cdots e^{(\frac{X}{2})}_{mod(n+\tilde{L}-1,\frac{X}{2})} \right].$$

In a possible implementation, in different polarization directions, quantities of ports selected by the terminal are different, and sequence numbers of the selected ports are different. $W_1$ may be selected from a matrix. For example, W1 is a subset of $F_{X \times X}$, dimensions of $F_{X \times X}$ are X*X, and $F_{X \times X}=[e^{(X)}_0 \ e^{(X)}_1 \ \ldots \ e^{(X)}_{(X-1)}]$. For example, $e^{(X)}_i$ is a vector whose length is X, an $i^{th}$ element in $F_{X \times X}$ is 1 and all remaining elements are 0, and i=0, 1, ..., X–1.

As a variation of W1, $W_1$ satisfies the following formula:

$W_1=[e_{mod(m,X)}{}^{(X)}, \ldots, e_{mod(m+(\tilde{L}-1),X)}{}^{(X)}]$, which indicates that the CSI-RS ports selected by the terminal may be continuous.

For technical effects brought by the third aspect, the fourth aspect, the possible implementations of the third aspect, or the possible implementations of the fourth aspect, refer to the description of the technical effects of the first aspect or the possible implementations of the first aspect.

According to a fifth aspect, an embodiment of this application provides a communications apparatus, including a receiving unit and a sending unit.

The receiving unit is configured to receive first indication information from a network device. The first indication information is used to indicate a type of a right multiplication matrix in a first codebook, and the first codebook satisfies a formula $W=W=W_1 \tilde{W}_2 W_f^H$. W is the first codebook, $W_1$ is a port selection matrix, $\tilde{W}_2$ is a linear superposition coefficient matrix, $W_f$ is the right multiplication matrix, and $W_f^H$ is a conjugate transpose of $W_f$, and is used by a terminal to determine channel state information based on the first codebook.

The sending unit is configured to send the channel state information to the network device.

It may be understood that the communications apparatus may further include a processing unit. The processing unit is configured to generate the channel state information. The receiving unit and the sending unit may be included in a transceiver unit, and the transceiver unit implements functions of the receiving unit and the sending unit.

According to a sixth aspect, an embodiment of this application provides a communications apparatus, including a receiving unit and a processing unit.

The receiving unit is configured to receive channel state information from a terminal. The channel state information includes first indication information.

The processing unit is configured to determine a precoding matrix based on the first indication information and a first codebook. The first codebook satisfies a formula $W=W_1\tilde{W}_2 W_f^H$. W is the first codebook, $W_1$ is a port selection matrix, $\tilde{W}_2$ is a linear superposition coefficient matrix, the first indication information is used to indicate a type of $W_f$, and $W_f^H$ is a conjugate transpose of $W_f$.

It may be understood that the receiving unit may be included in a transceiver unit, and the transceiver unit implements a function of the receiving unit.

In embodiments of the fifth aspect and the sixth aspect, the first indication information may be carried in existing signaling. For example, the first indication information is carried in a CSI reporting band CSI-ReportingBand field of RRC signaling. For example, a value of the CSI-ReportingBand field is 0, used to indicate the codebook for the terminal to obtain the CSI based on angle and delay reciprocity of an uplink channel and a downlink channel, or the type of $W_f$. This facilitates compatibility with existing RRC signaling.

In embodiments of the first aspect and the second aspect, $W_f$ includes but is not limited to the following several designs.

Design 1: $W_f$ is a port selection matrix. That is, the first indication information is used to indicate that the type of $W_f$ is a port selection matrix.

Design 2: $W_f$ is one or a plurality of specific column vectors. That is, the first indication information is used to indicate that the type of $W_f$ is one or a plurality of specific column vectors. For example, $W_f$ is a column vector in which all elements are 1, or $W_f$ includes a column vector in which all elements are 1. In this design solution, a channel state information reference signal (CSI-RS) port group does not need to be distinguished, thereby reducing complexity.

Design 3: $W_f$ is a DFT matrix, and includes a column vector in which all elements are 1. That is, the first indication information is used to indicate that the type of $W_f$ is a DFT matrix. Based on this design solution, the network side further needs to indicate, to the terminal, a column vector that needs to be used, for example, the column vector in which all elements are 1 in the DFT matrix. In a possible implementation, the first indication information may further indicate the column vector in which all elements are 1. Alternatively, when the communications apparatus is the network device, the sending unit included in the communications apparatus sends second indication information to the terminal, the terminal receives the second indication information, and the second indication information indicates the column vector in which all elements are 1 in the DFT matrix. Alternatively, when the communications apparatus is the terminal, the receiving unit included in the communications apparatus receives second indication information from the network device, and the second indication information indicates the column vector in which all elements are 1 in the DFT matrix.

Specifically, $W_1$ in the first codebook is used to select one or a plurality of channel state information reference signal (CSI-RS) port groups, and $W_f$ is used to select one or more CSI-RS ports in the CSI-RS port group or the plurality of CSI-RS port groups.

It should be understood that $W_1$ is used to select a CSI-RS port group, and one or a plurality of CSI-RS port groups may be selected. If $W_1$ selects the CSI-RS port group, $W_f$ selects one or more CSI-RS ports in the CSI-RS port group. If $W_1$ selects the plurality of CSI-RS port groups, $W_f$ may select different or same ports for different CSI-RS port groups. For example, $W_f$ may indicate a sequence number of a CSI-RS port, to indicate to select CSI-RS ports corresponding to the sequence number in all CSI-RS port groups, that is, CSI-RS ports selected in all CSI-RS port groups are the same.

In embodiments of the fifth aspect and the sixth aspect, $W_f$ is a port selection matrix, a length of a column vector of $W_f$ may be $M_{Group}$, a length of a column vector of $W_1$ may be $2\tilde{X}_{Group}$, $M_{Group} * \tilde{X}_{Group} = X/2$, X is used to indicate a quantity of CSI-RS ports, $M_{Group}$ is an integer greater than or equal to 1, and $\tilde{X}_{Group}$ is an integer greater than or equal to 1.

In this design, $M_{Group}$, $\tilde{X}_{Group}$, and X may be agreed in a system or a protocol, or may be indicated by the network side to the terminal. For example, when the communications apparatus is the network device, the transceiver unit of the network device may send third indication information to the terminal, the transceiver unit of the terminal receives the third indication information, and the third indication information may be used to indicate one or more of $\tilde{X}_{Group}$, $\tilde{X}_{Group}$, and X.

In embodiments of the first aspect and the second aspect, $W_f$ is one or a plurality of specific column vectors, a length of a column vector of $W_f$ may be $NR_B^0$, a length of a column vector of $W_1$ may be X, X is used to indicate a quantity of CSI-RS ports, and $N_{RB}^0$ is an integer greater than or equal to 1.

For example, $N_{RB}^0$ is related to a quantity of resource blocks (RBs) or a quantity of subbands of a CSI-RS transmission bandwidth. For example, $N_{RB}^0$ may be equal to the quantity of RBs or the quantity of subbands of the CSI-RS transmission bandwidth. This is relatively simple.

In embodiments of the first aspect and the second aspect, the terminal may feed back $W_1$ and $\tilde{W}_2$ to the network side. For example, the channel state information sent by the terminal to the network device may include feedback information, and the feedback information may be used to indicate $W_1$ and $\tilde{W}_2$. Compared with a conventional technology in which the terminal needs to feed back $W_1$, $\tilde{W}_2$, and $W_f$ to the network side, this reduces overheads.

For linear superposition coefficients corresponding to different selected receive antennas, the terminal may construct $\tilde{W}_2$ in different manners. For example, the terminal selects X linear superposition coefficients corresponding to all ports, that is, X ports, and the terminal may construct $\tilde{W}_2$ of $2\tilde{X}_{Group} * M_{Group}$ in ascending order (or descending order) of CSI-RS port numbers based on a rule of row first and column second (or column first and row second). It should be understood that one receive antenna corresponds to one $\tilde{W}_2$. Therefore, the feedback information may include $N_{Rx}$ $\tilde{W}_2$. $N_{Rx}$ is a quantity of receive antennas of the terminal. For another example, the terminal may construct a matrix of $X*N_{Rx}$ for the X linear superposition coefficients corresponding to different receive antennas, and perform SVD decomposition on the matrix. The terminal selects a linear superposition coefficient based on a value of a rank corresponding to a precoding matrix to be calculated, and constructs $\tilde{W}_2$ of $2\tilde{X}_{Group} * M_{Group}$ in a sequence from head to tail (or from tail to head) based on a rule of row first and column second (or column first and row second). Correspondingly, the feedback information may include R $\tilde{W}_2$. R is the value of the rank corresponding to the precoding matrix.

In a specific application scenario, in different polarization directions, quantities of ports selected by the terminal may be the same or different, and sequence numbers of the ports selected by the terminal may be the same or different. For example, the quantities of the ports selected by the terminals may be the same, and the sequence numbers of the selected ports are also the same. In this way, once a port in one polarization direction is determined, a port in another polarization direction is also determined. This implementation is relatively simple. For another example, in different polarization directions, quantities of ports selected by the terminal may be the same, and sequence numbers of the selected ports are different. A selected port is not limited, so that a port can be selected relatively freely, thereby improving system performance. For still another example, in different polarization directions, quantities of ports selected by the terminal are different, and sequence numbers of the selected ports are also different, so that a port can be selected more freely, thereby further improving system performance.

For the foregoing design 2 and design 3, in different application scenarios, embodiments of this application provide several possible designs of W1, to obtain the CSI based on the angle and delay reciprocity of the uplink channel and the downlink channel.

For example, in different polarization directions, quantities of ports selected by the terminal are the same, and sequence numbers of the selected ports are the same. $W_1$ satisfies the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{where}$$

$$E_{\frac{X}{2} \times \tilde{L}} = \begin{bmatrix} e_{\mathrm{mod}\left(m_1, \frac{X}{2}\right)}^{\left(\frac{X}{2}\right)} & e_{\mathrm{mod}\left(m_2, \frac{X}{2}\right)}^{\left(\frac{X}{2}\right)} & \cdots & e_{\mathrm{mod}\left(m_{\tilde{L}-1}, \frac{X}{2}\right)}^{\left(\frac{X}{2}\right)} \end{bmatrix}.$$

X is the quantity of CSI-RS ports, $\tilde{L}$ is a quantity of CSI-RS ports selected in one polarization direction, $$e_{\mathrm{mod}\left(i, \frac{X}{2}\right)}^{\left(\frac{X}{2}\right)} \quad e_{\mathrm{mod}\left(i, \frac{X}{2}\right)}^{\left(\frac{X}{2}\right)},$$

is a matrix consisting of $$E_{\frac{X}{2} \times \tilde{L}}$$

is a vector whose length is X/2, a $$\left(\mathrm{mod}\left(i, \frac{X}{2}\right)\right)^{th}$$

element in elements included in the vector is 1 and other elements are 0, i=$m_1$, $m_2$, . . . , $m_{\tilde{L}-1}$ and i is an integer greater than or equal to 0.

It should be understood that, X is a quantity, sent by the base station, of CSI-RS ports, $\tilde{L}$ is a quantity of CSI-RS ports selected by the terminal in one polarization direction, and the $$\left(\mathrm{mod}\left(i, \frac{X}{2}\right)\right)^{th}$$

element in $$e^{\left(\frac{X}{2}\right)}_{\mathrm{mod}\left(i, \frac{X}{2}\right)}$$

is 1, and may indicate to select a corresponding CSI-RS port.

In a specific application, CSI-RS ports selected by the terminal may be discontinuous or continuous. It should be understood that, as a variation of W1, $W_1$ satisfies the following formula:

$$W_1 \begin{bmatrix} E_{\frac{X}{2} \times \tilde{L}} & 0 \\ 0 & E_{\frac{X}{2} \times \tilde{L}} \end{bmatrix}, \text{where}$$

$$E_{\frac{X}{2} \times \tilde{L}} =$$

$$\begin{bmatrix} e^{\left(\frac{X}{2}\right)}_{\mathrm{mod}\left(m, \frac{X}{2}\right)} & e^{\left(\frac{X}{2}\right)}_{\mathrm{mod}\left(m+1, \frac{X}{2}\right)} & \cdots & e^{\left(\frac{X}{2}\right)}_{\mathrm{mod}\left(m+\tilde{L}-1, \frac{X}{2}\right)} \end{bmatrix},$$

which indicates that the CSI-RS ports selected by the terminal may be continuous.

For example, in different polarization directions, quantities of ports selected by the terminal are the same, and sequence numbers of the selected ports are different. $W_1$ satisfies the following formula:

$$W_1 \begin{bmatrix} E_{\frac{X}{2} \times \tilde{L}} & 0 \\ 0 & \overline{E}_{\frac{X}{2} \times \tilde{L}} \end{bmatrix}, \text{where}$$

$$E_{\frac{X}{2} \times \tilde{L}} =$$

$$\begin{bmatrix} e^{\left(\frac{X}{2}\right)}_{\mathrm{mod}\left(m_1, \frac{X}{2}\right)} & e^{\left(\frac{X}{2}\right)}_{\mathrm{mod}\left(m_2, \frac{X}{2}\right)} & \cdots & e^{\left(\frac{X}{2}\right)}_{\mathrm{mod}\left(m_{\tilde{L}-1}, \frac{X}{2}\right)} \end{bmatrix}, \text{and}$$

$$\overline{E}_{\frac{X}{2} \times \tilde{L}} =$$

$$\begin{bmatrix} e^{\left(\frac{X}{2}\right)}_{\mathrm{mod}\left(n_1, \frac{X}{2}\right)} & e^{\left(\frac{X}{2}\right)}_{\mathrm{mod}\left(n_2, \frac{X}{2}\right)} & \cdots & e^{\left(\frac{X}{2}\right)}_{\mathrm{mod}\left(n_{\tilde{L}-1}, \frac{X}{2}\right)} \end{bmatrix},$$

where X is the quantity of CSI-RS ports, and $\tilde{L}$ is a quantity of CSI-RS ports selected in one polarization direction;

$$E_{\frac{X}{2} \times \tilde{L}}$$

is a matrix consisting of $$\begin{matrix} e^{\left(\frac{X}{2}\right)} & & e^{\left(\frac{X}{2}\right)} \\ \mod\left(i, \frac{X}{2}\right) & & \mod\left(i, \frac{X}{2}\right) \end{matrix},$$

is a vector whose length is X/2, a $$\left(\mod\left(i, \frac{X}{2}\right)\right)^{th}$$

element in elements included in the vector is 1 and other elements are 0, $i=m_1, m_2, \ldots, m_{L-1}$, and i is an integer greater than or equal to 0; and $$\overline{E}_{\frac{X}{2} \times L}$$

is a matrix consisting of $$\begin{matrix} e^{\left(\frac{X}{2}\right)} & & e^{\left(\frac{X}{2}\right)} \\ \mod\left(i, \frac{X}{2}\right) & & \mod\left(i, \frac{X}{2}\right) \end{matrix},$$

is a vector whose length is X/2, a $$\left(\mod\left(i, \frac{X}{2}\right)\right)^{th}$$

element in elements included in the vector is 1 and other elements are 0, $i=n_1, n_2, \ldots, n_{L-1}$, and i is an integer greater than or equal to 0.

Similarly, CSI-RS ports selected by the terminal may be discontinuous or continuous. It should be understood that, as a variation of W1, $W_1$ satisfies the following formula:

$$W_1 \begin{bmatrix} E_{\frac{X}{2} \times L} & 0 \\ 0 & \overline{E}_{\frac{X}{2} \times L} \end{bmatrix}, \text{where}$$

$$E_{\frac{X}{2} \times L} = \begin{bmatrix} e^{\left(\frac{X}{2}\right)} & e^{\left(\frac{X}{2}\right)} & \ldots & e^{\left(\frac{X}{2}\right)} \\ \mod & \mod & & \mod \\ \left(m, \frac{X}{2}\right) & \left(m+1, \frac{X}{2}\right) & & \left(m+\tilde{L}-1, \frac{X}{2}\right) \end{bmatrix}, \text{and}$$

$$\overline{E}_{\frac{X}{2} \times L} = \begin{bmatrix} e^{\left(\frac{X}{2}\right)} & e^{\left(\frac{X}{2}\right)} & \ldots & e^{\left(\frac{X}{2}\right)} \\ \mod & \mod & & \mod \\ \left(n, \frac{X}{2}\right) & \left(n+1, \frac{X}{2}\right) & & \left(n+\tilde{L}-1, \frac{X}{2}\right) \end{bmatrix}.$$

For another example, in different polarization directions, quantities of ports selected by the terminal are different, and sequence numbers of the selected ports are different. Dimensions of $W_1$ are X*L, L≤X, X is used to indicate the quantity of CSI-RS ports, and L is a quantity of selected CSI-RS ports.

In a possible implementation, $W_1$ may be implemented based on a matrix. For example, W1 is a subset of $F_{X \times X}$, and $F_{X \times X}$ may be predefined in a system or agreed in a protocol. For example, dimensions of $F_{X \times X}$ are X*X, that is, $W_1$ selects L column vectors from X column vectors in $F_{X \times X}$, where L≤X. For example, $F_{X \times X} = [e^{(X)}_0 \ e^{(X)}_1 \ \ldots \ e^{(X)}_{(X-1)}]$. $e^{(X)}_i$ is tor whose length is X, a vector an $i^{th}$ element in $F_{X \times X}$ is 1 and all remaining elements are 0, and $i=0, 1, \ldots, X-1$.

Similarly, CSI-RS ports selected by the terminal may be discontinuous or continuous. It should be understood that, $W_1$ may satisfy the following formula:

$W_1 = [e^{(X)}_{mod(m,X)}, \ldots, e^{(X)}_{mod(m+(\tilde{L}-1),X)}]$, which indicates that the CSI-RS ports selected by the terminal may be continuous.

For technical effects brought by the fifth aspect or the possible implementations of the fifth aspect, refer to the description of the technical effects of the first aspect or the possible implementations of the first aspect. For technical effects brought by the sixth aspect or the possible implementations of the sixth aspect, refer to the description of the technical effects of the second aspect or the possible implementations of the second aspect.

According to a seventh aspect, an embodiment of this application provides a communications apparatus, including a receiving unit and a sending unit.

The receiving unit is configured to receive first indication information from a network device. The first indication information is used to indicate a port selection matrix, the port selection matrix is used by a terminal to determine channel state information based on a second codebook, and the second codebook satisfies a formula $W = W_1 \tilde{W}_2$. W is the second codebook, $W_1$ is the port selection matrix, and $\tilde{W}_2$ is a linear superposition coefficient matrix.

The sending unit is configured to send the channel state information to the network device.

It may be understood that the communications apparatus may further include a processing unit. The processing unit is configured to generate the channel state information. The receiving unit and the sending unit may be included in a transceiver unit, and the transceiver unit implements functions of the receiving unit and the sending unit.

According to an eighth aspect, an embodiment of this application provides a communications apparatus, including a receiving unit and a processing unit.

The receiving unit is configured to receive channel state information from a terminal. The channel state information includes first indication information, the first indication information is used to indicate a port selection matrix, the port selection matrix is used by the terminal to determine the channel state information based on a second codebook, and the second codebook satisfies a formula $W = W_1 W_Z$. W is the second codebook, $W_1$ is the port selection matrix, and $\tilde{W}_2$ is a linear superposition coefficient matrix.

The processing unit is configured to determine a precoding matrix based on the first indication information and the second codebook.

It may be understood that the receiving unit may be included in a transceiver unit, and the transceiver unit implements a function of the receiving unit.

In embodiments of the seventh aspect and the eighth aspect, dimensions of $W_1$ are X*L, L≤X, X is used to indicate the quantity of CSI-RS ports, and $\tilde{L}$ is a quantity of selected CSI-RS ports.

In a specific application scenario, in different polarization directions, quantities of ports selected by the terminal may be the same, and sequence numbers of the selected ports are also the same.

Alternatively, in different polarization directions, quantities of ports selected by the terminal may be the same, and sequence numbers of the selected ports are different.

Alternatively, in different polarization directions, quantities of ports selected by the terminal are different, and sequence numbers of the selected ports are also different.

Based on different application scenarios, embodiments of this application provide the following several possible designs of W1.

For example, in different polarization directions, quantities of ports selected by the terminal are the same, and sequence numbers of the selected ports are the same. $W_1$ satisfies the following formula:

$$W_1 \begin{bmatrix} E_{\frac{X}{2} \times \tilde{L}} & 0 \\ 0 & E_{\frac{X}{2} \times \tilde{L}} \end{bmatrix}, \text{ where}$$

$$E_{\frac{X}{2} \times \tilde{L}} = \begin{bmatrix} e^{\left(\frac{X}{2}\right)}_{\text{mod}\left(m_1, \frac{X}{2}\right)} & e^{\left(\frac{X}{2}\right)}_{\text{mod}\left(m_2, \frac{X}{2}\right)} & \cdots & e^{\left(\frac{X}{2}\right)}_{\text{mod}\left(m_{\tilde{L}-1}, \frac{X}{2}\right)} \end{bmatrix}.$$

X is the quantity of CSI-RS ports, $\tilde{L}$ is a quantity of CSI-RS ports selected in one polarization direction, $$E_{\frac{X}{2} \times \tilde{L}}$$

is a matrix consisting of $$e^{\left(\frac{X}{2}\right)}_{\text{mod}\left(i, \frac{X}{2}\right)}, \quad e^{\left(\frac{X}{2}\right)}_{\text{mod}\left(i, \frac{X}{2}\right)}$$

is a vector whose length is X/2, a $$\left(\text{mod}\left(i, \frac{X}{2}\right)\right)^{th}$$

element in elements included in the vector is 1 and other elements are 0, i=$m_1$, $m_2$, ..., $m_{\tilde{L}-1}$, and i is an integer greater than or equal to 0.

X is a quantity, sent by the base station, of CSI-RS ports, $\tilde{L}$ is a quantity of CSI-RS ports selected by the terminal in one polarization direction, and the $$\left(\text{mod}\left(i, \frac{X}{2}\right)\right)^{th}$$

element in $$e^{\left(\frac{X}{2}\right)}$$

$$\text{mod}\left(i, \frac{X}{2}\right)$$

is 1, and may indicate to select a corresponding CSI-RS port.

Since the quantities of the ports are the same and the sequence numbers of the ports are the same, it may be considered that once a port in one polarization direction is selected, a port in another polarization direction is also selected. This implementation is relatively simple.

As a variation of W1, $W_1$ satisfies the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{ where}$$

$$E_{\frac{X}{2} \times \tilde{L}} = \begin{bmatrix} e^{\left(\frac{X}{2}\right)}_{\text{mod}\left(m, \frac{X}{2}\right)} & e^{\left(\frac{X}{2}\right)}_{\text{mod}\left(m+1, \frac{X}{2}\right)} & \cdots & e^{\left(\frac{X}{2}\right)}_{\text{mod}\left(m+\tilde{L}-1, \frac{X}{2}\right)} \end{bmatrix},$$

which indicates that the CSI-RS ports selected by the terminal may be continuous.

For example, in different polarization directions, quantities of ports selected by the terminal are the same, and sequence numbers of the selected ports are different. $W_1$ satisfies the following formula:

$$W_1 = \begin{bmatrix} E_{\frac{X}{2} \times \tilde{L}} & 0 \\ 0 & \overline{E}_{\frac{X}{2} \times \tilde{L}} \end{bmatrix}, \text{ where}$$

$$E_{\frac{X}{2} \times \tilde{L}} = \begin{bmatrix} e^{\left(\frac{X}{2}\right)}_{\text{mod}\left(m_1, \frac{X}{2}\right)} & e^{\left(\frac{X}{2}\right)}_{\text{mod}\left(m_2, \frac{X}{2}\right)} & \cdots & e^{\left(\frac{X}{2}\right)}_{\text{mod}\left(m_{\tilde{L}-1}, \frac{X}{2}\right)} \end{bmatrix}, \text{ and}$$

$$\overline{E}_{\frac{X}{2} \times \tilde{L}} = \begin{bmatrix} e^{\left(\frac{X}{2}\right)}_{\text{mod}\left(n_1, \frac{X}{2}\right)} & e^{\left(\frac{X}{2}\right)}_{\text{mod}\left(n_2, \frac{X}{2}\right)} & \cdots & e^{\left(\frac{X}{2}\right)}_{\text{mod}\left(n_{\tilde{L}-1}, \frac{X}{2}\right)} \end{bmatrix},$$

where X is the quantity of CSI-RS ports, and $\tilde{L}$ is a quantity of CSI-RS ports selected in one polarization direction;

$$E_{\frac{X}{2} \times \tilde{L}}$$

is a matrix consisting of $$e^{\left(\frac{X}{2}\right)}_{\text{mod}\left(i, \frac{X}{2}\right)}, \quad e^{\left(\frac{X}{2}\right)}_{\text{mod}\left(i, \frac{X}{2}\right)}$$

is a vector whose length is X/2, a $$\left(\mod\left(i, \frac{X}{2}\right)\right)^{th}$$

element in elements included in the vector is 1 and other elements are 0, i=$m_1$, $m_2$, ..., $m_{L-1}$, and i is an integer greater than or equal to 0; and $$\overline{E}_{\frac{X}{2} \times L}$$

is a matrix consisting of $$\frac{e^{\left(\frac{X}{2}\right)}}{\mod\left(i, \frac{X}{2}\right)}, \quad \frac{e^{\left(\frac{X}{2}\right)}}{\mod\left(i, \frac{X}{2}\right)}$$

is a vector whose length is X/2, a $$\left(\mod\left(i, \frac{X}{2}\right)\right)^{th}$$

element in elements included in the vector is 1 and other elements are 0, i=$n_1$, $n_2$, ..., $n_{L-1}$, and i is an integer greater than or equal to 0.

As a variation of W1, $W_1$ satisfies the following formula:

$$W_1 = \begin{bmatrix} E_{\frac{X}{2} \times L} & 0 \\ 0 & \overline{E}_{\frac{X}{2} \times L} \end{bmatrix}, \text{ where}$$

$$E_{\frac{X}{2} \times L} = \begin{bmatrix} \frac{e^{\left(\frac{X}{2}\right)}}{\mod\left(m, \frac{X}{2}\right)} & \frac{e^{\left(\frac{X}{2}\right)}}{\mod\left(m+1, \frac{X}{2}\right)} & \cdots & \frac{e^{\left(\frac{X}{2}\right)}}{\mod\left(m+L-1, \frac{X}{2}\right)} \end{bmatrix},$$

and $$\overline{E}_{\frac{X}{2} \times L} = \begin{bmatrix} \frac{e^{\left(\frac{X}{2}\right)}}{\mod\left(n, \frac{X}{2}\right)} & \frac{e^{\left(\frac{X}{2}\right)}}{\mod\left(n+1, \frac{X}{2}\right)} & \cdots & \frac{e^{\left(\frac{X}{2}\right)}}{\mod\left(n+L-1, \frac{X}{2}\right)} \end{bmatrix}.$$

In a possible implementation, in different polarization directions, quantities of ports selected by the terminal are different, and sequence numbers of the selected ports are different. $W_1$ may be selected from a matrix. For example, W1 is a subset of $F_{X \times X}$, dimensions of $F_{X \times X}$ are X*X, and $F_{X \times X} = [e^{(X)}_0 \, e^{(X)}_1 \ldots e^{(X)}_{(X-1)}]$. For example, $e^{(X)}_i$ is a vector whose length is X, an $i^{th}$ element in $F_{X \times X}$ is 1 and all remaining elements are 0, and i=0, 1, ..., X−1.

As a variation of W1, $W_1$ satisfies the following formula:

$W_1 = [e^{(X)}_{mod(m,X)}, \ldots, e^{(X)}_{mod(m+(L-1),X)}]$, which indicates that the CSI-RS ports selected by the terminal may be continuous.

According to a ninth aspect, an embodiment of this application provides a communications apparatus. The communications apparatus may be the communications apparatus in the fifth aspect, the sixth aspect, the seventh aspect, or the eighth aspect in the foregoing embodiment, or a chip disposed in the communications apparatus in the fifth aspect, the sixth aspect, the seventh aspect, or the eighth aspect. The communications apparatus includes a communications interface and a processor, and optionally, further includes a memory. The memory is configured to store a computer program or instructions or data. The processor is coupled to the memory and the communications interface. When the processor reads the computer program or the instructions or data, the communications apparatus is enabled to perform the method performed by the terminal or the network device in the foregoing method embodiment.

It should be understood that the communications interface may be a transceiver in the communications apparatus, for example, implemented by using an antenna, a feeder, a codec, or the like in the communications apparatus. Alternatively, if the communications apparatus is a chip disposed in a network device, the communications interface may be an input/output interface of the chip, for example, an input/output circuit or a pin. The transceiver is used by the communications apparatus to communicate with another device. For example, when the communications apparatus is a terminal, the another device is a network device. Alternatively, when the communications apparatus is a network device, the another device is a terminal.

According to a tenth aspect, an embodiment of this application provides a chip system. The chip system includes a processor, and may further include a memory, configured to implement the method performed by the communications apparatus in the fifth aspect, the sixth aspect, the seventh aspect, or the eighth aspect. In a possible implementation, the chip system further includes a memory, configured to store program instructions and/or data. The chip system may include a chip, or may include a chip and another discrete component.

According to an eleventh aspect, an embodiment of this application provides a communications system. The communications system includes the communications apparatus according to the fifth aspect and the communications apparatus according to the sixth aspect, or includes the communications apparatus according to the seventh aspect and the communications apparatus according to the eighth aspect.

According to a twelfth aspect, this application provides a computer-readable storage medium. The computer-readable storage medium stores a computer program, and when the computer program is run, the methods performed by the terminal in the foregoing aspects are implemented, or the methods performed by the network device in the foregoing aspects are implemented.

According to a thirteenth aspect, a computer program product is provided. The computer program product includes computer program code, and when the computer program code is run, the methods performed by the terminal in the foregoing aspects are performed, or the methods performed by the network device in the foregoing aspects are performed.

For beneficial effects of the ninth aspect to the thirteenth aspect and the implementations thereof, refer to description of beneficial effects of the foregoing aspects or the foregoing aspects and the implementations thereof.

DESCRIPTION OF EMBODIMENTS

To make the objectives, technical solutions and advantages of embodiments of this application clearer, the following further describes embodiments of this application in detail with reference to the accompanying drawings.

The technical solutions provided in embodiments of this application may be applied to a 5G system, or applied to a future communications system or another similar communications system. In addition, the technical solutions provided in embodiments of this application may be applied to a cellular link, a PLMN network, a machine to machine (M2M) network, an internet of things (IoT) network, or another network, and may also be applied to a link between devices, for example, a device to device (D2D) link. The D2D link may also be referred to as a sidelink, and the sidelink may also be referred to as a side link, a secondary link, or the like. In embodiments of this application, the foregoing terms refer to links established between devices of a same type, and have a same meaning. The link between devices of a same type may be a link between terminal devices, a link between base stations, a link between relay nodes, or the like. This is not limited in embodiments of this application. The link between terminal devices includes a D2D link defined in third generation partnership project (3GPP) release (Rel)-12/13, as well as a vehicle-to-vehicle, vehicle-to-phone, or vehicle-to-everything V2X link defined by 3GPP for internet of vehicles, including Rel-14/15, and further includes V2X links based on an NR system in Rel-16 currently studied by 3GPP and later releases, and the like.

Figure 1:
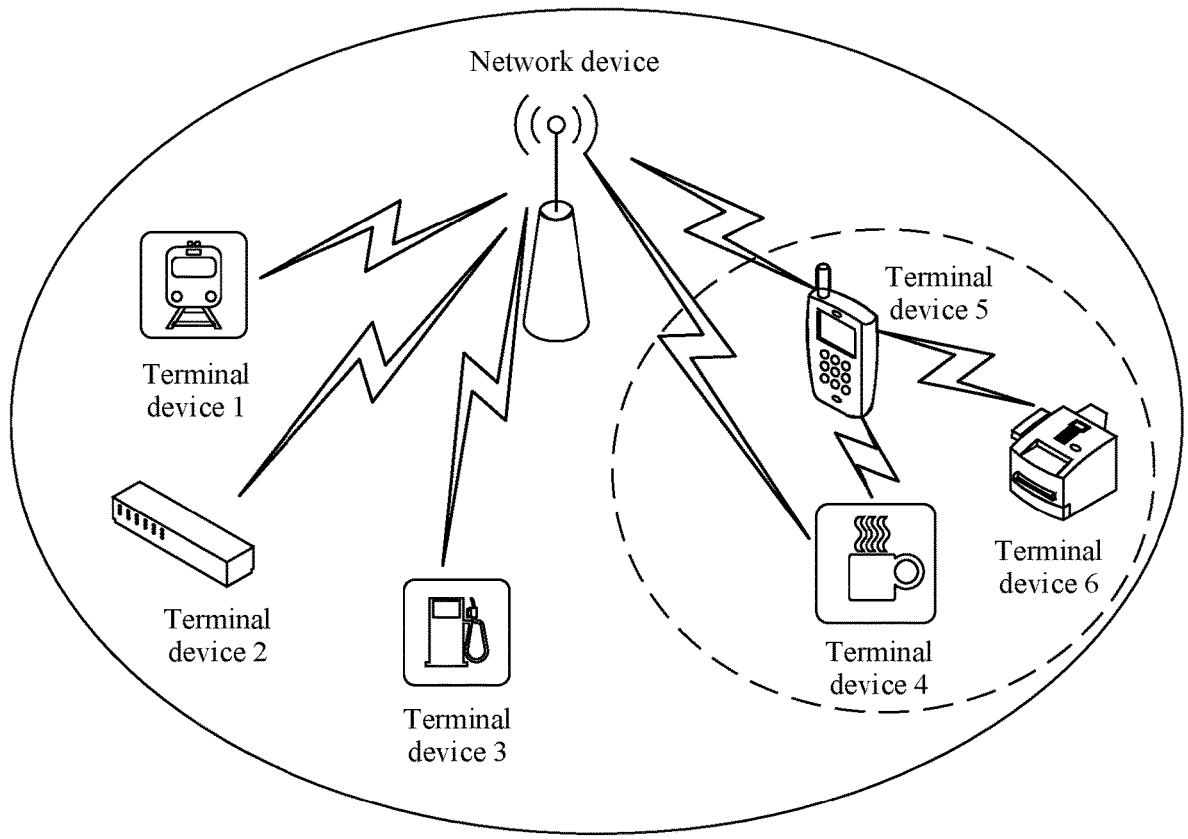
FIG. 1 is a schematic diagram of an architecture of a communications system to which embodiments of this application are applicable.

FIG. 1 shows an application scenario to which embodiments of this application are applied, or referred to as a network architecture to which embodiments of this application are applied. FIG. 1 includes a network device and six terminal devices. It should be understood that a quantity of terminal devices in FIG. 1 is merely an example, and there may be more or less terminal devices. The network architecture may further include another network device, for example, may further include a wireless relay device and a wireless backhaul device, which are not shown in FIG. 1. The network device is a device used by the terminal device to access a network wirelessly, and may be a base station.

The network device corresponds to different devices in different systems, for example, may correspond to an eNB in a fourth generation mobile communications technology (4th-generation, 4G) system, and may correspond to a gNB in a 5G system. The six terminal devices may be a cellular phone, a smartphone, a portable computer, a handheld communications device, a handheld computing device, a satellite radio apparatus, a global positioning system, a PDA, and/or any other suitable device for communication in a wireless communications system, and all may be connected to the network device.

Embodiments of this application are applicable to uplink signal transmission, downlink signal transmission, and D2D signal transmission. For downlink signal transmission, a sending device is a network device, and a corresponding receiving device is a terminal device. For uplink signal transmission, a sending device is a terminal device, and a corresponding receiving device is a network device. For D2D signal transmission, a sending device is a terminal device, and a receiving device is also a terminal device. For example, three terminal devices shown in a dashed-line area in FIG. 1 are applicable to D2D signal transmission. A signal transmission direction is not limited in embodiments of this application.

The terminal device may be a wireless terminal device that can receive scheduling and indication information of the network device. The wireless terminal device may be a device that provides voice and/or data connectivity for a user, a handheld device having a wireless connection function, or another processing device connected to a wireless modem. The wireless terminal device may communicate with one or more core networks or the internet by using a radio access network (RAN). The wireless terminal device may be a mobile terminal device, such as a mobile phone (or referred to as a "cellular" phone or a cell phone), a computer, and a data card, for example, may be a portable, pocket-sized, handheld, computer built-in, or in-vehicle mobile apparatus that exchanges a language and/or data with the radio access network. For example, the wireless terminal device may be a device such as a personal communications service (PCS) phone, a cordless telephone set, a session initiation protocol (SIP) telephone, a wireless local loop (WLL) station, a personal digital assistant (PDA), a tablet computer (Pad), or a computer with a wireless transceiver function. The wireless terminal device may also be referred to as a system, a subscriber unit, a subscriber station, a mobile station (MS), a remote station, an access point (AP), a remote terminal device (remote terminal), an access terminal device (access terminal), a user terminal device (user terminal), a user agent, a subscriber station (SS), customer premises equipment (CPE), a terminal, user equipment (UE), a mobile terminal (MT), or the like. Alternatively, the wireless terminal device may be a wearable device and a next-generation communications system, for example, a terminal device in a 5G network, a terminal device in a future evolved public land mobile network (PLMN) network, or a terminal device in an NR communications system.

The network device is an entity on a network side that is configured to transmit or receive signals, for example, a generation NodeB (gNodeB). The network device may be a device configured to communicate with a mobile device. The network device may be an AP in a wireless local area network (WLAN), a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB) in long term evolution (LTE), or a relay station, an access point, a vehicle-mounted device, a wearable device, a network device in a 5G network, a network device in a future evolved public land mobile network (PLMN) network, a gNodeB/gNB in an NR system, or the like. In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, to implement functions of radio resource control (RRC) and packet data convergence protocol (PDCP) layers. The DU is responsible for processing a physical layer protocol and a real-time service, to implement functions of a radio link control (RLC) layer, a media access control (MAC) layer, and a physical (PHY) layer. The AAU performs some physical layer processing, radio frequency processing, and active antenna-related functions. Because information at the RRC layer eventually becomes information at the PHY layer, or is converted from information at the PHY layer, in this architecture, higher-layer signaling, such as RRC layer signaling, may also be considered as being sent by the DU, or sent by the DU and the AAU. It may be understood that the network device may be a device including one or more of a CU node, a DU node, and an AAU node. In addition, the CU may be classified as a network device in an access network (radio access network, RAN), or the CU may be classified as a network device in a core network (CN). This is not limited in this application. In addition, in embodiments of this application, the network device provides a service for a cell, and the terminal device communicates with the network device by using a transmission resource (for example, a frequency-domain resource, or referred to as a spectrum resource) used by the cell. The cell may be a cell corresponding to the network device (for example, a base station). The cell may belong to a macro base station, or may belong to a base station corresponding to a small cell. The small cell herein may include: a metro cell, a micro cell, a pico cell, a femto cell, and the like. These small cells have characteristics of a small coverage area and low transmit power, and are suitable to provide a high-rate data transmission service. In addition, in another possible case, the network device may be another apparatus that provides a wireless communications function for the terminal device. A specific technology and a specific device form that are used by the network device are not limited in embodiments of this application. For ease of description, in embodiments of this application, an apparatus that provides a wireless communications function for a terminal device is referred to as a network device.

When sending data to the terminal device, the network device needs to perform modulation and coding and signal precoding based on CSI fed back by the terminal device. For ease of understanding embodiments of this application, the following first briefly describes terms in embodiments of this application.

(1) Precoding technology: When a channel state is known, the network device may process a to-be-sent signal by using a precoding matrix that matches a channel resource, so that the precoded to-be-sent signal is adapted to a channel, and received signal quality (for example, a signal-to-interference-plus-noise ratio (SINR)) of a receiving device is improved, thereby reducing complexity of eliminating inter-channel influence by the receiving device. It can be learned that, with the precoding technology, transmission between a sending device and a plurality of receiving devices on a same time-frequency resource may be implemented, that is, multiple-user multiple-input multiple-output (MU-MIMO) may be implemented. It should be noted that the related description of the precoding technology is merely an example for ease of understanding, and not intended to limit the protection scope of embodiments of this application. In a specific implementation process, the sending device may alternatively perform precoding in another manner. For example, when channel information (for example but not limited to a channel matrix) cannot be obtained, precoding or the like is performed by using a preset precoding matrix or in a weighting processing manner. For brevity, specific content thereof is not described herein.

(2) Precoding matrix indicator (PMI): It may be used to indicate a precoding matrix, and the network device recovers the precoding matrix based on the PMI. The precoding matrix may be, for example, a precoding matrix determined by the terminal device based on a channel matrix of each frequency-domain element. A frequency-domain length of a frequency-domain element may be R times that of a subband or a resource block (RB). R<=1. For example, a value of R may be 1 or ½. The channel matrix may be determined by the terminal device in a manner such as channel estimation or based on reciprocity of channels. However, it should be understood that a specific method of determining the precoding matrix by the terminal device is not limited to the foregoing description. For specific implementations, refer to conventional technologies. For brevity, implementations are not enumerated herein.

For example, the precoding matrix may be obtained by performing singular value decomposition (SVD) on the channel matrix or a covariance matrix of the channel matrix, or may be obtained by performing eigenvalue decomposition (EVD) on the covariance matrix of the channel matrix. It should be understood that the foregoing enumerated manners of determining the precoding matrix are merely examples, and should not constitute any limitation on this application. For manners of determining the precoding matrix, refer to conventional technologies. For brevity, manners are not enumerated herein.

It should be noted that, according to a method provided in embodiments of this application, the network device may determine, based on feedback of the terminal device, a spatial-domain vector, a frequency-domain vector, and a combination coefficient of a spatial-frequency vector pair that are used to construct a precoding vector, and further determine a precoding matrix corresponding to each frequency-domain element. The precoding matrix may be directly used for downlink data transmission. Alternatively, some beamforming methods, including, for example, zero forcing (ZF), regularized zero-forcing (RZF), a minimum mean-square error (minimum mean-squared error, MMSE), and a maximum signal-to-leakage-and-noise ratio (signal-to-leakage-and-noise, SLNR), may be performed to obtain a precoding matrix that is finally used for downlink data transmission. This is not limited in this application. Unless specifically described, all precoding matrices below may be precoding matrices determined based on the method provided in this application.

3. Precoding vectors: One precoding matrix may include one or more vectors, for example, column vectors. One precoding matrix may be used to determine one or more precoding vectors.

When a quantity of spatial layers is 1 and a quantity of polarization directions of a transmit antenna is also 1, a precoding matrix is a precoding vector. When a quantity of spatial layers is more than one and a quantity of polarization directions of a transmit antenna is 1, a precoding vector may be a component of a precoding matrix at a spatial layer. When a quantity of spatial layers is 1 and a quantity of polarization directions of a transmit antenna is more than one, a precoding vector may be a component of a precoding matrix in a polarization direction. When a quantity of spatial layers is more than one and a quantity of polarization directions of a transmit antenna is also more than one, a precoding vector may be components of a precoding matrix at a spatial layer and in a polarization direction.

It should be understood that the precoding vector may alternatively be determined by a vector in the precoding matrix, for example, obtained by performing mathematical transformation on the vector in the precoding matrix. A mathematical transformation relationship between the precoding matrix and the precoding vector is not limited in this application.

4. Antenna port: It is also referred to as a port, and may be understood as a transmit antenna identified by a receiving device, or a transmit antenna that may be distinguished spatially. One antenna port may be preconfigured for each virtual antenna, each virtual antenna may be a weighted combination of a plurality of physical antennas, and each antenna port may correspond to one reference signal. Therefore, each antenna port may be referred to as a reference signal port, for example, a channel state information reference signal (CSI-RS) port or a sounding reference signal (SRS) port. In embodiments of this application, the antenna port may be a transceiver unit (TxRU).

(5) Spatial-domain vector: It may also be referred to as a beam vector, a spatial-domain beam basis vector, or a spatial-domain basis vector. Elements in the spatial-domain vector may represent weights of antenna ports. Signals of the antenna ports are linearly superimposed based on the weights of the antenna ports represented by the elements in the spatial-domain vector, so that an area with a stronger signal can be formed in a specific direction of space.

A length of the spatial-domain vector may be a quantity Ns of transmit antenna ports in a polarization direction, Ns≥1, and Ns is an integer. The spatial-domain vector may be, for example, a column vector or a row vector whose length is Ns. This is not limited in this application.

Optionally, the spatial-domain vector is taken from a discrete Fourier transform (DFT) matrix. Each column vector in the DFT matrix may be referred to as a DFT vector. In other words, the spatial-domain vector may be a DFT vector. The spatial-domain vector may be, for example, a DFT vector defined in a type II codebook in the NR protocol TS 38.214 release 15 (R15).

(6) Spatial-domain vector set: It may include a plurality of spatial-domain vectors of different lengths, to correspond to different quantities of antenna ports. In embodiments of this application, a length of a spatial-domain vector is Ns. Therefore, lengths of all spatial-domain vectors in a spatial-domain vector set to which a spatial-domain vector reported by the terminal device belongs are Ns.

In a possible design, the spatial-domain vector set may include Ns spatial-domain vectors, and two of the Ns spatial-domain vectors may be orthogonal to each other. Each spatial-domain vector in the spatial-domain vector set may be taken from a two-dimensional (2 dimension, 2D)-DFT matrix. 2D may represent two different directions, for example, a horizontal direction and a vertical direction. If quantities of antenna ports in the horizontal direction and in the vertical direction are N1 and N2 respectively, Ns=N1N2. The Ns spatial-domain vectors may be denoted as, for example, $b_s^1, b_s^2, \ldots$, and $b_s^{N_s}$. The Ns spatial-domain vectors may construct a matrix $U_s$, and $U_s \triangleq [b_s^1 \ b_s^2 \ldots b_s^{N_s}]$. If each spatial-domain vector in the spatial-domain vector set is taken from the 2D-DFT matrix, $U_s = D_{N_1} \otimes D_{N_2}$. $D_{N_1}$ and $D_{N_2}$ are orthogonal DFT matrices of N×N, and elements in $m^{th}$ rows and $n^{th}$ columns are $$[D_{N_1}]_{m,n} = \frac{1}{\sqrt{N_1}} e^{\frac{j2\pi mn}{N_1}} \text{ and } [D_{N_2}]_{m,n} = \frac{1}{\sqrt{N_2}} e^{\frac{j2\pi mn}{N_2}}.$$

In another possible design, the spatial-domain vector set may be extended into Os×Ns spatial-domain vectors by using an oversampling factor Os. In this case, the spatial-domain vector set may include Os subsets, and each subset may include Ns spatial-domain vectors. Two of the Ns spatial-domain vectors in each subset may be orthogonal to each other. Each spatial-domain vector in the spatial-domain vector set may be taken from an oversampled 2D-DFT matrix. The oversampling factor Os is a positive integer. Specifically, Os=O1×O2, O1 may be an oversampling factor in a horizontal direction, and O2 may be an oversampling factor in a vertical direction. O1≥1, O2≥1, O1 and O2 are not 1 at the same time, and both are integers.

Ns spatial-domain vectors in an $(os)^{th}$ (0≤os≤Os−1 and os is an integer) subset in the spatial-domain vector set may be respectively denoted as, for example, $b_{s,o}^1, b_{s,o}^2, \ldots$, and $b_{s,o}^{N_s}$. Then, a matrix $U_{s,o}$ may be constructed based on the Ns spatial-domain vectors in the $(os)^{th}$ subset, and $$U_{s,o_s} \triangleq [b_{s,o_s}^1 \ b_{s,o_s}^2 \ \ldots \ b_{s,o_s}^{N_s}].$$

(7) Frequency-domain element: It is a unit of a frequency-domain resource, and may represent different frequency-domain resource granularities. The frequency-domain element may include, for example but not limited to, a subband, an RB, a subcarrier, a resource block group (RBG), or a precoding resource block group (PRG). In addition, a frequency-domain length of a frequency-domain element may be R times that of a CQI subband, R<=1, and a value of R may be 1 or ½, or the frequency-domain length of the frequency-domain element may be an RB.

(8) Frequency-domain vector: It may be used to represent a change rule of a channel in frequency domain. Each frequency-domain vector may represent a change rule. When transmitted through a radio channel, a signal may reach a receive antenna from a transmit antenna along a plurality of paths. A multipath delay causes frequency selective fading, that is, a change of a frequency-domain channel. Therefore, change rules of channels in the frequency domain that are caused by delays on different transmission paths may be represented by using different frequency-domain vectors.

A length of the frequency-domain vector may be determined by a quantity of to-be-reported frequency-domain elements that is preconfigured in a reporting band, or may be determined by a length of the reporting band, or may be a value predefined in a protocol. The length of the frequency-domain vector is not limited in this application. The reporting band may be, for example, a CSI reporting band (CSI-ReportingBand) carried in a CSI reporting preconfiguration in higher-layer signaling (for example, a radio resource control (RRC) message).

A length of the frequency-domain vector may be denoted as Nf. Nf is a positive integer. The frequency-domain vector may be, for example, a column vector or a row vector whose length is Nf. This is not limited in this application.

(9) Frequency-domain vector set: It may include a plurality of frequency-domain vectors of different lengths. In embodiments of this application, a length of a frequency-domain vector is Nf. Therefore, lengths of all frequency-domain vectors in a frequency-domain vector set to which a frequency-domain vector reported by the terminal device belongs are Nf.

In a possible design, the frequency-domain vector set may include Nf frequency-domain vectors. Two of the Nf frequency-domain vectors may be orthogonal to each other. Each frequency-domain vector in the frequency-domain vector set may be taken from a DFT matrix or an IDFT matrix (that is, a conjugate transpose matrix of the DFT matrix).

The Nf frequency-domain vectors may be denoted as, for example, $b_f^1, b_f^2, \ldots,$ and $b_f^{N_f}$. The Nf frequency-domain vectors may construct a matrix $U_f$, and $U_f \triangleq [b_f^1 \ b_f^2 \ \ldots \ b_f^{N_f}]$.

In another possible design, the frequency-domain vector set may be extended into Of×Nf frequency-domain vectors by using an oversampling factor Of. In this case, the frequency-domain vector set may include Of subsets, and each subset may include Nf frequency-domain vectors. Two of the Nf frequency-domain vectors in each subset may be orthogonal to each other. Each frequency-domain vector in the frequency-domain vector set may be taken from an oversampled DFT matrix or a conjugate transpose matrix of the oversampled DFT matrix. The oversampling factor Of is a positive integer.

Nf frequency-domain vectors in an $(of)^{th}$ (0≤of≤Of−1 and of is an integer) subset in the frequency-domain vector set may be respectively denoted as, for example, $b_{f,o_f}^1$, $b_{f,o_f}^2, \ldots,$ and $$b_{f,o_f}^{N_f}.$$

Then, a matrix $U_f^{o_f}$ may be constructed based on Nf beam vectors in the $(of)^{th}$ subset, and $$U_f^{o_f} \triangleq \left[ b_{f,o_f}^1 \ b_{f,o_f}^2 \ \ldots \ b_{f,o_f}^{N_f} \right].$$

Therefore, each frequency-domain vector in the frequency-domain vector set may be taken from a DFT matrix or an oversampled DFT matrix, or from a conjugate transposition matrix of the DFT matrix or a conjugate transposition matrix of the oversampled DFT matrix. Each column vector in the frequency-domain vector set may be referred to as a DFT vector or an oversampled DFT vector. In other words, the frequency-domain vector may be a DFT vector or an oversampled DFT vector.

(10) Dual-domain compression: It may include compression in two dimensions: spatial-domain compression and frequency-domain compression. The spatial-domain compression may specifically refer to selecting one or more spatial-domain vectors from a spatial-domain vector set as a vector for constructing a precoding vector. Frequency-domain compression may refer to selecting one or more frequency-domain vectors from a frequency-domain vector set as a vector for constructing a precoding vector. A matrix constructed by a spatial-domain vector and a frequency-domain vector may be referred to as, for example, a spatial-frequency component matrix. The selected one or more spatial-domain vectors and one or more frequency-domain vectors may construct one or more spatial-frequency component matrices. A weighted sum of the one or more spatial-frequency component matrices may be used to construct a spatial-frequency precoding matrix corresponding to a spatial layer. In other words, the spatial-frequency precoding matrix may be approximately a weighted sum of spatial-frequency component matrices constructed by the selected one or more spatial-domain vectors and one or more frequency-domain vectors. Based on the spatial-frequency precoding matrix corresponding to the spatial layer, a precoding vector corresponding to each frequency-domain element at the spatial layer may be determined.

Specifically, the one or more selected spatial-domain vectors may form a spatial-domain beam basis matrix $\tilde{W}$ 1. Each column vector in W1 corresponds to a selected spatial-domain vector. The one or more selected frequency-domain vectors may form a frequency-domain basis matrix $\tilde{W}$ 3. Each column vector in W3 corresponds to a selected frequency-domain vector. The spatial-frequency precoding matrix H may be represented as a result of linearly combining the one or more selected spatial-domain vectors and the one or more selected frequency-domain vectors:

$$H = W_1 \tilde{W} W_3^H$$

In an implementation, if two polarization directions are used, and L spatial-domain vectors are selected for each polarization direction, dimensions of W1 are 2Ns×2L. In a possible implementation, L spatial-domain vectors $\{b_s^0, b_s^2, \ldots, b_s^{L-1}\}$, are shared for the two polarization directions. In this case, W1 may be represented as $$W_1 = \begin{bmatrix} b_s^0 & b_s^1 & \ldots & b_s^{L-1} & 0 & 0 & \ldots & 0 \\ 0 & 0 & \ldots & 0 & b_s^0 & b_s^1 & \ldots & b_s^{L-1} \end{bmatrix}.$$

$b_s^i$ represents an $i^{th}$ selected spatial-domain vector, and i=0, 1, ..., L−1.

For example, for a spatial layer, if M frequency-domain vectors are shared for each spatial-domain vector, dimensions of $W_3^H$ are M×Nf, and each column vector in W3 corresponds to one frequency-domain vector. In this case, each spatial-domain vector corresponds to M frequency-domain vectors in W3. $\tilde{W}$ is a spatial-frequency combination coefficient matrix, and dimensions are 2L̃×M.

An $i^{th}$ row in the spatial-frequency combination coefficient matrix $\tilde{W}$ corresponds to an $i^{th}$ spatial-domain vector in 2L̃ spatial-domain vectors, and a $j^{th}$ column in the spatial-frequency combination coefficient matrix $\tilde{W}$ corresponds to a $j^{th}$ frequency-domain basis vector in M frequency-domain basis vectors. A spatial-frequency combination coefficient vector corresponding to the $i^{th}$ spatial-domain vector is an $i^{th}$ row vector in the spatial-frequency combination coefficient matrix $\tilde{W}$, and a spatial-frequency combination coefficient corresponding to the $i^{th}$ spatial-domain vector is an element included in the $i^{th}$ row vector in the spatial-frequency combination coefficient matrix $\tilde{W}$.

In addition, each of the L spatial-domain vectors may alternatively correspond to different frequency-domain basis vectors. In this case, $W_3^H = [W_f(0), W_f(2L-1)]^H$. $W_f^H(i)$ is a matrix of Mi rows and Nf columns consisting of Mi frequency-domain vectors corresponding to the $i^{th}$ spatial-domain vector.

$$\breve{W} = \begin{bmatrix} \breve{W}^{(0)} & 0 & 0 \\ 0 & \ddots & 0 \\ 0 & 0 & \breve{W}^{(2L-1)} \end{bmatrix}. \quad (0)$$

$\breve{W}^{(i)}$ is a spatial-frequency combination coefficient matrix corresponding to the $i^{th}$ spatial-domain vector and whose dimensions are 1*Mi, and a spatial-frequency combination coefficient included in $\breve{W}^{(i)}$ is the spatial-frequency combination coefficient corresponding to the $i^{th}$ spatial-domain vector.

In addition, the spatial-frequency matrix H may alternatively be represented as $H=W_1 \breve{W} W_3$. In this case, each row vector in W3 corresponds to a selected frequency-domain vector.

Because dual-domain compression includes compression in both the spatial domain and the frequency domain, during feedback, the terminal device may feed back one or more selected spatial-domain vectors and one or more selected frequency-domain vectors to the network device, without separately feeding back, based on all frequency-domain elements (for example, subbands), combination coefficients (for example, including an amplitude and a phase) of the subbands. Therefore, feedback overheads can be reduced. In addition, a frequency-domain vector can represent a change rule of a channel in the frequency domain, and a change of the channel in the frequency domain is simulated by linear superposition of one or more frequency-domain vectors. Therefore, relatively high feedback precision can still be maintained, so that a precoding matrix recovered by the network device based on the feedback of the terminal device can still be adapted to the channel well.

(12) Spatial-frequency combination coefficient, amplitude, and phase: The spatial-frequency combination coefficient is also referred to as a combination coefficient and is used to represent weights of a vector pair consisting of a spatial-domain vector and a frequency-domain vector that are used to construct a spatial-frequency precoding matrix. As described above, the spatial-frequency combination coefficient is in one-to-one correspondence with a vector pair consisting of a spatial-domain vector and a frequency-domain vector, or in other words, each spatial-frequency combination coefficient corresponds to a spatial-domain vector and a frequency-domain vector. Specifically, an element in an $i^{th}$ row and a $j^{th}$ column in a spatial-frequency combination coefficient matrix $\breve{W}$ is a combination coefficient corresponding to a vector pair consisting of an $i^{th}$ spatial-domain vector and a $j^{th}$ frequency-domain vector.

In an implementation, to control reporting overheads, the terminal device may report only a subset of 2LM combination coefficients included in the spatial-frequency combination coefficient matrix $\breve{W}$. Specifically, the network device may configure a maximum quantity K0, corresponding to each spatial layer, of spatial-frequency combination coefficients that can be reported by the terminal device. K0 may be less than or equal to 2LM. There may be a proportional relationship between K0 and a total quantity 2LM of combination coefficients included in $\breve{W}$. For example, K0=β2LM, and a value of β may be {¾, ½, ¼}. In addition, the terminal device may report only K1 spatial-frequency combination coefficients whose amplitudes are not 0. K1 is less than or equal to K0, and K1 may be less than or equal to K0.

Each spatial-frequency combination coefficient may include an amplitude and a phase. In a plurality of spatial-frequency combination coefficients corresponding to a plurality of spatial-frequency component matrices, amplitudes (or referred to as amplitude values) of some spatial-frequency combination coefficients may be zero or close to zero, and quantized values corresponding to the spatial-frequency combination coefficients may be zero. A spatial-frequency combination coefficient whose amplitude is quantized by a quantized value zero may be referred to as a spatial-frequency combination coefficient whose amplitude is zero. Correspondingly, amplitudes of some spatial-frequency combination coefficients are relatively large, and quantized values corresponding to the spatial-frequency combination coefficients are not zero. A spatial-frequency combination coefficient whose amplitude is quantized by a non-zero quantized value may be referred to as a spatial-frequency combination coefficient whose amplitude is non-zero. In other words, the plurality of spatial-frequency combination coefficients include one or more spatial-frequency combination coefficients whose amplitude is non-zero and one or more spatial-frequency combination coefficients whose amplitude is zero.

It should be understood that the spatial-frequency combination coefficient may be indicated by using a quantized value, may be indicated by using an index of a quantized value, or may be indicated by using a non-quantized value. A manner of indicating the spatial-frequency combination coefficient is not limited in this application, provided that a peer end learns the spatial-frequency combination coefficient. For convenience of description below, information used to indicate a spatial-frequency combination coefficient is referred to as quantization information of the spatial-frequency combination coefficient. The quantization information may be, for example, a quantized value, an index, or any other information that may be used to indicate the spatial-frequency combination coefficient.

(11) Spatial layer: In MIMO, a spatial layer may be considered as a data stream that can be independently transmitted. To improve spectrum resource utilization and improve a data transmission capability of a communications system, the network device may transmit data to the terminal device by using a plurality of spatial layers.

A quantity of spatial layers is a rank of a channel matrix. The terminal device may determine a quantity of spatial layers based on a channel matrix obtained by channel estimation. A precoding matrix may be determined based on the channel matrix. For example, the precoding matrix may be determined by performing SVD on the channel matrix or a covariance matrix of the channel matrix. In the SVD process, different spatial layers may be distinguished based on magnitude of eigenvalues. For example, a precoding vector determined by an eigenvector corresponding to a maximum eigenvalue may correspond to a first spatial layer, and a precoding vector determined by an eigenvector corresponding to a minimum eigenvalue may correspond to an $R^{th}$ spatial layer. That is, eigenvalues corresponding to the first spatial layer to the $R^{th}$ spatial layer are in descending order. Simply, R spatial layers are in descending order of intensity from the first spatial layer to the $R^{th}$ spatial layer.

It should be understood that, it is only a possible implementation to distinguish different spatial layers based on eigenvalues, and should not constitute any limitation on this application. For example, another criterion for distinguishing spatial layers may be predefined in a protocol. This is not limited in this application.

(12) Channel state information (CSI) report: It is information reported by a receive end (for example, the terminal device) to a transmit end (for example, the network device) in a wireless communications system and used to describe a channel attribute of a communications link. The CSI report may include, for example but not limited to, a precoding matrix indicator (PMI), a rank indicator (RI), a channel quality indicator (CQI), and a channel state information reference signal (CSI-RS) resource indicator (CSI-RS resource indicator, CRI), and a layer indicator (LI). It should be understood that specific content of the foregoing enumerated CSI is merely examples for description, and should not constitute any limitation on embodiments of this application. The CSI may include one or more of the foregoing enumerated items, or may include other information used to represent the CSI than the foregoing enumerated items. This is not limited in embodiments of this application.

It should be noted that, in embodiments of this application, transformation of a matrix and a vector is involved in a plurality of places. For ease of description, uniform description is provided herein. A superscript T represents a transpose, for example, $A^T$ represents a transpose of a matrix (or vector) A. A superscript H represents a conjugate transpose, for example, $A^H$ represents a conjugate transpose of a matrix (or vector) A. For brevity, description of same or similar cases is omitted below. In embodiments of this application, a right multiplication matrix refers to a frequency-domain base.

For a TDD system, because an uplink channel and a downlink channel use a same bandwidth, the uplink channel and the downlink channel are reciprocal, and a base station side may obtain CSI of the downlink channel based on the uplink channel by using the reciprocity of the uplink channel and the downlink channel, and further perform signal precoding.

Figure 2:
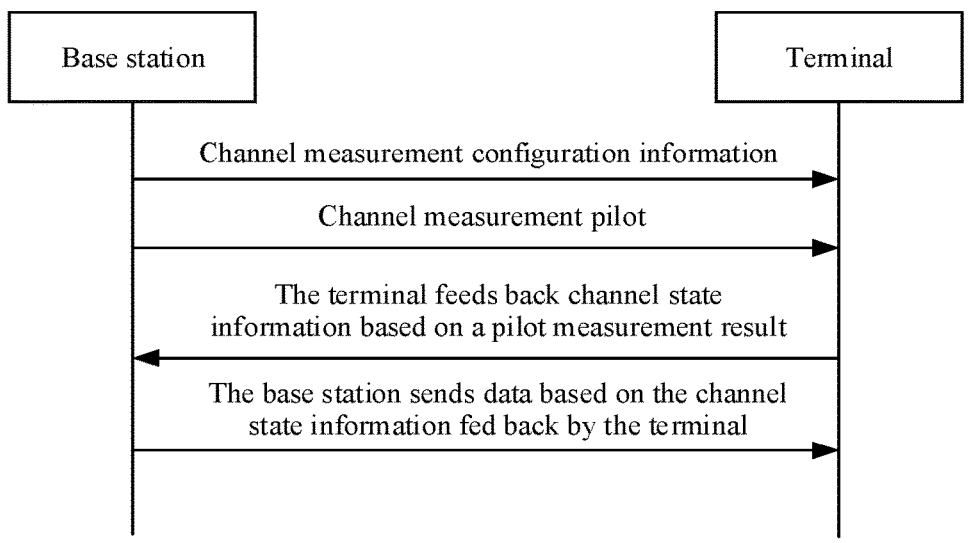
FIG. 2 is a schematic flowchart of obtaining channel state information by a network device according to a conventional technology.

For an FDD system, because uplink and downlink channels are not completely reciprocal, accurate downlink precoding cannot be directly performed by using uplink channel information. In a conventional FDD system, a base station needs a terminal to feed back CSI to the base station. FIG. 2 is a basic flowchart of performing CSI measurement by a base station and a terminal. The base station first sends, to the terminal, signaling for configuring channel measurement, to notify the terminal of a time and a behavior of performing channel measurement, and then the base station sends a pilot to the terminal for channel measurement. The terminal performs measurement based on the pilot sent by the base station, and performs calculation to obtain final CSI. The base station then sends data based on the CSI fed back by the terminal. For example, the base station determines, based on an RI included in the CSI fed back by the terminal, a quantity of streams for transmitting data to the terminal. The base station determines, based on a CQI included in the CSI fed back by the terminal, a modulation order for transmitting data to the terminal and a code rate for channel coding. The base station determines, based on a PMI included in the CSI fed back by the terminal, precoding for transmitting data to the terminal.

The terminal may feed back a precoding matrix based on a codebook. The codebook has a significant performance advantage by linearly combining a plurality of orthogonal wave beams. Because channels are correlated in frequency domain, during channel feedback, the terminal may compress to-be-fed-back channel information by using the frequency-domain correlation, to reduce feedback overheads. Correspondingly, a CSI obtaining solution based on dual-domain compression is proposed. A codebook structure corresponding to the solution is $W=W_1 \tilde{W}_2 W_f^H$. $W_1$ is a spatial-domain basis vector matrix consisting of one or more selected spatial-domain beam basis vectors, and may be a DFT basis matrix or a port selection matrix. $W_f$ is a frequency-domain basis vector matrix consisting of one or more selected frequency-domain basis vectors. The selected frequency-domain basis vector may be selected from a predefined DFT basis matrix or rotated DFT basis matrix. $\tilde{W}_2$ is a linear superposition coefficient matrix.

Besides, although the uplink and downlink channels of the FDD system are not completely reciprocal, the uplink and downlink physical channels of the FDD system are partially reciprocal, for example, the uplink and downlink physical channels are reciprocal in multipath angle and delay. Based on this, the base station may estimate a part of prior information, that is, multipath angle and delay information, by using uplink channel information. Then, the base station loads an obtained angle and delay onto a downlink pilot, and notifies the terminal to perform measurement and feed back supplementary information required by the base station. Finally, the base station reconstructs a downlink channel or performs precoding based on the information that is obtained through uplink pilot measurement and the supplementary information that is fed back by the terminal. In this way, system performance can be improved, and complexity and feedback overheads of the terminal can be reduced.

In other words, CSI is fed back based on the angle and delay reciprocity of the uplink and downlink physical channels, that is, the base station projects the uplink channel on a spatial-domain base (in an angle dimension) and/or a frequency-domain base (in a delay dimension), selects a corresponding spatial-domain basis vector and/or frequency-domain basis vector based on magnitude of a linear superposition coefficient, and then reconstructs a downlink channel by using a part of downlink channel information that is fed back by the terminal and on which the uplink and downlink physical channels are not reciprocal, to obtain downlink channel information. For example, the channel is denoted as $H=SCF^H$. S is the spatial-domain base and is related to channel angle information. F is the frequency-domain base and is related to channel delay information. C is the linear superposition coefficient, and an element in C corresponds to a vector in S and a vector in F, that is, an element in C corresponds to an angle-delay pair.

To obtain uplink channel angle and delay information, the base station needs to project the uplink channel on a spatial-domain basis vector (S) or a frequency-domain basis vector (F), which may be denoted as $H_{UL}=SC_{UL}F^H$. It should be understood that the downlink channel is projected on a spatial-domain basis vector (S) or a frequency-domain basis vector (F), which may be denoted as $H_{DL}=SC_{DL}F^H$. The uplink channel and the downlink channel of the FDD system are reciprocal in angle and delay, that is, the uplink channel $H_{UL}$ and the downlink channel $H_{DL}$ share S and F. Because the uplink channel and the downlink channel are reciprocal in angle and delay, the base station may obtain S and F by using the uplink channel. $C_{UL}$ is information on which the uplink channel is not reciprocal to the downlink channel, and $C_{DL}$ is information on which the downlink channel is not reciprocal to the uplink channel, which may be fed back by the terminal through measurement. The base station may reconstruct a downlink channel or a precoding matrix based on S and F that are obtained based on the uplink channel and $C_{DL}$ that is fed back by the terminal.

However, current codebook structures either require the terminal to feed back S, F, and C, or require the terminal to feed back C and F. For example, $W_f$ in a current dual-domain compressed codebook $W=W_1\tilde{W}_2 W_f^H$ is a frequency-domain base, which requires the terminal to feed back C and F. That is, the current dual-domain compressed codebook W cannot implement CSI feedback based on the angle and delay reciprocity of the uplink and downlink physical channels.

In view of this, embodiments of this application provide a codebook structure corresponding to CSI feedback that may be performed based on the angle and delay reciprocity of the uplink and downlink physical channels, to reduce CSI feedback overheads of the terminal as much as possible.

Embodiments of this application are designed for the dual-domain compressed codebook, and based on the codebook, the terminal may feed back CSI based on the angle and delay reciprocity of the uplink and downlink physical channels. The newly designed codebook is referred to as a first codebook below. The first codebook may be obtained by changing the current dual-domain compressed codebook $W=W_1 \tilde{W}_2 W_f^H$. $W_1$ is a spatial-domain basis vector matrix consisting of one or more selected spatial-domain beam basis vectors, and is used to select one or a plurality of CSI-RS port groups. $\tilde{W}_2$ is a linear superposition coefficient matrix. $W_f$ is a frequency-domain basis vector matrix consisting of one or more selected frequency-domain basis vectors, and is used to select one or more CSI-RS ports in the CSI-RS port group, or used to select one or more CSI-RS ports from each of the plurality of CSI-RS port groups. For example, $W_1$ is used to select a CSI-RS port group 1 and a CSI-RS port group 3, $W_f$ may be used to select one or more CSI-RS ports from the CSI-RS port group 1 and the CSI-RS port group 3, respectively. CSI-RS ports selected in all the CSI-RS port groups may be the same or may be different. $W_f$ may be used to select same CSI-RS ports from all the CSI-RS port groups, that is, CSI-RS ports selected from the CSI-RS port group 1 and the CSI-RS port group 3 are the same. For example, $W_f$ indicates a sequence number of a CSI-RS port. By default, CSI-RS ports corresponding to the sequence number are selected from all the CSI-RS port groups, and the selected CSI-RS ports are the same.

In a conventional technology, $W_1$ may be a DFT basis matrix, or may be a port selection matrix, but $W_f$ is a DFT basis matrix. As described above, for CSI feedback using the angle and delay reciprocity of the uplink and downlink physical channels, $W_f$ in the conventional technology is inappropriate. In embodiments of this application, $W_f$ may be changed, so that CSI may be obtained by using the angle and delay reciprocity of the uplink and downlink physical channels, to reduce CSI feedback overheads of the terminal as much as possible. It should be understood that the first codebook corresponding to $W_f^H$ in embodiments of this application is a codebook that can be used to feed back CSI based on the angle and delay reciprocity of the uplink and downlink physical channels. From this perspective, the first codebook may be understood as a codebook for angle and delay port selection.

In embodiments of this application, $W_1$ in the first codebook may reuse $W_1$ in the dual-domain compressed codebook in the conventional technology. For example, $W_1$ is a port selection matrix. Design solutions for $W_f$ include but are not limited to the following several designs.

Design 1: $W_f$ is a port selection matrix.

Design 2: $W_f$ is one or a plurality of specific column vectors.

Design 3: $W_f$ is a DFT matrix, and the DFT matrix includes a column vector in which all elements are 1.

Design 4: $W_f$ is a DFT matrix, and $W_f$ is one or more specific row vectors. It should be understood that the design 4 may be considered as another form of the design 2. The following describes the design 1, the design 2, and the design 3. The design 4 may be similar to the design 2. Therefore, the design 4 is not described in detail.

Figure 3:
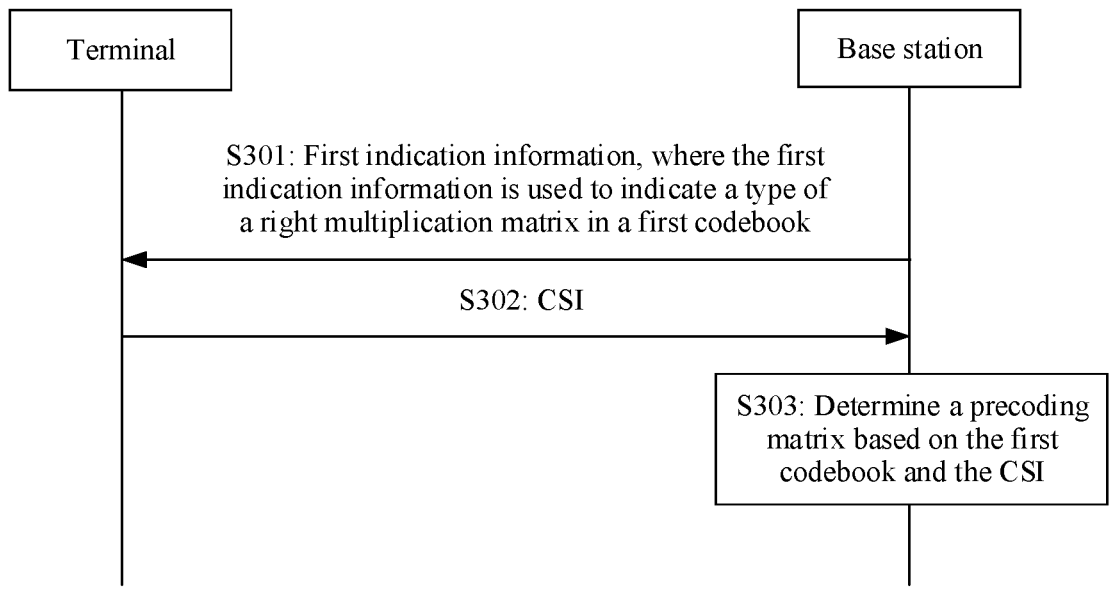
FIG. 3 is a schematic flowchart of a channel state information feedback method according to an embodiment of this application.

Based on the foregoing design solutions of $W_f$, that is, design solutions of the first codebook, an embodiment of this application provides a channel state information feedback method. FIG. 3 is a flowchart of the method. In the following description process, an example in which the method is applied to the network architecture shown in FIG. 1 is used. In addition, the method may be performed by two communications apparatuses. The two communications apparatuses are, for example, a first communications apparatus and a second communications apparatus. The first communications apparatus may be a network device or a communications apparatus that can support a function required by the network device to implement the method. Alternatively, the first communications apparatus may be a terminal or a communications apparatus that can support a function required by the terminal to implement the method, or certainly may be another communications apparatus, such as a chip system. Similarly, the second communications apparatus may be a network device or a communications apparatus that can support a function required by the network device to implement the method. Alternatively, the second communications apparatus may be a terminal or a communications apparatus that can support a function required by the terminal to implement the method, or certainly may be another communications apparatus, such as a chip system. In addition, implementations of the first communications apparatus and the second communications apparatus are not limited. For example, the first communications apparatus may be a network device and the second communications apparatus is a terminal, or both the first communications apparatus and the second communications apparatus are terminals, or the first communications apparatus is a network device and the second communications apparatus is a communications apparatus that can support a function required by a terminal to implement the method.

For ease of description below, an example in which the method is performed by a network device and a terminal is used. That is, an example in which the first communications apparatus is a terminal, the second communications apparatus is a network device, and the network device is a base station is used. For example, the terminal below may be any one of the six terminal devices in FIG. 1, and the network device below may be the network device in FIG. 1. It should be noted that this embodiment of this application is merely described by using an example in which the method is performed by the network device and the terminal device, and is not limited to this scenario.

It should be noted that, in this embodiment of this application, all "<=" and "≤" represent less than or equal to, and ">=" and "≥" represent greater than or equal to.

A procedure of the channel state information feedback method provided in this embodiment of this application is described below.

S301. The base station sends first indication information to the terminal. The first indication information is used to indicate a type of a right multiplication matrix in a first codebook, and the first codebook is used by the terminal to determine CSI.

S302. The terminal sends the CSI to the base station, and correspondingly, the base station receives the CSI from the terminal.

S303. The base station determines a precoding matrix based on the first codebook and the CSI.

This embodiment of this application is intended to provide a new codebook, that is, the first codebook, so that CSI may be obtained by using angle and delay reciprocity of uplink and downlink physical channels. From this perspective, the first codebook may be understood as a codebook based on angle and delay port selection. For compatibility with a conventional technology, the terminal may obtain the CSI based on a codebook in the conventional technology, or may obtain the CSI based on the first codebook. Therefore, when the terminal needs the terminal to feed back the CSI, the base station needs to notify the terminal of a codebook to be used, that is, a solution of obtaining the CSI. Alternatively, it may be considered that this embodiment of this application provides a new CSI obtaining solution. The solution is implemented based on the first codebook. From this perspective, the base station notifies the terminal to use the new CSI obtaining solution, that is, notifies the terminal to use the first codebook. As described above, the first codebook W may be obtained by changing $W_f$ of the current dual-domain compressed codebook $W=W_1\tilde{W}_2 W_f^H$, and $W_f$ varies with different first codebooks. Therefore, that the base station notifies the terminal of the first codebook may also be considered as that the base station notifies the terminal of $W_f$, and that the base station notifies the terminal to use the new CSI obtaining solution may also be considered as that the base station notifies the terminal of $W_f$. That is, the first indication information may directly or indirectly indicate the type of the right multiplication matrix.

Specifically, the base station may notify, by using the first indication information, the terminal of a solution in which the terminal obtains the CSI. For example, the first indication information may indicate the type of $W_f$, or the first indication information may indicate $W_f$, that is, indirectly indicates the type of $W_f$. As described above, $W_f$ varies with different first codebooks. Therefore, the first indication information may alternatively indicate $W_f$ by indicating the first codebook. $W_f$ may include the foregoing four design solutions, that is, the design 1, the design 2, the design 3, and the design 4. It may be understood that there are four types of $W_f$, for example, a type 1, a type 2, a type 3, and a type 4. It should be understood that the first indication information may indicate the type of $W_f$. For ease of description below, a type of $W_f$ of the design 1 is referred to as a type 1, a type of $W_f$ of the design 2 is referred to as a type 2, a type of $W_f$ of the design 3 is referred to as a type 3, and a type of $W_f$ of the design 4 is referred to as a type 4. That is, the type 1 is a port selection matrix, the type 2 is one or a plurality of specific column vectors, the type 3 is a DFT matrix and the DFT matrix includes a column vector in which all elements are 1, and the type 4 is a DFT matrix and the DFT matrix includes a row vector in which all elements are 1.

In an implementation of the first indication information, the first indication information may be carried in existing signaling. For example, the first indication information is carried in a field of radio resource control (radio resource control, RRC) signaling. This facilitates compatibility with existing RRC signaling. For ease of description, in this embodiment of this application, the field is referred to as a first field. The first field may be a field defined in RRC signaling, a field defined in media access control element (media access control element, MAC CE) signaling, or a field defined in downlink control information (downlink control information, DCI) signaling, or may be a newly defined RRC field, MAC CE field, or DCI field. For example, the first field may be a CSI reporting band CSI-ReportingBand field.

For example, when a value of the CSI-ReportingBand field is 0, it is used to indicate the codebook for the terminal to obtain the CSI based on the angle and delay reciprocity of the uplink channel and the downlink channel. Alternatively, when the value of the CSI-ReportingBand field is 0, only a specific vector in a frequency-domain base (for example, a DFT base agreed in a protocol) can be taken (the vector may be a vector agreed in a protocol, for example, a vector in which all elements are 1, or may be a vector configured by the base station by using other signaling). When the value of the CSI-ReportingBand field is not 0, it indicates that a frequency-domain vector is not limited. It should be noted that, in some embodiments, the value of the CSI-ReportingBand field may alternatively be understood as a value carried in the CSI-ReportingBand field.

In another implementation of the first indication information, the first indication information is carried in newly defined signaling. Specifically, the first indication information may be in a form of a bitmap. A length of the bitmap is related to a quantity of RBs or a quantity of subbands, or the length of the bitmap is equal to the quantity of RBs or the quantity of subbands. A first bit in the bitmap corresponds to a first frequency-domain vector in a frequency-domain base (for example, a DFT base agreed in a protocol), a second bit corresponds to a second frequency-domain vector in the frequency-domain base, and so on. If a bit is set to 1, it indicates that a corresponding frequency-domain vector takes effect. If a bit is set to 0, it indicates that a corresponding frequency-domain vector does not take effect. A type of $W_f$ that can be implemented by using the form of the bitmap is, for example, the type 2 or the type 3. It should be noted that, in some embodiments, the length of the bitmap may be related to a length of a column vector of $W_f$. For example, the length of the bitmap is equal to the length of the column vector of $W_f$.

In still another implementation of the first indication information, the first indication information may be N-bit information. N is related to a quantity of RBs/subbands, or N is equal to the quantity of RBs or the quantity of subbands. For example, N is equal to $\log_2(M)$. M is a quantity of vectors included in a frequency-domain base (for example, a DFT base agreed in a protocol), or M is the quantity of RBs/subbands, or M is related to the quantity of RBs or the quantity of subbands. The N bits represent $2^N$ states, and each state corresponds to a vector in $W_f$, that is, a state may represent a frequency-domain vector.

In yet another implementation of the first indication information, the first indication information may alternatively be 1-bit information. 1 indicates that $W_f$ can take only a specific vector (the vector may be a vector agreed in a protocol, for example, a vector in which all elements are 1, or may be a vector configured by the base station by using other signaling) in a frequency-domain base (for example, a DFT base agreed in a protocol). 0 indicates that a frequency-domain vector is not limited.

Because $W_f$ in the dual-domain compressed codebook W in the conventional technology may be a DFT matrix, in this embodiment of this application, when $W_f$ is also a DFT matrix, two manners of indicating $W_f$ are provided. For example, in Manner 1, in addition to indicating that the type of $W_f$ is the type 3, the first indication information further indicates a column vector that is included in the DFT matrix and in which all elements are 1. In Manner 2, it is considered in a system by default or indicated in the system by using the first indication information (or by using other signaling) that the type of $W_f$ is the type 3, that is, it is considered in the system by default or indicated in the system by using the other signaling that $W_f$ is a DFT matrix, and the base station may use other indication information, for example, second indication information, to indicate one or more column vectors that are included in the DFT matrix and in which all elements are 1. Certainly, if the type of $W_f$ is the type 4, the second indication information may indicate one or more row vectors that are included in the DFT matrix and in which all elements are 1. For a specific implementation of the second indication information, refer to the foregoing several implementations of the first indication information. Details are not described herein again.

For ease of understanding, the design 1, the design 2, and the design 3 are used as examples below to describe in detail the CSI feedback solution provided in this embodiment of this application.

For the design 1, that is, both $W_1$ and $W_f$ are port selection matrices, for example, dimensions of $W_1$ are $X_{Group}*L_{Group}$. $X_{Group}$ is a positive integer greater than or equal to 1, and represents a quantity of CSI-RS port groups. $L_{Group}$ is a positive integer greater than or equal to 1, and represents a quantity of selected CSI-RS port groups. Alternatively, for example, dimensions of $W_1$ are $(2*\tilde{X}_{Group})*(2*\tilde{L}_{Group})$. $\tilde{X}_{Group}$ is a positive integer greater than or equal to 1, and represents a quantity of CSI-RS port groups in one polarization direction. $\tilde{L}_{Group}$ is a positive integer greater than or equal to 1, and represents a quantity of CSI-RS port groups selected in one polarization direction. Dimensions of $W_f$ are $M_{Group}*Q_{Group}$. $M_{Group}$ is a positive integer greater than or equal to 1, and represents a quantity of CSI-RS ports in each CSI-RS port group. $Q_{Group}$ is a positive integer greater than or equal to 1, and represents a quantity of CSI-RS ports selected in each CSI-RS port group.

For example, a length of a column vector of $W_1$ is $2\tilde{X}_{Group}$, and there are $2\tilde{L}_{Group}$ column vectors in total. A length of a column vector of $W_f$ is $M_{Group}$, and there are $Q_{Group}$ column vectors in total. It should be understood that, $\tilde{L}_{Group}$ is a quantity of CSI-RS port groups selected in one polarization direction, $\tilde{L}_{Group}$ is an integer greater than or equal to 1, $Q_{Group}$ is a quantity of CSI-RS ports selected in each CSI-RS port group, and $Q_{Group}$ is an integer greater than or equal to 1. $M_{Group}*\tilde{X}_{Group}=X/2$. X is used to indicate a quantity of CSI-RS ports.

In this design, one or more of $\tilde{X}_{Group}$, $M_{Group}$, $Q_{Group}$, $\tilde{L}_{Group}$ and X may be agreed in the system or a protocol, or may be indicated by the network side to the terminal. For example, the network device may send indication information to the terminal, and the indication information may be used to indicate one or more of $\tilde{X}_{Group}$, $M_{Group}$, $Q_{Group}$, $\tilde{L}_{Group}$ and X. It should be understood that, if the dimensions of $W_1$ are $X_{Group}*L_{Group}$, one or more of $X_{Group}$, $L_{Group}$, $M_{Group}$, $Q_{Group}$, and X may be agreed in the system or the protocol, or may be indicated by the network side to the terminal. In a possible implementation, the indication information may be carried in one or more of RRC signaling, MAC CE signaling, and DCI signaling. $\tilde{X}_{Group}$, $M_{Group}$, $Q_{Group}$, $\tilde{L}_{Group}$ and X may be carried in one or more pieces of signaling. This is not limited in this application. The terminal may construct $\tilde{W}_2$ based on $\tilde{X}_{Group}$, $M_{Group}$, $Q_{Group}$, $L_{Group}$, and X as well as $W_1$ and $W_f^H$ generate CSI, and send the CSI to the base station. It should be understood that, the CSI includes at least $\tilde{W}_2$. When the dimensions of $W_1$ are $X_{Group}*L_{Group}$, dimensions of $\tilde{W}_2$ are $L_{Group}*Q_{Group}$. When the dimensions of $W_1$ are $(2*\tilde{X}_{Group})*(2*\tilde{L}Group)$, the dimensions of $\tilde{W}_2$ are $(2*\tilde{L}_{Group})*Q_{Group}$.

For ease of understanding, the following provides a description with reference to a specific example. Specifically, an example in which four CSI-RS ports are selected from 16 CSI-RS ports is used to provide a possible design of $W_f$ and describe how the terminal feeds back CSI based on this $W_f$. It should be understood that the terminal needs to feed back $W_1$ and $\tilde{W}_2$ when feeding back the CSI. Compared with the conventional technology in which the terminal needs to feed back $W_1$, $\tilde{W}_2$, and $W_f$, this can reduce feedback overheads.

It should be understood that before the terminal feeds back the CSI, the terminal performs channel estimation, for example, least-square (LS) channel estimation, on the CSI-RS, and may obtain, based on a channel estimation result, a linear superposition coefficient C corresponding to each CSI-RS port. For example, the terminal may directly sum up channel estimation results at a granularity, for example, an RB or a subband, based on an indication of the base station or an agreement in a protocol, to obtain C. For another example, the terminal may perform inverse fast Fourier transform (IFFT) on channel estimation results based on an indication of the base station or an agreement in a protocol, and obtain an $n^{th}$ value obtained after the transform. Specifically, the value may be a $0^{th}$ value, and is used as C. It should be understood that, n herein is greater than or equal to 0, and is a number of a value obtained after the transform.

The terminal selects N elements from the obtained C based on a rule, for example, selects N maximum elements from C. After selecting the N elements, the terminal needs to notify the base station of the N selected elements. Specifically, the terminal notifies, by using $W_1$ and $W_f$, the base station of CSI-RS ports corresponding to the N elements selected by the terminal. Essentially, C corresponding to the CSI-RS ports is selected. Therefore, the terminal may quantize the N selected elements, construct $\tilde{W}_2$ and report $\tilde{W}_2$ to the base station. Certainly, the terminal may first quantize the obtained C, and then select N elements from the quantized C. A sequence of selecting the N elements and quantizing C is not limited in this embodiment of this application.

The following uses an example in which a quantity of receive antennas of the terminal is $N_{Rx}$, and linear superposition coefficients corresponding to X CSI-RS ports are all selected, that is, X elements are all elements of C, to describe two manners of constructing $\tilde{W}_2$ by the terminal based on N elements in C.

Manner 1: For X linear superposition coefficients corresponding to different receive antennas, the terminal constructs $\tilde{W}$ of $2\tilde{L}_{Group}*Q_{Group}$ in ascending order (or descending order) of CSI-RS port numbers based on a rule of row first and column second (or column first and row second). It should be understood that one receive antenna corresponds to one $\tilde{W}_2$. It should be understood that the CSI sent by the terminal to the base station includes $N_{Rx}$ $\tilde{W}_2$. For example, the CSI sent by the terminal to the base station may include feedback information, and the feedback information includes $N_{Rx}$ $\tilde{W}_2$.

Manner 2: The terminal may construct a matrix $C_T$ of $X*N_{Rx}$ for X linear superposition coefficients corresponding to different receive antennas, and perform SVD decomposition on the matrix $C_T$ to obtain:

$$SVD(C_T)=V\Sigma U^H$$

$V(:,1), \ldots,$ and $V(:,R)$ are selected based on a value (denoted as R) of a rank (Rank) corresponding to a precoding matrix to be calculated, and $\tilde{W}_2$ of $2\tilde{L}_{Group}*Q_{Group}$ is constructed in a sequence from head to tail (or from tail to head) based on a rule of row first and column second (or column first and row second). It should be understood that the CSI sent by the terminal to the base station may include feedback information, and the feedback information includes R $\tilde{W}_2$. It should be noted that a colon in V means selecting all elements in a column.

The terminal notifies, by using $W_1$ and $W_f$, the base station of CSI-RS ports corresponding to the N elements selected by the terminal. For example, both $W_1$ and $W_f$ are port selection matrices, and respectively satisfy, for example:

$$W1 = \begin{bmatrix} 1 & 0 \\ 0 & 0 \\ 0 & 1 \\ 0 & 0 \end{bmatrix} \text{ and } W_f = \begin{bmatrix} 1 & 0 \\ 0 & 1 \\ 1 & 1 \\ 0 & 0 \end{bmatrix}.$$

It should be understood that the first indication information indicates $W_f$. A quantity, sent by the base station, of CSI-RS ports is 16, that is, X=16. The CSI-RS ports are divided into four groups, and each group includes four CSI-RS ports. $M_{Group}=4$, and $\tilde{X}_{Group}=2$. X=16, $M_{Group}=4$, and $\tilde{X}_{Group}=2$ are agreed in the system or indicated by the base station. $W_1$ is used to select one or a plurality of CSI-RS port groups, $W_f$ is used to select a CSI-RS port from each CSI-RS port group, and $W_1$ and $W_f$ actually indicate to select a linear superposition coefficient corresponding to a CSI-RS port. Herein, an element 1 in $W_1$ indicates to select a corresponding CSI-RS port group. The terminal selects a first CSI-RS port group and a third CSI-RS port group based on $W_1$, that is, $\tilde{L}_{Group}=1$. An element 1 in $W_f$ indicates to select a corresponding CSI-RS port, and an element 0 indicates not to select a corresponding CSI-RS port. Based on $W_f$, the terminal selects CSI-RS ports whose sequence numbers are 1 and 3 in the first CSI-RS port group, and selects CSI-RS ports whose sequence numbers are 2 and 3 in the third CSI-RS port group, that is, $Q_{Group}=2$.

For the design 2, that is, $W_1$ is a port selection matrix, and $W_f$ is one or a plurality of specific column vectors, for example, dimensions of $W_1$ are X*L. X is a positive integer greater than or equal to 1, and represents a quantity of CSI-RS ports. L is a positive integer greater than or equal to 1, and represents a quantity of selected CSI-RS ports. A length of a column vector of $W_f$ is $N_{RB}^0$, and a quantity of column vectors included in $\tilde{W}_f$ is K. Alternatively, for example, dimensions of $W_1$ are $(2\tilde{X})*(2\tilde{L})$. $\tilde{X}$ is a positive integer greater than or equal to 1, and represents a quantity of CSI-RS ports in one polarization direction. L is a positive integer greater than or equal to 1, and represents a quantity of CSI-RS ports selected in one polarization direction. A length of a column vector of $W_f$ is $N_{RB}^0$, and a quantity of column vectors included in $\tilde{W}_f$ is K. It should be understood that, when the dimensions of $W_1$ are X*L, dimensions of $\tilde{W}_2$ are L*K. When the dimensions of $W_1$ are $(2\tilde{X})*(2\tilde{L})$, the dimensions of $\tilde{W}_2$ are $(2\tilde{L})*K$.

For example, a length of a column vector of $W_1$ is X, and a length of a column vector of $W_f$ is $NR_B$. It should be understood that X is used to indicate a quantity of CSI-RS ports, and $N_{RB}^0$ is an integer greater than or equal to 1. In a specific implementation, $N_{RB}^0$ is related to a quantity of RBs or a quantity of subbands of a CSI-RS transmission bandwidth. For example, $N_{RB}^0$ may be equal to the quantity of RBs or the quantity of subbands of the CSI-RS transmission bandwidth.

For example, $W_f$ is a specific column vector. For example, $$W_f = \begin{bmatrix} 1 \\ e^{j\frac{2\pi m}{N}} \\ \vdots \\ e^{j\frac{2\pi m(N-1)}{N}} \end{bmatrix}.$$

$\pi$ is a ratio of a circle's circumference to its diameter. N is a positive integer greater than or equal to 1, and N is related to a quantity of RBs or a quantity of subbands of a CSI-RS transmission bandwidth. For example, N is equal to the quantity of RBs or the quantity of subbands of the CSI-RS transmission bandwidth. m is an integer greater than or equal to 0, and $0 \leq m \leq (N-1)$. In particular, $W_f$ is a column vector in which all elements are 1. It should be understood that the first indication information may indicate this $W_f$.

For example, $$W_f = \begin{bmatrix} 1 \\ e^{j\frac{2\pi m}{ON}} \\ \vdots \\ e^{j\frac{2\pi m(N-1)}{ON}} \end{bmatrix}.$$

$\pi$ is a ratio of a circle's circumference to its diameter. N is a positive integer greater than or equal to 1, and N is related to a quantity of RBs or a quantity of subbands of a CSI-RS transmission bandwidth. For example, N is equal to the quantity of RBs or the quantity of subbands of the CSI-RS transmission bandwidth. O is a positive integer greater than or equal to 1, and is used to indicate a quantity of over-sampled vectors. For example, O=4. m is an integer greater than or equal to 0, and $0 \leq m \leq (ON-1)$. In particular, $W_f$ is a column vector in which all elements are 1. It should be understood that the first indication information may indicate this $W_f$.

For example, $W_f$ is a plurality of specific column vectors. For example, $$W_f = \begin{bmatrix} 1 & \cdots & 1 \\ e^{j\frac{2\pi m_1}{N}} & \cdots & e^{j\frac{2\pi m_X}{N}} \\ \vdots & \cdots & \vdots \\ e^{j\frac{2\pi m_1(N-1)}{N}} & & e^{j\frac{2\pi m_X(N-1)}{N}} \end{bmatrix}.$$

$\pi$ is a ratio of a circle's circumference to its diameter. N is a positive integer greater than or equal to 1, and N is related to a quantity of RBs or a quantity of subbands of a CSI-RS transmission bandwidth. For example, N is equal to the quantity of RBs or the quantity of subbands of the CSI-RS transmission bandwidth. $m_1, \ldots,$ and $m_X$ are integers greater than or equal to 0. For example, $0 \leq m_1 \leq (N-1), \ldots, 0 \leq m_X \leq (N-1)$. The plurality of specific column vectors include a column vector in which all elements are 1. It should be understood that the first indication information may indicate the plurality of specific column vectors.

For example, $$W_f = \begin{bmatrix} 1 & \cdots & 1 \\ e^{j\frac{2\pi m_1}{ON}} & \cdots & e^{j\frac{2\pi m_X}{ON}} \\ \vdots & \cdots & \vdots \\ e^{j\frac{2\pi m_1(N-1)}{ON}} & & e^{j\frac{2\pi m_X(N-1)}{ON}} \end{bmatrix}.$$

$\pi$ is a ratio of a circle's circumference to its diameter. N is a positive integer greater than or equal to 1, and N is related to a quantity of RBs or a quantity of subbands of a CSI-RS transmission bandwidth. For example, N is equal to the quantity of RBs or the quantity of subbands of the CSI-RS transmission bandwidth. $m_1, \ldots,$ and $m_X$ are integers greater than or equal to 0. O is a positive integer greater than or equal to 1, and is used to indicate a quantity of oversampled vectors. For example, O=4, and $0 \le m_1 \le (ON-1), \ldots, 0 \le m_X \le (ON-1)$. It should be understood that the first indication information may indicate the plurality of specific column vectors.

It should be understood that $W_f$ may alternatively be one or more specific row vectors. For details, refer to the foregoing description of $W_f$ that is one or more specific column vectors. For example, a length of a row vector of $W_f$ is $N_{RB}^0$, and a length of a row vector of $W_1$ is $P_{CSI-RS}$. $P_{CSI-RS}$ is used to indicate a quantity of CSI-RS ports. $N_{RB}^0$ is an integer greater than or equal to 1, and is used to indicate to select $N_{RB}^0$ frequency-domain vectors. In a specific implementation, $N_{RB}^0$ is related to a quantity of RBs or a quantity of subbands of a CSI-RS transmission bandwidth. For example, $N_{RB}^0$ may be equal to the quantity of RBs or the quantity of subbands of the CSI-RS transmission bandwidth. It should be understood that when $W_f$ is a specific row vector, the first indication information indicates the row vector. When $W_f$ is some specific row vectors, the first indication information indicates the specific row vectors.

It should be noted that the first indication information directly or indirectly indicates that $W_f$ is one or some specific vectors, for example, column vectors in the foregoing two examples. For another example, when the first indication information indicates the first codebook or the CSI obtaining solution based on the angle and delay reciprocity, it is considered by default that $W_f$ is one or some specific vectors agreed in a protocol. For another example, the first indication information indicates to select one or more vectors from a matrix, for example, select one or some vectors from a matrix G.

For example, $$G = \begin{bmatrix} 1 & \cdots & 1 & \cdots \\ 1 & \cdots & e^{j\frac{2\pi m}{ON}} & \cdots \\ \vdots & \vdots & \vdots & \vdots \\ 1 & \vdots & e^{j\frac{2\pi m(N-1)}{ON}} & \cdots \end{bmatrix}.$$

π is a ratio of a circle's circumference to its diameter. N is a positive integer greater than or equal to 1, and N is related to a quantity of RBs or a quantity of subbands of a CSI-RS transmission bandwidth. For example, N is equal to the quantity of RBs or the quantity of subbands of the CSI-RS transmission bandwidth, and $0 \le m \le (N-1)$.

Alternatively, $$G = \begin{bmatrix} 1 & \cdots & 1 & \cdots \\ 1 & \cdots & e^{j\frac{2\pi m}{N}} & \cdots \\ \vdots & \vdots & \vdots & \vdots \\ 1 & \vdots & e^{j\frac{2\pi m(N-1)}{N}} & \cdots \end{bmatrix}.$$

π is a ratio of a circle's circumference to its diameter. N is a positive integer greater than or equal to 1, and N is related to a quantity of RBs or a quantity of subbands of a CSI-RS transmission bandwidth. For example, N is equal to the quantity of RBs or the quantity of subbands of the CSI-RS transmission bandwidth. O is a positive integer greater than or equal to 1, and is used to indicate a quantity of oversampled vectors. For example, O=4, and $0 \le m \le (ON-1)$.

It should be understood that the first indication information may indicate to select a specific column vector, for example, a column vector in which all elements are 1, or select a row vector, for example, a row vector in which all elements are 1, from G; or select some specific column vectors, which, for example, may include a column vector in which all elements are 1, from G; or select some specific row vectors, which, for example, may include a row vector in which all elements are 1, from G.

It should be understood that the terminal may perform channel estimation on the CSI-RS, and may obtain a linear superposition coefficient C based on a channel estimation result. X CSI-RS ports correspond to X Cs. If the terminal selects the X Cs, the terminal may construct a matrix of $X*N_{RB}^0$ based on a rule of each CSI-RS port being corresponding to one row. In this case, the X Cs form a column vector of $X*1$, and then the column vector is repeated $N_{RB}^0$ times to obtain the matrix $\tilde{W}_2$ of $X*N_{RB}^0$. Alternatively, each CSI-RS port corresponds to $N_{RB}^0$ channel estimation results, and the channel estimation results of each CSI-RS port are used as a row to construct the matrix $\tilde{W}_2$ of $X*N_{RB}^0$. In some embodiments, $\tilde{W}_2$ is a matrix of $X*K$. K is a quantity of vectors included in $\tilde{W}_f$. In this case, the X Cs form a column vector of $X*1$, and then the column vector is repeated K times to obtain the matrix $\tilde{W}_2$ of $X*K$. In particular, $\tilde{W}_2$ is a vector of $X*1$, and in this case, the X Cs form a column vector of $X*1$, that is, $\tilde{W}_2$.

If the terminal selects $2\tilde{L}$ Cs, the terminal may construct a matrix of $2\tilde{L}*N_{RB}^0$ based on a rule of each CSI-RS port being corresponding to one row. In this case, the $2\tilde{L}$ Cs form a column vector of $2\tilde{L}*1$, and then the column vector is repeated $N_{RB}^0$ times to obtain the matrix $\tilde{W}_2$ of $2\tilde{L}*N_{RB}^0$. Alternatively, each CSI-RS port corresponds to $N_{RB}^0$ channel estimation results, and the channel estimation results of each CSI-RS port are used as a row to construct the matrix $\tilde{W}_2$ of $2\tilde{L}*N_{RB}^0$. In another possible embodiment, $\tilde{W}_2$ is a matrix of $2\tilde{L}*K$. In this case, the $2\tilde{L}$ Cs form a column vector of $2\tilde{L}*1$, and then the column vector is repeated K times to obtain the matrix $\tilde{W}_2$ of $2\tilde{L}*K$. K is a quantity of vectors included in $W_f$. In particular, $\tilde{W}_2$ is a vector of $2\tilde{L}*1$, and in this case, the $2\tilde{L}$ Cs form a column vector of $2\tilde{L}*1$, that is, $\tilde{W}_2$.

For the design 3, that is, $W_1$ is a port selection matrix, $W_f$ is a DFT matrix, and the DFT matrix includes a column vector in which all elements are 1, similar to the design 2, a length of a column vector of $W_f$ is $N_{RB}^0$, a length of a column vector of $W_1$ is $X*1$, X is used to indicate a quantity of CSI-RS ports, and $N_{RB}^0$ is an integer greater than or equal to 1, and is used to indicate to select $N_{RB}^0$ frequency-domain vectors. In a specific implementation, $N_{RB}^0$ is related to a quantity of RBs or a quantity of subbands of a CSI-RS transmission bandwidth. For example, $N_{RB}^0$ may be equal to the quantity of RBs or the quantity of subbands of the CSI-RS transmission bandwidth. It should be understood that the first indication information may indicate the DFT matrix, and indicate one or more column vectors in which all elements are 1 in the DFT matrix. Alternatively, the first indication information may indicate the DFT matrix, and indicate one or more row vectors in which all elements are 1 in the DFT matrix. Alternatively, the first indication information indicates the DFT matrix, and second indication information indicates one or more column vectors in which all elements are 1 in the DFT matrix, or indicates one or more row vectors in which all elements are 1 in the DFT matrix. For example, $W_f$ is G in the design 2, and the first indication information indicates G, and indicates to select a column vector in which all elements are 1 from G. Alternatively, the first indication information indicates G, and indicates to select a row vector in which all elements are 1 from G. Alternatively, the first indication information indicates G, and the second indication information indicates to select a column vector in which all elements are 1 from G. Alternatively, the first indication information indicates G, and the second indication information indicates to select a row vector in which all elements are 1 from G.

It should be understood that the terminal may perform channel estimation on the CSI-RS, and may obtain a linear superposition coefficient C based on a channel estimation result. X CSI-RS ports correspond to X Cs. If the terminal selects the X Cs, the terminal may construct a matrix of $X*N_{RB}^0$ based on a rule of each CSI-RS port being corresponding to one row. In this case, the X Cs form a column vector of $X*1$, and then the column vector is repeated $N_{RB}^0$ times to obtain the matrix $\tilde{W}_2$ of $X*N_{RB}^0$. Alternatively, each CSI-RS port corresponds to $N_{RB}^0$ channel estimation results, and the channel estimation results of each CSI-RS port are used as a row to construct the matrix $\tilde{W}_2$ of $X*N_{RB}^0$. In some embodiments, $\tilde{W}_2$ is a matrix of $X*K$. K is a quantity of vectors included in $\tilde{W}$. In this case, the X Cs form a column vector of $X*1$, and then the column vector is repeated K times to obtain the matrix $\tilde{W}_2$ of $X*K$. In particular, $\tilde{W}_2$ is a vector of $X*1$, and in this case, the X Cs form a column vector of $X*1$, that is, $\tilde{W}_2$.

If the terminal selects $2\tilde{L}$ Cs, the terminal may construct a matrix of $2\tilde{L}*N_{RB}^0$ based on a rule of each CSI-RS port being corresponding to one row. In this case, the $2\tilde{L}$ Cs form a column vector of $2\tilde{L}*1$, and then the column vector is repeated $N_{RB}^0$ times to obtain the matrix $\tilde{W}_2$ of $2\tilde{L}*N_{RB}^0$. Alternatively, each CSI-RS port corresponds to $N_{RB}^0$ channel estimation results, and the channel estimation results of each CSI-RS port are used as a row to construct the matrix $\tilde{W}_2$ of $2\tilde{L}*N_{RB}^0$. In another possible embodiment, $\tilde{W}_2$ is a matrix of $2\tilde{L}*K$. In this case, the $2\tilde{L}$ Cs form a column vector of $2\tilde{L}*1$, and then the column vector is repeated K times to obtain the matrix $\tilde{W}_2$ of $2\tilde{L}*K$. K is a quantity of vectors included in $W_f$. In particular, $\tilde{W}_2$ is a vector of $2\tilde{L}*1$, and in this case, the $2\tilde{L}$ Cs form a column vector of $2\tilde{L}*1$, that is, $\tilde{W}_2$.

In a specific application scenario, in different polarization directions, quantities of ports selected by the terminal may be the same or different. For example, in different polarization directions, quantities of ports selected by the terminal are the same, and sequence numbers of the selected ports are also the same. Alternatively, in different polarization directions, quantities of ports selected by the terminal may be the same, and sequence numbers of the selected ports are different. Alternatively, in different polarization directions, quantities of ports selected by the terminal are different, and sequence numbers of the selected ports are also different. The following provides several possible forms of W1 bp using different scenarios and different $W_f$ designs as examples.

Design 1: $W_f$ is a port selection matrix. For ease of understanding, the following provides a description with reference to a specific example. Specifically, an example in which four CSI-RS ports are selected from 16 CSI-RS ports is used to provide a possible design of W1 and $W_f$ and describe how the terminal feeds back CSI based on this $W_f$. It should be understood that the terminal needs to feed back $W_1$ and $\tilde{W}_2$ when feeding back the CSI. Compared with the conventional technology in which the terminal needs to feed back $W_1$, $\tilde{W}_2$, and $W_f$, this can reduce feedback overheads.

For example, both $W_1$ and $W_f$ are port selection matrices, and respectively satisfy, for example:

$$W1 = \begin{bmatrix} 1 & 0 \\ 0 & 0 \\ 0 & 1 \\ 0 & 0 \end{bmatrix} \text{ and } W_f = \begin{bmatrix} 1 & 0 \\ 0 & 1 \\ 1 & 1 \\ 0 & 0 \end{bmatrix}.$$

A quantity, sent by the base station, of CSI-RS ports is 16, which are divided into four groups, and each group includes four CSI-RS ports. That is, X=16, $M_{Group}$=4, and $\tilde{X}_{Group}$=2. Herein, an element 1 in $W_1$ indicates to select a corresponding CSI-RS port group. The terminal selects a first CSI-RS port group and a third CSI-RS port group based on $W_1$. An element 1 in $W_f$ indicates to select a corresponding CSI-RS port, and an element 0 indicates not to select a corresponding CSI-RS port. Based on $W_f$, the terminal selects CSI-RS ports whose sequence numbers are 1 and 3 in the first CSI-RS port group, and selects CSI-RS ports whose sequence numbers are 2 and 3 in the third CSI-RS port group.

The terminal may perform channel estimation on the CSI-RS, and may obtain a linear superposition coefficient C based on a channel estimation result, and construct $\tilde{W}_2$ based on C. For details, refer to the description of the embodiment in which the terminal constructs $\tilde{W}_2$ in the foregoing design 1. Details are not described herein again. It should be understood that, that the terminal feeds back $\tilde{W}_2$ to the base station means that the feedback information includes $\tilde{W}_2$. Optionally, the feedback information may alternatively indicate $\tilde{W}_2$, which may be indicated directly, or may be indicated indirectly. In some embodiments, the feedback information may further include W1, that is, the feedback information includes W1 and $\tilde{W}_2$.

It should be understood that, in different polarization directions, quantities of port groups selected by the terminal may be the same or different, and sequence numbers of the port groups selected by the terminal may be the same or different. For example, the quantities of the port groups selected by the terminal are the same, and the sequence numbers of the selected port groups are the same. Alternatively, the quantities of the port groups selected by the terminal are the same, and the sequence numbers of the selected port groups are different. Alternatively, the quantities of the port groups selected by the terminal are different, and the sequence numbers of the selected port groups are different.

Scenario 1: The quantities of the port groups selected by the terminal are the same, and the sequence numbers of the selected port groups are the same. For example, $W_1$ may satisfy the following formula:

$$W_1 = \begin{bmatrix} E_{\frac{X_{Group}}{2} \times L_{Group}} & 0 \\ 0 & E_{\frac{X_{Group}}{2} \times L_{Group}} \end{bmatrix}, \text{ where}$$

$$E_{\frac{X_{Group}}{2} \times \tilde{L}_{Group}} = \left[ \begin{array}{cccc} e^{\left(\frac{X_{Group}}{2}\right)} & e^{\left(\frac{X_{Group}}{2}\right)} & \cdots & e^{\left(\frac{X_{Group}}{2}\right)} \\ \mod\left(m_1, \frac{X_{Group}}{2}\right) & \mod\left(m_2, \frac{X_{Group}}{2}\right) & & \mod\left(m_{(\tilde{L}_{Group}^{-1})}, \frac{X_{Group}}{2}\right) \end{array} \right].$$

$X_{Group}$ is a quantity of CSI-RS port groups, $\tilde{L}_{Group}$ is a quantity of CSI-RS port groups selected in one polarization direction, $E_{\frac{X_{Group}}{2} \times \tilde{L}_{Group}}$ is a matrix consisting of $$e^{\left(\frac{X_{Group}}{2}\right)} \mod\left(i, \frac{X_{Group}}{2}\right), \quad e^{\left(\frac{X_{Group}}{2}\right)} \mod\left(i, \frac{X_{Group}}{2}\right)$$

is a vector whose length is $X_{Group}/2$, a $(^{\mod\left(i, \frac{X_{Group}}{2}\right)})^{th}$ element in elements included in the vector is 1 and other elements are 0, i=$m_1, m_2, \ldots, m_{\tilde{L}_{Group}-1}$ and i is an integer greater than or equal to 0.

CSI-RS port groups selected by the terminal may be discontinuous or continuous. As a variation of W1, $W_1$ may satisfy the following formula:

$$W_1 = \left[ \begin{array}{cc} E_{\frac{X_{Group}}{2} \times \tilde{L}_{Group}} & 0 \\ 0 & E_{\frac{X_{Group}}{2} \times \tilde{L}_{Group}} \end{array} \right], \text{ where}$$

$$E_{\frac{X_{Group}}{2} \times \tilde{L}_{Group}} = \left[ \begin{array}{cccc} e^{\left(\frac{X_{Group}}{2}\right)} & e^{\left(\frac{X_{Group}}{2}\right)} & \cdots & e^{\left(\frac{X_{Group}}{2}\right)} \\ \mod\left(m, \frac{X_{Group}}{2}\right) & \mod\left(m+1, \frac{X_{Group}}{2}\right) & & \mod\left(m+\tilde{L}_{Group}-1, \frac{X_{Group}}{2}\right) \end{array} \right],$$

which indicates that the CSI-RS port groups selected by the terminal may be continuous.

Scenario 2: The quantities of the port groups selected by the terminal are the same, and the sequence numbers of the selected port groups are different. For example, $W_1$ may satisfy the following formula:

$$W_1 = \left[ \begin{array}{cc} E_{\frac{X_{Group}}{2} \times \tilde{L}_{Group}} & 0 \\ 0 & \overline{E}_{\frac{X_{Group}}{2} \times \tilde{L}_{Group}} \end{array} \right], \text{ where}$$

$$E_{\frac{X_{Group}}{2} \times \tilde{L}_{Group}} = \left[ \begin{array}{cccc} e^{\left(\frac{X_{Group}}{2}\right)} & e^{\left(\frac{X_{Group}}{2}\right)} & \cdots & e^{\left(\frac{X_{Group}}{2}\right)} \\ \mod\left(m_1, \frac{X_{Group}}{2}\right) & \mod\left(m_2, \frac{X_{Group}}{2}\right) & & \mod\left(m_{\tilde{L}_{Group}-1}, \frac{X_{Group}}{2}\right) \end{array} \right]$$

and $$\overline{E}_{\frac{X_{Group}}{2} \times \tilde{L}_{Group}} = \left[ \begin{array}{cccc} e^{\left(\frac{X_{Group}}{2}\right)} & e^{\left(\frac{X_{Group}}{2}\right)} & \cdots & e^{\left(\frac{X_{Group}}{2}\right)} \\ \mod\left(n_1, \frac{X_{Group}}{2}\right) & \mod\left(n_2, \frac{X_{Group}}{2}\right) & & \mod\left(n_{\tilde{L}_{Group}-1}, \frac{X_{Group}}{2}\right) \end{array} \right].$$

$X_{Group}$ is a quantity of CSI-RS port groups, and $\tilde{L}_{Group}$ is a quantity of CSI-RS port groups selected in one polarization direction.

$E_{\frac{X_{Group}}{2} \times \tilde{L}_{Group}}$ is a matrix consisting of $$e^{\left(\frac{X_{Group}}{2}\right)} \mod\left(i, \frac{X_{Group}}{2}\right), \quad e^{\left(\frac{X_{Group}}{2}\right)} \mod\left(i, \frac{X_{Group}}{2}\right)$$

is a vector whose length is $X_{Group}/2$, a $(^{\mod\left(i, \frac{X_{Group}}{2}\right)})^{th}$ element in elements included in the vector is 1 and other elements are 0, i=$m_1, m_2, \ldots, m_{\tilde{L}_{Group}-1}$, and i is an integer greater than or equal to 0.

$\overline{E}_{\frac{X_{Group}}{2} \times \tilde{L}_{Group}}$ is a matrix consisting of $$e^{\left(\frac{X_{Group}}{2}\right)}\operatorname{mod}\left(i,\frac{X_{Group}}{2}\right), \quad e^{\left(\frac{X_{Group}}{2}\right)}\operatorname{mod}\left(i,\frac{X_{Group}}{2}\right)$$

is a vector whose length is $X_{Group}/2$, a $$\left(^{mod\left(i,\frac{X_{Group}}{2}\right)}\right)^{th}$$

element in elements included in the vector is 1 and other elements are 0, $i=n_1, n_2, \ldots, m_{\tilde{L}_{Group}-1}$, and i is an integer greater than or equal to 0.

It should be understood that CSI-RS port groups selected by the terminal may be discontinuous or continuous. As a variation of W1, $W_1$ satisfies the following formula:

$$W_1 = \begin{bmatrix} E_{\frac{X_{Group}}{2} \times \tilde{L}_{Group}} & 0 \\ 0 & \overline{E}_{\frac{X_{Group}}{2} \times \tilde{L}_{Group}} \end{bmatrix}, \text{ where}$$

$$E_{\frac{X_{Group}}{2} \times \tilde{L}_{Group}} = \begin{bmatrix} e^{\left(\frac{X_{Group}}{2}\right)}\operatorname{mod}\left(m,\frac{X_{Group}}{2}\right) & e^{\left(\frac{X_{Group}}{2}\right)}\operatorname{mod}\left(m,\frac{X_{Group}}{2}\right) & \cdots & e^{\left(\frac{X_{Group}}{2}\right)}\operatorname{mod}\left(m+\tilde{L}_{Group}-1,\frac{X_{Group}}{2}\right) \end{bmatrix},$$

and $$\overline{E}_{\frac{X_{Group}}{2} \times \tilde{L}_{Group}} = \begin{bmatrix} e^{\left(\frac{X_{Group}}{2}\right)}\operatorname{mod}\left(n_1,\frac{X_{Group}}{2}\right) & e^{\left(\frac{X_{Group}}{2}\right)}\operatorname{mod}\left(n_2,\frac{X_{Group}}{2}\right) & \cdots & e^{\left(\frac{X_{Group}}{2}\right)}\operatorname{mod}\left(n+\tilde{L}_{Group}-1,\frac{X_{Group}}{2}\right) \end{bmatrix}.$$

Scenario 3: In different polarization directions, quantities of port groups selected by the terminal are different, and sequence numbers of the selected port groups are different. Dimensions of $W_1$ are $X_{Group}*L_{Group}$, $L_{Group} \leq X_{Group}$, $X_{Group}$ is used to indicate a quantity of CSI-RS port groups, and $L_{Group}$ is a quantity of selected CSI-RS port groups.

In a possible implementation, $W_1$ may be selected from a matrix. For example, W1 is a subset of $F_{X_{Group} \times X_{Group}}$ dimensions of $F_{X_{Group} \times X_{Group}}$ are $X_{Group}*X_{Group}$, and the following formula is met:

$F_{X_{Group} \times X_{Group}} [e^{(X_{Group})}{}_0 \ e^{(X_{Group})}{}_1 \ldots e^{(X_{Group})}{}_{(X_{Group}-1)}]$, where $e^{(X_{Group})}{}_i$ is a vector whose length is $X_{Group}$, an $i^{th}$ element in $F_{X_{Group} \times X_{Group}}$ is 1 and all remaining elements are 0, and $i=0, 1, \ldots, X_{Group}-1$.

It should be understood that CSI-RS port groups selected by the terminal may be discontinuous or continuous. As a variation of W1, $W_1$ satisfies the following formula:

$$W_1 = \left[e^{(X_{Group})}_{mod(m,X_{Group})}, \ldots, e^{(X_{Group})}_{mod(m+(L_{Group}-1),X_{Group})}\right],$$

which indicates that the CSI-RS port groups selected by the terminal may be continuous.

Design 2: $W_f$ is one or a plurality of specific column vectors. A specific form of W1 also varies with different application scenarios. The following separately describes several possible implementation forms of W1.

Scenario 1: Quantities of ports selected by the terminals are the same, and sequence numbers of the selected ports are the same. In this way, once a port in one polarization direction is selected, a port in another polarization direction needs to copy only the port selected in the previous polarization direction. This implementation is relatively simple. For example, $W_1$ may satisfy the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{ where}$$

$$E_{\frac{X}{2} \times \tilde{L}} = \begin{bmatrix} e^{\left(\frac{X}{2}\right)}\operatorname{mod}\left(m_1,\frac{X}{2}\right) & e^{\left(\frac{X}{2}\right)}\operatorname{mod}\left(m_2,\frac{X}{2}\right) & \cdots & e^{\left(\frac{X}{2}\right)}\operatorname{mod}\left(m_{\tilde{L}-1},\frac{X}{2}\right) \end{bmatrix}.$$

X is the quantity of CSI-RS ports, $\tilde{L}$ is a quantity of CSI-RS ports selected in one polarization direction, $$E_{\frac{X}{2} \times \tilde{L}}$$

is a matrix consisting of $$e^{\left(\frac{X}{2}\right)}\operatorname{mod}\left(i,\frac{X}{2}\right), \quad e^{\left(\frac{X}{2}\right)}\operatorname{mod}\left(i,\frac{X}{2}\right)$$

is a vector whose length is X/2, a $$\left(^{mod\left(i,\frac{X}{2}\right)}\right)^{th}$$

element in elements included in the vector is 1 and other elements are 0, $i=m_1, m_2, \ldots, m_{\tilde{L}-1}$, and i is an integer greater than or equal to 0.

It should be understood that, X is a quantity, sent by the base station, of CSI-RS ports, $\tilde{L}$ is a quantity of CSI-RS ports selected by the terminal in one polarization direction, and the $$\left(^{mod\left(i,\frac{X}{2}\right)}\right)^{th}$$

element in $$e^{\left(\frac{X}{2}\right)}_{\mod\left(i,\frac{X}{2}\right)}$$

is 1, and may indicate to select a corresponding CSI-RS port.

CSI-RS ports selected by the terminal may be discontinuous or continuous. As a variation of W1, $W_1$ may satisfy the following formula:

$$W_1 = \begin{bmatrix} E_{\frac{X}{2} \times L} & 0 \\ 0 & E_{\frac{X}{2} \times L} \end{bmatrix}, \text{ where}$$

$$E_{\frac{X}{2} \times L} = \begin{bmatrix} e^{\left(\frac{X}{2}\right)}_{\mod\left(m,\frac{X}{2}\right)} & e^{\left(\frac{X}{2}\right)}_{\mod\left(m+1,\frac{X}{2}\right)} & \cdots & e^{\left(\frac{X}{2}\right)}_{\mod\left(m+\tilde{L}-1,\frac{X}{2}\right)} \end{bmatrix},$$

which indicates that the CSI-RS ports selected by the terminal may be continuous.

For ease of understanding, the following provides a description with reference to a specific example. Specifically, an example in which four CSI-RS ports are selected from 16 CSI-RS ports is used.

Both $W_1$ and $W_f$ are port selection matrices, and respectively satisfy, for example:

$$W_1 = \begin{bmatrix} 1 & 0 & 0 & 0 \\ 0 & 0 & 0 & 0 \\ 0 & 1 & 0 & 0 \\ 0 & 0 & 0 & 0 \\ \vdots & \vdots & \vdots & \vdots \\ 0 & 0 & 1 & 0 \\ 0 & 0 & 0 & 0 \\ 0 & 0 & 0 & 1 \\ 0 & 0 & 0 & 0 \\ \vdots & \vdots & \vdots & \vdots \end{bmatrix} \text{ and } W_f = \begin{bmatrix} 1 \\ 1 \\ \vdots \\ 1 \end{bmatrix}.$$

It should be understood that, $W_1$ is a 16*4 matrix, the foregoing $W_1$ shows only eight rows, and the remaining eight rows are represented by using "⋮⋮⋮⋮". It should be understood that "⋮⋮⋮⋮" represents a matrix of 4*4 in which all elements are 0. If the dimensions of $W_1$ are X*L, X=16, which represents a quantity of CSI-RS ports, and L=4, which represents a quantity of selected CSI-RS ports. If the dimensions of $W_1$ are $(2\tilde{X})*(2\tilde{L})$, $\tilde{X}=8$, which represents a quantity of CSI-RS ports in one polarization direction, and E=2, which represents a quantity of CSI-RS ports selected in one polarization direction. Herein, an element 1 in $W_1$ indicates to select a corresponding CSI-RS port. It may be understood that the first eight elements of each column vector of $W_1$ correspond to one polarization direction, and the last eight elements of each column vector of $W_1$ correspond to another polarization direction. The terminal selects one port from each column vector based on $W_1$, that is, selects a first CSI-RS port from the first eight CSI-RSs of a first column vector, selects a third CSI-RS port from the first eight CSI-RSs of a second column vector, selects a first CSI-RS port from the last eight CSI-RS ports of a third column vector, and selects a third CSI-RS port from the last eight CSI-RS ports of a fourth column vector. That is, the quantities of the selected ports are the same and the sequence numbers of the selected ports are the same. It should be understood that, in this specification, that the sequence numbers of the selected ports are the same is described relative to two polarization directions, that is, a sequence number of a port selected in one polarization direction is the same as a sequence number of a port selected in the other polarization direction.

The terminal may perform channel estimation on the CSI-RS, and may obtain a linear superposition coefficient C based on a channel estimation result, and construct $\tilde{W}_2$ based on C. For details, refer to the description of the embodiment in which the terminal constructs $\tilde{W}_2$ in the foregoing design 1. In this case, dimensions of $\tilde{W}_2$ are 4*1, and details are not described herein again.

Scenario 2: Quantities of ports selected by the terminal are the same, and sequence numbers of the selected ports are different, so that a port can be selected relatively freely, thereby improving system performance. For example, $W_1$ may satisfy the following formula:

$$W_1 = \begin{bmatrix} E_{\frac{X}{2} \times \tilde{L}} & 0 \\ 0 & \overline{E}_{\frac{X}{2} \times \tilde{L}} \end{bmatrix}, \text{ where}$$

$$E_{\frac{X}{2} \times \tilde{L}} = \begin{bmatrix} e^{\left(\frac{X}{2}\right)}_{\mod\left(m_1,\frac{X}{2}\right)} & e^{\left(\frac{X}{2}\right)}_{\mod\left(m_2,\frac{X}{2}\right)} & \cdots & e^{\left(\frac{X}{2}\right)}_{\mod\left(m_{\tilde{L}-1},\frac{X}{2}\right)} \end{bmatrix},$$

and $$\overline{E}_{\frac{X}{2} \times \tilde{L}} = \begin{bmatrix} e^{\left(\frac{X}{2}\right)}_{\mod\left(n_1,\frac{X}{2}\right)} & e^{\left(\frac{X}{2}\right)}_{\mod\left(n_2,\frac{X}{2}\right)} & \cdots & e^{\left(\frac{X}{2}\right)}_{\mod\left(n_{\tilde{L}-1},\frac{X}{2}\right)} \end{bmatrix},$$

where X is the quantity of CSI-RS ports, and $\tilde{L}$ is a quantity of CSI-RS ports selected in one polarization direction;

$$E_{\frac{X}{2} \times \tilde{L}}$$

is a matrix consisting of $$e^{\left(\frac{X}{2}\right)}_{\mod\left(i,\frac{X}{2}\right)}, \quad e^{\left(\frac{X}{2}\right)}_{\mod\left(i,\frac{X}{2}\right)}$$

is a vector whose length is X/2, a $$\overline{E}_{\frac{X}{2} \times \tilde{L}}$$

element in elements included in the vector is 1 and other elements are 0, i=$m_1$, $m_2$, . . . , $m_{\tilde{L}-1}$ and i is an integer greater than or equal to 0; and $$\left(\mod\left(i,\frac{X}{2}\right)\right)^{th}$$

is a matrix consisting of $$e_{\mod\left(i,\frac{X}{2}\right)}^{\left(\frac{X}{2}\right)}, \quad e_{\mod\left(i,\frac{X}{2}\right)}^{\left(\frac{X}{2}\right)}$$

is a vector whose length is X/2, a $$\left(\mod\left(i,\frac{X}{2}\right)\right)^{th}$$

element in elements included in the vector is 1 and other elements are 0, $i=n_1, n_2, \ldots, n_{\tilde{L}-1}$, and i is an integer greater than or equal to 0.

It should be understood that CSI-RS ports selected by the terminal may be discontinuous or continuous. As a variation of W1, $W_1$ satisfies the following formula:

$$W_1 = \begin{bmatrix} E_{\frac{X}{2} \times \tilde{L}} & 0 \\ 0 & \overline{E}_{\frac{X}{2} \times \tilde{L}} \end{bmatrix}, \text{ where}$$

$$E_{\frac{X}{2} \times \tilde{L}} = \begin{bmatrix} e_{\mod\left(m_1,\frac{X}{2}\right)}^{\left(\frac{X}{2}\right)} & e_{\mod\left(m_2,\frac{X}{2}\right)}^{\left(\frac{X}{2}\right)} & \ldots & e_{\mod\left(m_{\tilde{L}-1},\frac{X}{2}\right)}^{\left(\frac{X}{2}\right)} \end{bmatrix},$$

and $$\overline{E}_{\frac{X}{2} \times \tilde{L}} = \begin{bmatrix} e_{\mod\left(n_1,\frac{X}{2}\right)}^{\left(\frac{X}{2}\right)} & e_{\mod\left(n_2,\frac{X}{2}\right)}^{\left(\frac{X}{2}\right)} & \ldots & e_{\mod\left(n_{\tilde{L}-1},\frac{X}{2}\right)}^{\left(\frac{X}{2}\right)} \end{bmatrix},$$

For ease of understanding, the following provides a description with reference to a specific example. Specifically, an example in which four CSI-RS ports are selected from 16 CSI-RS ports is used.

Both $W_1$ and $W_f$ are port selection matrices, and respectively satisfy, for example:

$$W_1 = \begin{bmatrix} 1 & 0 & 0 & 0 \\ 0 & 0 & 0 & 0 \\ 0 & 1 & 0 & 0 \\ 0 & 0 & 0 & 0 \\ \vdots & \vdots & \vdots & \vdots \\ 0 & 0 & 0 & 0 \\ 0 & 0 & 1 & 0 \\ 0 & 0 & 0 & 0 \\ 0 & 0 & 0 & 1 \end{bmatrix} \text{ and } W_f = \begin{bmatrix} 1 \\ 1 \\ \vdots \\ 1 \end{bmatrix}.$$

It should be understood that, $W_1$ is a 16*4 matrix, the foregoing $W_1$ shows only eight rows, and the remaining eight rows are represented by using "::::", "::::" represents a matrix of 8*4 in which all elements are 0. If the dimensions of $W_1$ are X*L, X=16, which represents a quantity of CSI-RS ports, and L=4, which represents a quantity of selected CSI-RS ports. If the dimensions of $W_1$ are $(2\tilde{X})*(2\tilde{L})$, $\tilde{X}=8$, which represents a quantity of CSI-RS ports in one polarization direction, and $\tilde{L}=2$, which represents a quantity of CSI-RS ports selected in one polarization direction. Herein, an element 1 in $W_1$ indicates to select a corresponding CSI-RS port. It may be understood that the first eight elements of each column vector of $W_1$ correspond to one polarization direction, and the last eight elements of each column vector of $W_1$ correspond to another polarization direction. The terminal selects one port from each column vector based on $W_1$, that is, selects a first CSI-RS port from the first eight CSI-RSs of a first column vector, selects a third CSI-RS port from the first eight CSI-RSs of a second column vector, selects a sixth CSI-RS port from the last eight CSI-RS ports of a third column vector, and selects an eighth CSI-RS port from the last eight CSI-RS ports of a fourth column vector. That is, the quantities of the selected ports are the same and the sequence numbers of the selected ports are different.

The terminal may perform channel estimation on the CSI-RS, and may obtain a linear superposition coefficient C based on a channel estimation result, and construct $\tilde{W}_2$ based on C. For details, refer to the description of the embodiment in which the terminal constructs $\tilde{W}_2$ in the foregoing design 1. In this case, dimensions of $\tilde{W}_2$ are 4*1, and details are not described herein again.

Scenario 3: In different polarization directions, quantities of ports selected by the terminal are different, and sequence numbers of the selected ports are different, so that a port can be selected more freely, thereby further improving system performance. For example, dimensions of $W_1$ are X*L, L≤X, X is used to indicate the quantity of CSI-RS ports, and L is a quantity of selected CSI-RS ports.

In a possible implementation, $W_1$ may be selected from a matrix. For example, W1 is a subset of $F_{X \times X}$. Dimensions of $F_{X \times X}$ are X*X, and $$F_{X \times X} = \begin{bmatrix} e_0^{(X)} & e_1^{\left(\frac{X}{2}\right)} & \ldots & e_{(X-1)}^{\left(\frac{X}{2}\right)} \end{bmatrix}.$$

$e^{(X)}_i$ is a vector whose length is X, an $i^{th}$ element in $F_{X \times X}$ is 1 and all remaining elements are 0, and i=0, 1, ..., X−1.

It should be understood that CSI-RS ports selected by the terminal may be discontinuous or continuous. As a variation of W1, $W_1$ satisfies the following formula:

$W_1 = [e_{\mod(m,X)}^{(X)}, \ldots, e_{\mod(m+(L-1),X)}^{(X)}]$, which indicates that the CSI-RS ports selected by the terminal may be continuous.

For ease of understanding, the following provides a description with reference to a specific example. Specifically, an example in which four CSI-RS ports are selected from 16 CSI-RS ports is used.

Both $W_1$ and $W_f$ are port selection matrices, and respectively satisfy, for example:

$$W_1 = \begin{bmatrix} 1 & 0 & 0 & 0 \\ 0 & 0 & 1 & 0 \\ 0 & 1 & 0 & 0 \\ 0 & 0 & 0 & 0 \\ \vdots & \vdots & \vdots & \vdots \\ 0 & 0 & 0 & 0 \\ 0 & 0 & 0 & 0 \\ 0 & 0 & 0 & 1 \\ 0 & 0 & 0 & 0 \\ \vdots & \vdots & \vdots & \vdots \end{bmatrix} \text{ and } W_f = \begin{bmatrix} 1 \\ 1 \\ \vdots \\ 1 \end{bmatrix}.$$

It should be understood that, $W_1$ is a 16*4 matrix, the foregoing $W_1$ shows only eight rows, and the remaining eight rows are represented by using "::::". It should be understood that "::::" represents a matrix of 4*4 in which all elements are 0. $W_1$ may be selected from F. For example, F may be a diagonal matrix. If the dimensions of $W_1$ are X*L, X=16, which represents a quantity of CSI-RS ports, and L=4, which represents a quantity of selected CSI-RS ports. If the dimensions of $W_1$ are $(2\tilde{X})*(2\tilde{L})$, X=8, which represents a quantity of CSI-RS ports in one polarization direction, and L=2, which represents a quantity of CSI-RS ports selected in one polarization direction. Herein, an element 1 in $W_1$ indicates to select a corresponding CSI-RS port. It may be understood that the first eight elements of each column vector of $W_1$ correspond to one polarization direction, and the last eight elements of each column vector of $W_1$ correspond to another polarization direction. Based on $W_1$, the terminal selects a first CSI-RS port from the first eight CSI-RSs of a first column vector, selects a third CSI-RS port from the first eight CSI-RSs of a second column vector, selects a second CSI-RS port from the first eight CSI-RS ports of a third column vector, and selects a third CSI-RS port from the last eight CSI-RS ports of a fourth column vector. That is, the quantities of the selected ports are different and the sequence numbers of the selected ports are different.

The terminal may perform channel estimation on the CSI-RS, and may obtain a linear superposition coefficient C based on a channel estimation result, and construct $\tilde{W}_2$ based on C. For details, refer to the description of the embodiment in which the terminal constructs $\tilde{W}_2$ in the foregoing design 1. In this case, dimensions of $\tilde{W}_2$ are 4*1, and details are not described herein again.

Similarly, the terminal may construct a matrix $\tilde{W}_2$ of $X*N_{RB}^0$ in the manner in the scenario 2, and details are not described herein again. It should be noted that, the foregoing uses the design 2 as an example to describe several possible implementation forms of $W_1$. The several possible implementation forms of $W_1$ are also applicable to the design 3, and a difference lies in that $W_f$ in the design 3 is selected from a DFT matrix. Therefore, for an implementation form of $W_1$ in the design 3, refer to the implementation of $W_1$ in the design 2. Details are not described herein again.

An embodiment of this application further provides a codebook for obtaining CSI based on angle and delay reciprocity of an uplink channel and a downlink channel. For a distinguishing purpose, the codebook is referred to as a second codebook. The second codebook W satisfies a formula $W = W_1 \tilde{W}_2$. $W_1$ is a port selection matrix, and $\tilde{W}_2$ is a linear superposition coefficient matrix. In this case, first indication information may be used to indicate the port selection matrix, which is represented by $W_1$. Different $W_1$ corresponds to different second codebooks. From this perspective, the first indication information may indirectly indicate $W_1$ by indicating the second codebook.

For a specific implementation of the first indication information, refer to the foregoing several implementations of the first indication information in the foregoing embodiment. Details are not described herein again.

For example, dimensions of $W_1$ are X*L, L≤X, X is used to indicate the quantity of CSI-RS ports, $\tilde{L}$ is a quantity of selected CSI-RS ports, and both X and L are integers greater than or equal to 1. Alternatively, the dimensions of $W_1$ are $(2*\tilde{X})*(2*\tilde{L})$, $\tilde{L} \leq \tilde{X}$, $\tilde{X}$ is used to indicate a quantity of CSI-RS ports in one polarization direction, $\tilde{L}$ is a quantity of CSI-RS ports selected in one polarization direction, and both $\tilde{X}$ and $\tilde{L}$ are integers greater than or equal to 1.

Similar to the foregoing embodiment, in this solution, in different polarization directions, quantities of ports selected by the terminal may be the same or different, and sequence numbers of the selected ports may be the same or different.

For different application scenarios, several design solutions of $W_1$ are provided respectively.

For example, the quantities of the ports selected by the terminal are the same, and the sequence numbers of the selected ports are the same. $W_1$ may satisfy the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{ where}$$

$$E_{\frac{X}{2} \times \tilde{L}} = \begin{bmatrix} e^{\left(\frac{X}{2}\right)}_{\mod\left(m_1, \frac{X}{2}\right)} & e^{\left(\frac{X}{2}\right)}_{\mod\left(m_2, \frac{X}{2}\right)} & \cdots & e^{\left(\frac{X}{2}\right)}_{\mod\left(m_{\tilde{L}-1}, \frac{X}{2}\right)} \end{bmatrix}.$$

X is the quantity of CSI-RS ports, $\tilde{L}$ is a quantity of CSI-RS ports selected in one polarization direction, $$E_{\frac{X}{2} \times \tilde{L}}$$

is a matrix consisting of $$e^{\left(\frac{X}{2}\right)}_{\mod\left(i, \frac{X}{2}\right)}, \quad e^{\left(\frac{X}{2}\right)}_{\mod\left(i, \frac{X}{2}\right)}$$

is a vector whose length is X/2, $$\left(\mod\left(i, \frac{X}{2}\right)\right)^{th}$$

a element in elements included in the vector is 1 and other elements are 0, $i = m_1, m_2, \ldots, m_{\tilde{L}-1}$, and i is an integer greater than or equal to 0.

It should be understood that, X is a quantity, sent by the base station, of CSI-RS ports, $\tilde{L}$ is a quantity of CSI-RS ports selected by the terminal in one polarization direction, and the $$\left(\mod\left(i, \frac{X}{2}\right)\right)^{th}$$

element in $$e^{\left(\frac{X}{2}\right)}_{\mod\left(i, \frac{X}{2}\right)}$$

is 1, and may indicate to select a corresponding CSI-RS port.

CSI-RS ports selected by the terminal may be discontinuous or continuous. As a variation of W1, $W_1$ may satisfy the following formula:

$$W_1 = \begin{bmatrix} E_{\frac{X}{2} \times L} & 0 \\ 0 & E_{\frac{X}{2} \times L} \end{bmatrix}, \text{ where}$$

$$E_{\frac{X}{2} \times L} = \begin{bmatrix} e^{\left(\frac{X}{2}\right)}_{\mod\left(m, \frac{X}{2}\right)} & e^{\left(\frac{X}{2}\right)}_{\mod\left(m+1, \frac{X}{2}\right)} & \cdots & e^{\left(\frac{X}{2}\right)}_{\mod\left(m+\tilde{L}-1, \frac{X}{2}\right)} \end{bmatrix},$$

which indicates that the CSI-RS ports selected by the terminal may be continuous.

For another example, the quantities of the ports selected by the terminal are the same, and the sequence numbers of the selected ports are different. $W_1$ may satisfy the following formula:

$$W_1 = \begin{bmatrix} E_{\frac{X}{2} \times L} & 0 \\ 0 & \overline{E}_{\frac{X}{2} \times L} \end{bmatrix}, \text{ where}$$

$$E_{\frac{X}{2} \times L} = \begin{bmatrix} e^{\left(\frac{X}{2}\right)}_{\mod\left(m_1, \frac{X}{2}\right)} & e^{\left(\frac{X}{2}\right)}_{\mod\left(m_2, \frac{X}{2}\right)} & \cdots & e^{\left(\frac{X}{2}\right)}_{\mod\left(m_{\tilde{L}-1}, \frac{X}{2}\right)} \end{bmatrix}, \text{ and}$$

$$\overline{E}_{\frac{X}{2} \times L} = \begin{bmatrix} e^{\left(\frac{X}{2}\right)}_{\mod\left(n_1, \frac{X}{2}\right)} & e^{\left(\frac{X}{2}\right)}_{\mod\left(n_2, \frac{X}{2}\right)} & \cdots & e^{\left(\frac{X}{2}\right)}_{\mod\left(n_{\tilde{L}-1}, \frac{X}{2}\right)} \end{bmatrix},$$

where X is the quantity of CSI-RS ports, and $\tilde{L}$ is a quantity of CSI-RS ports selected in one polarization direction;

$$E_{\frac{X}{2} \times L}$$

is a matrix consisting of $$e^{\left(\frac{X}{2}\right)}_{\mod\left(i, \frac{X}{2}\right)}, \quad e^{\left(\frac{X}{2}\right)}_{\mod\left(i, \frac{X}{2}\right)}$$

is a vector whose length is X/2, $$\left(\mod\left(i, \frac{X}{2}\right)\right)^{th}$$

a element in elements included in the vector is 1 and other elements are 0, i=$m_1$, $m_2$, ..., $m_{\tilde{L}-1}$, and i is an integer greater than or equal to 0; and $$\overline{E}_{\frac{X}{2} \times L}$$

is a matrix consisting of $$e^{\left(\frac{X}{2}\right)}_{\mod\left(i, \frac{X}{2}\right)}, \quad e^{\left(\frac{X}{2}\right)}_{\mod\left(i, \frac{X}{2}\right)}$$

is a vector whose length is X/2, a $$\left(\mod\left(i, \frac{X}{2}\right)\right)^{th}$$

element in elements included in the vector is 1 and other elements are 0, i=$n_1$, $n_2$, ..., $n_{\tilde{L}-1}$, and i is an integer greater than or equal to 0.

It should be understood that CSI-RS ports selected by the terminal may be discontinuous or continuous. As a variation of W1, $W_1$ satisfies the following formula:

$$W_1 = \begin{bmatrix} E_{\frac{X}{2} \times \tilde{L}} & 0 \\ 0 & \overline{E}_{\frac{X}{2} \times \tilde{L}} \end{bmatrix}, \text{ where}$$

$$E_{\frac{X}{2} \times \tilde{L}} = \begin{bmatrix} e^{\left(\frac{X}{2}\right)}_{\mod\left(m, \frac{X}{2}\right)} & e^{\left(\frac{X}{2}\right)}_{\mod\left(m+1, \frac{X}{2}\right)} & \cdots & e^{\left(\frac{X}{2}\right)}_{\mod\left(m+\tilde{L}-1, \frac{X}{2}\right)} \end{bmatrix}, \text{ and}$$

$$\overline{E}_{\frac{X}{2} \times \tilde{L}} = \begin{bmatrix} e^{\left(\frac{X}{2}\right)}_{\mod\left(n, \frac{X}{2}\right)} & e^{\left(\frac{X}{2}\right)}_{\mod\left(n+1, \frac{X}{2}\right)} & \cdots & e^{\left(\frac{X}{2}\right)}_{\mod\left(n+\tilde{L}-1, \frac{X}{2}\right)} \end{bmatrix}.$$

For still another example, in different polarization directions, quantities of ports selected by the terminal are different, and sequence numbers of the selected ports are different. $W_1$ may be selected from a matrix. For example, W1 is a subset of $F_{X \times X}$, dimensions of $F_{X \times X}$ are X*X, and $F_{X \times X} = [e^{(X)}_0 \ e^{(X)}_1 \ \ldots \ e^{(X)}_{(X-1)}]$. For example, $e^{(X)}_i$ is a vector whose length is X, an $i^{th}$ element in $F_{X \times X}$ is 1 and all remaining elements are 0, and i=0, 1, ..., X−1.

It should be understood that CSI-RS ports selected by the terminal may be discontinuous or continuous. As a variation of W1, $W_1$ satisfies the following formula:

$W_1 = [e^{(X)}_{\mod(m, X)}, \ldots, e^{(X)}_{\mod(m+(L-1), X)}]$, which indicates that the CSI-RS ports selected by the terminal may be continuous.

For a specific implementation in which the terminal obtains CSI based on W1 in the foregoing three examples, refer to the description of the related embodiment of W1 in the first codebook. Details are not described herein again.

In solutions provided in embodiments of this application, for example, the foregoing design solutions of the first codebook or the foregoing design solutions of the second codebook, the terminal may feed back CSI based on the angle and delay reciprocity of the uplink channel and the downlink channel, thereby reducing feedback overheads.

In the foregoing embodiments provided in this application, methods provided in embodiments of this application are separately described from perspectives of the terminal, the base station, and interaction between the terminal and the base station. To implement functions in the methods provided in the foregoing embodiments of this application, the terminal and the base station may include a hardware structure and/or a software module, to implement the functions in a form of the hardware structure, the software module, or the hardware structure plus the software module.

The following describes, with reference to accompanying drawings, communications apparatuses used to implement the foregoing methods in embodiments of this application. Therefore, the foregoing content may be used in subsequent embodiments, and repeated content is not described again.

Figure 4:
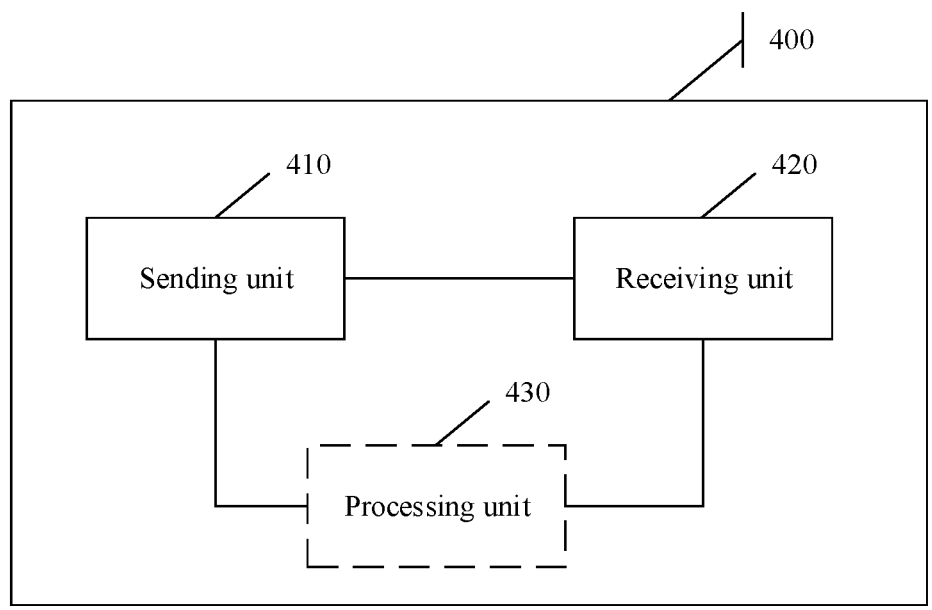
FIG. 4 is a schematic diagram of a structure of a communications apparatus according to an embodiment of this application.

FIG. 4 is a schematic diagram of a structure of a communications apparatus 400. The communications apparatus 400 may correspondingly implement functions or steps implemented by the terminal or the network device in the foregoing method embodiments. The communications apparatus may include a sending unit 410 and a receiving unit 420, and optionally, may further include a processing unit 430, which is illustrated by a dashed line in FIG. 4. Optionally, a storage unit may be further included. The storage unit may be configured to store instructions (code or a program) and/or data. The sending unit 410, the receiving unit 420, and the processing unit 430 may be coupled to the storage unit. For example, the processing unit 430 may read the instructions (code or program) and/or data in the storage unit, to implement a corresponding method. The foregoing units may be independently disposed, or some or all may be integrated. For example, the sending unit 410 and the receiving unit 420 may be integrated, and referred to as a transceiver unit.

In some possible implementations, the communications apparatus 400 can correspondingly implement behavior and functions of the terminal in the foregoing method embodiments. For example, the communications apparatus 400 may be a terminal, or may be a component (for example, a chip or a circuit) used in the terminal. The sending unit 410 and the receiving unit 420 may be configured to perform all receiving or sending operations performed by the terminal in the embodiment shown in FIG. 3, for example, S301 and S302 in the embodiment shown in FIG. 3, and/or configured to support another process of the technology described in this specification. The processing unit 430 is configured to perform all operations performed by the terminal except the receiving and sending operations in the embodiment shown in FIG. 3, and/or configured to support another process of the technology described in this specification.

In some embodiments, the receiving unit 420 is configured to receive first indication information from a base station. The first indication information is used to indicate a type of a right multiplication matrix in a first codebook, and the first codebook satisfies a formula $W=W_1 \tilde{W}_2 W_f^H$ is the first codebook, $W_1$ is a port selection matrix, $\tilde{W}_2$ is a linear superposition coefficient matrix, $W_f$ is the right multiplication matrix, and is used by the terminal to determine channel state information based on the first codebook.

The sending unit 410 is configured to send the channel state information to the base station.

In some other possible implementations, the communications apparatus 400 can correspondingly implement behavior and functions of the network device in the foregoing method embodiments. For example, the communications apparatus 400 may be a network device, or may be a component (for example, a chip or a circuit) used in the network device. The sending unit 410 and the receiving unit 420 may be configured to perform all receiving or sending operations performed by the base station in the embodiment shown in FIG. 3, for example, S301 and S302 in the embodiment shown in FIG. 3, and/or configured to support another process of the technology described in this specification. The processing unit 430 is configured to perform all operations performed by the network device except the receiving and sending operations in the embodiment shown in FIG. 3, and/or configured to support another process of the technology described in this specification.

In some embodiments, the receiving unit 420 is configured to receive channel state information from a terminal. The channel state information includes first indication information.

The processing unit 430 is configured to determine a precoding matrix based on the first indication information and a first codebook. The first codebook satisfies a formula $W=W_1 \tilde{W}_2 W_f^H$. W is the first codebook, $W_1$ is a port selection matrix, $\tilde{W}_2$ is a linear superposition coefficient matrix, and the first indication information is used to indicate a type of $W_f$.

In some optional implementations, the first indication information may be carried in existing signaling. For example, the first indication information is carried in a CSI reporting band CSI-ReportingBand field of RRC signaling. For example, a value of the CSI-ReportingBand field is 0, indicating that the terminal obtains the CSI based on angle and delay reciprocity of an uplink channel and a downlink channel, or indicating the codebook used by the terminal to obtain the CSI based on the angle and delay reciprocity of the uplink channel and the downlink channel. This facilitates compatibility with existing RRC signaling.

In embodiments of the first aspect and the second aspect, $W_f$ includes but is not limited to the following several designs.

Design 1: $W_f$ is a port selection matrix. That is, the first indication information is used to indicate that the type of $W_f$ is a port selection matrix.

Design 2: $W_f$ is one or a plurality of specific column vectors. That is, the first indication information is used to indicate that the type of $W_f$ is one or a plurality of specific column vectors. For example, $W_f$ is a column vector in which all elements are 1, or $W_f$ includes a column vector in which all elements are 1. In this design solution, a channel state information reference signal (CSI-RS) port group does not need to be distinguished, thereby reducing complexity.

Design 3: $W_f$ is a DFT matrix, and includes a column vector in which all elements are 1. That is, the first indication information is used to indicate that the type of $W_f$ is a DFT matrix. Based on this design solution, the network side further needs to indicate, to the terminal, a column vector that needs to be used, for example, the column vector in which all elements are 1 in the DFT matrix. In a possible implementation, the first indication information may further indicate the column vector in which all elements are 1. Alternatively, when the communications apparatus is the network device, the sending unit included in the communications apparatus sends second indication information to the terminal, the terminal receives the second indication information, and the second indication information indicates the column vector in which all elements are 1 in the DFT matrix. Alternatively, when the communications apparatus is the terminal, the receiving unit included in the communications apparatus receives second indication information from the network device, and the second indication information indicates the column vector in which all elements are 1 in the DFT matrix.

Specifically, $W_1$ in the first codebook is used to select one or a plurality of channel state information reference signal (CSI-RS) port groups, and $W_f$ is used to select one or more CSI-RS ports in the CSI-RS port group or the plurality of CSI-RS port groups.

It should be understood that $W_1$ is used to select a CSI-RS port group, and one or a plurality of CSI-RS port groups may be selected. If $W_1$ selects the CSI-RS port group, $W_f$ selects one or more CSI-RS ports in the CSI-RS port group. If $W_1$ selects the plurality of CSI-RS port groups, $W_f$ may select different or same ports for different CSI-RS port groups. For example, $W_f$ may indicate a sequence number of a CSI-RS port, to indicate to select CSI-RS ports corresponding to the sequence number in all CSI-RS port groups, that is, CSI-RS ports selected in all CSI-RS port groups are the same.

In some optional implementations, $W_f$ is a port selection matrix, a length of a column vector of $W_f$ may be $M_{Group}$, a length of a column vector of $W_1$ may be $2\tilde{X}_{Group}$, $M_{Group} * \tilde{X}_{Group} = X/2$, X is used to indicate a quantity of CSI-RS ports, $M_{Group}$ is an integer greater than or equal to 1, and $\tilde{X}_{Group}$ is an integer greater than or equal to 1.

In this design, $M_{Group}$, $\tilde{X}_{Group}$, and X may be agreed in a system or a protocol, or may be indicated by the network side to the terminal. For example, when the communications apparatus 400 is the network device, the sending unit 410 of the communications apparatus 100 may send third indication information to the terminal, the terminal receives the third indication information, and the third indication information may be used to indicate one or more of $\tilde{X}_{Group}$, $\tilde{X}_{Group}$, and X. For another example, when the communications apparatus is the terminal, the receiving unit 420 of the communications apparatus receives third indication information from the network device, and the third indication information may be used to indicate one or more of $\tilde{X}_{Group}$, $\tilde{X}_{Group}$, and X.

In some optional implementations, $W_f$ is one or a plurality of specific column vectors, a length of a column vector of $W_f$ may be $N_{RB}^0$, a length of a column vector of $W_1$ may be X, X is used to indicate a quantity of CSI-RS ports, and $N_{RB}^0$ is an integer greater than or equal to 1.

For example, $N_{RB}^0$ is related to a quantity of resource blocks (RBs) or a quantity of subbands of a CSI-RS transmission bandwidth. For example, $N_{RB}^0$ may be equal to the quantity of RBs or the quantity of subbands of the CSI-RS transmission bandwidth. This is relatively simple.

In some optional implementations, the terminal may feed back $W_1$ and $\tilde{W}_2$ to the network side. For example, the channel state information sent by the terminal to the network device may include feedback information, and the feedback information may be used to indicate $W_1$ and $\tilde{W}_2$. Compared with a conventional technology in which the terminal needs to feed back $W_1$, $\tilde{W}_2$, and $W_f$ to the network side, this reduces overheads.

For linear superposition coefficients corresponding to different selected receive antennas, the terminal may construct $\tilde{W}_2$ in different manners. For example, the terminal selects X linear superposition coefficients corresponding to all ports, that is, X ports, and the terminal may construct $\tilde{W}_2$ of $2\tilde{X}_{Group} * M_{Group}$ in ascending order (or descending order) of CSI-RS port numbers based on a rule of row first and column second (or column first and row second). It should be understood that one receive antenna corresponds to one $\tilde{W}_2$. Therefore, the feedback information may include $N_{Rx}$ $\tilde{W}_2$. $N_{Rx}$ is a quantity of receive antennas of the terminal. For another example, the terminal may construct a matrix of $X*N_{Rx}$ for the X linear superposition coefficients corresponding to different receive antennas, and perform SVD decomposition on the matrix. The terminal selects a linear superposition coefficient based on a value of a rank corresponding to a precoding matrix to be calculated, and constructs $\tilde{W}_2$ of $2\tilde{X}_{Group} * M_{Group}$ in a sequence from head to tail (or from tail to head) based on a rule of row first and column second (or column first and row second). Correspondingly, the feedback information may include R $\tilde{W}_2$. R is the value of the rank corresponding to the precoding matrix.

In a specific application scenario, in different polarization directions, quantities of ports selected by the terminal may be the same or different, and sequence numbers of the ports selected by the terminal may be the same or different. For example, the quantities of the ports selected by the terminals may be the same, and the sequence numbers of the selected ports are also the same. In this way, once a port in one polarization direction is determined, a port in another polarization direction is also determined. This implementation is relatively simple. For another example, in different polarization directions, quantities of ports selected by the terminal may be the same, and sequence numbers of the selected ports are different. A selected port is not limited, so that a port can be selected relatively freely, thereby improving system performance. For still another example, in different polarization directions, quantities of ports selected by the terminal are different, and sequence numbers of the selected ports are also different, so that a port can be selected more freely, thereby further improving system performance.

For the foregoing design 1, in different application scenarios, embodiments of this application provide several possible designs of W1, to obtain the CSI based on the angle and delay reciprocity of the uplink channel and the downlink channel.

For example, in different polarization directions, quantities of port groups selected by the terminal are the same, and sequence numbers of the selected port groups are the same. $W_1$ may satisfy the following formula:

$$W_1 = \begin{bmatrix} E_{\frac{X_{Group}}{2} \times L_{Group}} & 0 \\ 0 & E_{\frac{X_{Group}}{2} \times L_{Group}} \end{bmatrix}, \text{ where}$$

$$E_{\frac{X_{Group}}{2} \times L_{Group}} = \begin{bmatrix} e^{\left(\frac{X_{Group}}{2}\right)} & e^{\left(\frac{X_{Group}}{2}\right)} & \cdots & e^{\left(\frac{X_{Group}}{2}\right)} \\ \mod\left(m_1, \frac{X_{Group}}{2}\right) & \mod\left(m_2, \frac{X_{Group}}{2}\right) & & \mod\left(m_{L_{Group}-1}, \frac{X_{Group}}{2}\right) \end{bmatrix}.$$

$X_{Group}$ is a quantity of CSI-RS port groups, $\tilde{L}_{Group}$ is a quantity of CSI-RS port groups selected in one polarization direction, $$E_{\frac{X_{Group}}{2} \times \tilde{L}_{Group}}$$

is a matrix consisting of $$\begin{bmatrix} e^{\left(\frac{X_{Group}}{2}\right)} & e^{\left(\frac{X_{Group}}{2}\right)} \\ \mod\left(i, \frac{X_{Group}}{2}\right), & \mod\left(i, \frac{X_{Group}}{2}\right) \end{bmatrix}$$

is a vector whose length is $X_{Group}/2$, a $$\left(\mod\left(i, \frac{X_{Group}}{2}\right)\right)^{th}$$

element in elements included in the vector is 1 and other elements are 0, $i=m_1, m_2, \ldots, m_{\tilde{L}-1}$ and $i$ is an integer greater than or equal to 0.

CSI-RS port groups selected by the terminal may be discontinuous or continuous. As a variation of W1, $W_1$ may satisfy the following formula:

$$W_1 = \begin{bmatrix} E_{\frac{X_{Group}}{2} \times \tilde{L}_{Group}} & 0 \\ 0 & E_{\frac{X_{Group}}{2} \times \tilde{L}_{Group}} \end{bmatrix}, \text{ where}$$

$$E_{\frac{X_{Group}}{2} \times \tilde{L}_{Group}} =$$

$$\begin{bmatrix} e^{\left(\frac{X_{Group}}{2}\right)} & e^{\left(\frac{X_{Group}}{2}\right)} & \cdots & e^{\left(\frac{X_{Group}}{2}\right)} \\ \mod\left(m, \frac{X_{Group}}{2}\right) & \mod\left(m+1, \frac{X_{Group}}{2}\right) & \cdots & \mod\left(m+\tilde{L}_{Group}-1, \frac{X_{Group}}{2}\right) \end{bmatrix},$$

which indicates that the CSI-RS port groups selected by the terminal may be continuous.

For example, the quantities of the port groups selected by the terminal are the same, and the sequence numbers of the selected port groups are different. $W_1$ may satisfy the following formula:

$$W_1 = \begin{bmatrix} E_{\frac{X_{Group}}{2} \times \tilde{L}_{Group}} & 0 \\ 0 & \overline{E}_{\frac{X_{Group}}{2} \times \tilde{L}_{Group}} \end{bmatrix}, \text{ where}$$

$$E_{\frac{X_{Group}}{2} \times \tilde{L}_{Group}} =$$

$$\begin{bmatrix} e^{\left(\frac{X_{Group}}{2}\right)} & e^{\left(\frac{X_{Group}}{2}\right)} & \cdots & e^{\left(\frac{X_{Group}}{2}\right)} \\ \mod\left(m_1, \frac{X_{Group}}{2}\right) & \mod\left(m_2, \frac{X_{Group}}{2}\right) & \cdots & \mod\left(m_{\tilde{L}_{Group}-1}, \frac{X_{Group}}{2}\right) \end{bmatrix}$$

and $$\overline{E}_{\frac{X_{Group}}{2} \times \tilde{L}_{Group}} =$$

$$\begin{bmatrix} e^{\left(\frac{X_{Group}}{2}\right)} & e^{\left(\frac{X_{Group}}{2}\right)} & \cdots & e^{\left(\frac{X_{Group}}{2}\right)} \\ \mod\left(n_1, \frac{X_{Group}}{2}\right) & \mod\left(n_2, \frac{X_{Group}}{2}\right) & \cdots & \mod\left(n_{\tilde{L}_{Group}-1}, \frac{X_{Group}}{2}\right) \end{bmatrix}.$$

$X_{Group}$ is a quantity of CSI-RS port groups, and $L_{Group}$ is a quantity of CSI-RS port groups selected in one polarization direction.

$$E_{\frac{X_{Group}}{2} \times \tilde{L}_{Group}}$$

is a matrix consisting of $$\begin{bmatrix} e^{\left(\frac{X_{Group}}{2}\right)} & e^{\left(\frac{X_{Group}}{2}\right)} \\ \mod\left(i, \frac{X_{Group}}{2}\right), & \mod\left(i, \frac{X_{Group}}{2}\right) \end{bmatrix}$$

is a vector whose length is $X_{Group}/2$, a $$\left(\mod\left(i, \frac{X_{Group}}{2}\right)\right)^{th}$$

element in elements included in the vector is 1 and other elements are 0, $i=m_1, m_2, \ldots, m_{\tilde{L}_{Group}-1}$ and $i$ is an integer greater than or equal to 0.

$$\overline{E}_{\frac{X_{Group}}{2} \times \tilde{L}_{Group}}$$

is a matrix consisting of $$\left[\begin{array}{ccc} e^{\left(\frac{X_{Group}}{2}\right)} & & e^{\left(\frac{X_{Group}}{2}\right)} \\ \mod\left(i, \frac{X_{Group}}{2}\right), & & \mod\left(i, \frac{X_{Group}}{2}\right) \end{array}\right]$$

is a vector whose length is $X_{Group}/2$, a $$\left(\mod\left(i, \frac{X_{Group}}{2}\right)\right)^{th}$$

element in elements included in the vector is 1 and other elements are 0, $i=n_1, n_2, \ldots, n_{\tilde{L}_{Group}-1}$, and i is an integer greater than or equal to 0.

It should be understood that CSI-RS port groups selected by the terminal may be discontinuous or continuous. As a variation of W1, $W_1$ satisfies the following formula:

$$W_1 = \begin{bmatrix} E_{\frac{X_{Group}}{2} \times \tilde{L}_{Group}} & 0 \\ 0 & \overline{E}_{\frac{X_{Group}}{2} \times \tilde{L}_{Group}} \end{bmatrix}, \text{ where}$$

$$E_{\frac{X_{Group}}{2} \times \tilde{L}_{Group}} = $$

$$\left[\begin{array}{cccc} e^{\left(\frac{X_{Group}}{2}\right)} & e^{\left(\frac{X_{Group}}{2}\right)} & & e^{\left(\frac{X_{Group}}{2}\right)} \\ \mod\left(m, \frac{X_{Group}}{2}\right) & \mod\left(m, \frac{X_{Group}}{2}\right) & \cdots & \mod\left(m + \tilde{L}_{Group} - 1, \frac{X_{Group}}{2}\right) \end{array}\right],$$

and $$\overline{E}_{\frac{X_{Group}}{2} \times \tilde{L}_{Group}} =$$

$$\left[\begin{array}{cccc} e^{\left(\frac{X_{Group}}{2}\right)} & e^{\left(\frac{X_{Group}}{2}\right)} & & e^{\left(\frac{X_{Group}}{2}\right)} \\ \mod\left(n_1, \frac{X_{Group}}{2}\right) & \mod\left(n_2, \frac{X_{Group}}{2}\right) & \cdots & \mod\left(n + \tilde{L}_{Group} - 1, \frac{X_{Group}}{2}\right) \end{array}\right].$$

For example, in different polarization directions, quantities of port groups selected by the terminal are different, and sequence numbers of the selected port groups are different.

Dimensions of $W_1$ are $X_{Group}*L_{Group}$, $L_{Group} \leq X_{Group}$, $X_{Group}$ is used to indicate a quantity of CSI-RS port groups, and $L_{Group}$ is a quantity of selected CSI-RS port groups.

In a possible implementation, $W_1$ may be selected from a matrix. For example, W1 is a subset of $F_{X_{Group} \times X_{Group}}$, dimensions of $F_{X_{Group} \times X_{Group}}$, and the following formula is met:

$F_{X_{Group} \times X_{Group}} = [e^{(X_{Group})}_0 \ e^{(X_{Group})}_1 \ \ldots \ e^{(X_{Group})}_{(X_{Group}-1)}]$, where $e^{(X_{Group})}_i$ is a vector whose length is $X_{Group}$, an $i^{th}$ element in $F_{X_{Group} \times X_{Group}}$ is 1 and all remaining elements are 0, and $i=0, 1, \ldots, X_{Group}-1$.

It should be understood that CSI-RS port groups selected by the terminal may be discontinuous or continuous. As a variation of W1, $W_1$ satisfies the following formula:

$$W_1 = \left[ e^{(X_{Group})}_{\mod(m, X_{Group})}, \ldots, e^{(X_{Group})}_{\mod(m + (L_{Group}-1), X_{Group})} \right],$$

which indicates that the CSI-RS port groups selected by the terminal may be continuous.

For the foregoing design 2 and design 3, in different application scenarios, embodiments of this application provide several possible designs of W1, to obtain the CSI based on the angle and delay reciprocity of the uplink channel and the downlink channel.

For example, in different polarization directions, quantities of ports selected by the terminal are the same, and sequence numbers of the selected ports are the same. $W_1$ satisfies the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{ where}$$

$$E_{\frac{X}{2} \times \tilde{L}} = $$

$$\left[\begin{array}{cccc} e^{\left(\frac{X}{2}\right)} & e^{\left(\frac{X}{2}\right)} & \cdots & e^{\left(\frac{X}{2}\right)} \\ \mod\left(m_1, \frac{X}{2}\right) & \mod\left(m_2, \frac{X}{2}\right) & & \mod\left(m_{\tilde{L}-1}, \frac{X}{2}\right) \end{array}\right].$$

X is the quantity of CSI-RS ports, $\tilde{L}$ is a quantity of CSI-RS ports selected in one polarization direction, $$E_{\frac{X}{2} \times \tilde{L}}$$

is a matrix consisting of $$\left[\begin{array}{cc} e^{\left(\frac{X}{2}\right)} & e^{\left(\frac{X}{2}\right)} \\ \mod\left(i, \frac{X}{2}\right) & \mod\left(i, \frac{X}{2}\right) \end{array}\right],$$

is a vector whose length is X/2, a $$\left(\mod\left(i, \frac{X}{2}\right)\right)^{th}$$

element in elements included in the vector is 1 and other elements are 0, $i=m_1, m_2, \ldots, m_{\tilde{L}-1}$, and i is an integer greater than or equal to 0.

It should be understood that, X is a quantity, sent by the base station, of CSI-RS ports, $\tilde{L}$ is a quantity of CSI-RS ports selected by the terminal in one polarization direction, and the $$\left(\mod\left(i, \frac{X}{2}\right)\right)^{th}$$

element in $$e^{\left(\frac{X}{2}\right)}_{\mod\left(i, \frac{X}{2}\right)}$$

is 1, and may indicate to select a corresponding CSI-RS port.

In a specific application, CSI-RS ports selected by the terminal may be discontinuous or continuous. It should be understood that, as a variation of W1, $W_1$ satisfies the following formula:

$$W_1 = \begin{bmatrix} E_{\frac{X}{2} \times L} & 0 \\ 0 & E_{\frac{X}{2} \times L} \end{bmatrix}, \text{ where}$$

$$E_{\frac{X}{2} \times L} = \begin{bmatrix} e^{\left(\frac{X}{2}\right)}_{\mod\left(m, \frac{X}{2}\right)} & e^{\left(\frac{X}{2}\right)}_{\mod\left(m+1, \frac{X}{2}\right)} & \cdots & e^{\left(\frac{X}{2}\right)}_{\mod\left(\frac{m+}{L-1}, \frac{X}{2}\right)} \end{bmatrix},$$

which indicates that the CSI-RS ports selected by the terminal may be continuous.

For example, in different polarization directions, quantities of ports selected by the terminal are the same, and sequence numbers of the selected ports are different. $W_1$ satisfies the following formula:

$$W_1 = \begin{bmatrix} E_{\frac{X}{2} \times L} & 0 \\ 0 & \overline{E}_{\frac{X}{2} \times L} \end{bmatrix}, \text{ where}$$

$$E_{\frac{X}{2} \times L} = \begin{bmatrix} e^{\left(\frac{X}{2}\right)}_{\mod\left(m_1, \frac{X}{2}\right)} & e^{\left(\frac{X}{2}\right)}_{\mod\left(m_2, \frac{X}{2}\right)} & \cdots & e^{\left(\frac{X}{2}\right)}_{\mod\left(m_{L-1}, \frac{X}{2}\right)} \end{bmatrix},$$

$$\overline{E}_{\frac{X}{2} \times L} = \begin{bmatrix} e^{\left(\frac{X}{2}\right)}_{\mod\left(n_1, \frac{X}{2}\right)} & e^{\left(\frac{X}{2}\right)}_{\mod\left(n_2, \frac{X}{2}\right)} & \cdots & e^{\left(\frac{X}{2}\right)}_{\mod\left(n_{L-1}, \frac{X}{2}\right)} \end{bmatrix},$$

where X is the quantity of CSI-RS ports, and $\tilde{L}$ is a quantity of CSI-RS ports selected in one polarization direction;

$$E_{\frac{X}{2} \times L}$$

is a matrix consisting of $$e^{\left(\frac{X}{2}\right)}_{\mod\left(i, \frac{X}{2}\right)} \quad e^{\left(\frac{X}{2}\right)}_{\mod\left(i, \frac{X}{2}\right)},$$

is a vector whose length is X/2, a $$\left(\mod\left(i, \frac{X}{2}\right)\right)^{th}$$

element in elements included in the vector is 1 and other elements are 0, $i=m_1, m_2, \ldots, m_{\tilde{L}-1}$, and i is an integer greater than or equal to 0; and $$\overline{E}_{\frac{X}{2} \times L}$$

is a matrix consisting of $$e^{\left(\frac{X}{2}\right)}_{\mod\left(i, \frac{X}{2}\right)} \quad e^{\left(\frac{X}{2}\right)}_{\mod\left(i, \frac{X}{2}\right)},$$

is a vector whose length is X/2, a $$\left(\mod\left(i, \frac{X}{2}\right)\right)^{th}$$

element in elements included in the vector is 1 and other elements are 0, $i=n_1, n_2, \ldots n_{\tilde{L}-1}$, and i is an integer greater than or equal to 0.

Similarly, CSI-RS ports selected by the terminal may be discontinuous or continuous. It should be understood that, as a variation of W1, $W_1$ satisfies the following formula:

$$W_1 = \begin{bmatrix} E_{\frac{X}{2} \times L} & 0 \\ 0 & \overline{E}_{\frac{X}{2} \times L} \end{bmatrix}, \text{ where}$$

$$E_{\frac{X}{2} \times L} = \begin{bmatrix} e^{\left(\frac{X}{2}\right)}_{\mod\left(m, \frac{X}{2}\right)} & e^{\left(\frac{X}{2}\right)}_{\mod\left(m+1, \frac{X}{2}\right)} & \cdots & e^{\left(\frac{X}{2}\right)}_{\mod\left(\frac{m+}{L-1}, \frac{X}{2}\right)} \end{bmatrix},$$

and $$\overline{E}_{\frac{X}{2} \times \tilde{L}} = \begin{bmatrix} e^{\left(\frac{X}{2}\right)}_{\mod\left(n, \frac{X}{2}\right)} & e^{\left(\frac{X}{2}\right)}_{\mod\left(n+1, \frac{X}{2}\right)} & \cdots & e^{\left(\frac{X}{2}\right)}_{\mod\left(n+\tilde{L}-1, \frac{X}{2}\right)} \end{bmatrix}.$$

For another example, in different polarization directions, quantities of ports selected by the terminal are different, and sequence numbers of the selected ports are different. Dimensions of $W_1$ are X*L, L≤X, X is used to indicate the quantity of CSI-RS ports, and L is a quantity of selected CSI-RS ports.

In a possible implementation, $W_1$ may be implemented based on a matrix. For example, W1 is a subset of F, and F may be predefined in a system or agreed in a protocol. For example, dimensions of $F_{X \times X}$ are X*X, that is, $W_1$ selects L column vectors from X column vectors in $F_{X \times X}$, where L≤X. For example, $F_{X \times X} = [e^{(X)}_0 \ e^{(X)}_1 \ldots e^{(X)}_{(X-1)}]$. $e^{(X)}_i$ is a vector whose length is X, an $i^{th}$ element in $F_{X \times X}$ is 1 and all remaining elements are 0, and i=0, 1, . . . , X−1.

Similarly, CSI-RS ports selected by the terminal may be discontinuous or continuous. It should be understood that, $W_1$ may satisfy the following formula:

$W_1 = [e^{(X)}_{mod(m,X)}, \ldots, e^{(X)}_{mod(m+(L-1),X)}]$, which indicates that the CSI-RS ports selected by the terminal may be continuous.

In some possible implementations, the communications apparatus 400 can correspondingly implement behavior and functions of the terminal in the foregoing method embodiments. For example, the communications apparatus 400 may be a terminal, or may be a component (for example, a chip or a circuit) used in the terminal. The sending unit 410 and the receiving unit 420 may be configured to perform all receiving or sending operations performed by the terminal in the embodiment shown in FIG. 3, for example, S301 and S302 in the embodiment shown in FIG. 3, and/or configured to support another process of the technology described in this specification. The processing unit 430 is configured to perform all operations performed by the terminal except the receiving and sending operations in the embodiment shown in FIG. 3, and/or configured to support another process of the technology described in this specification.

In some embodiments, the receiving unit 420 is configured to receive first indication information from a network device. The first indication information is used to indicate a port selection matrix, the port selection matrix is used by the terminal to determine channel state information based on a second codebook, and the second codebook satisfies a formula W=$W_1 \tilde{W}_2$. W is the second codebook, $W_1$ is the port selection matrix, and $\tilde{W}_2$ is a linear superposition coefficient matrix.

The sending unit 410 is configured to send the channel state information to the network device.

In some possible implementations, the communications apparatus 400 can correspondingly implement behavior and functions of the network device in the foregoing method embodiments. For example, the communications apparatus 400 may be a network device, or may be a component (for example, a chip or a circuit) used in the network device. The sending unit 410 and the receiving unit 420 may be configured to perform all receiving or sending operations performed by the base station in the embodiment shown in FIG. 3, for example, S301 and S302 in the embodiment shown in FIG. 3, and/or configured to support another process of the technology described in this specification. The processing unit 430 is configured to perform all operations performed by the network device except the receiving and sending operations in the embodiment shown in FIG. 3, and/or configured to support another process of the technology described in this specification.

In some embodiments, the receiving unit 420 is configured to receive channel state information from a terminal. The channel state information includes first indication information, the first indication information is used to indicate a port selection matrix, the port selection matrix is used by the terminal to determine the channel state information based on a second codebook, and the second codebook satisfies a formula W=$W_1 \tilde{W}_2$. W is the second codebook, $W_1$ is the port selection matrix, and $\tilde{W}_2$ is a linear superposition coefficient matrix.

The processing unit 430 is configured to determine a precoding matrix based on the first indication information and the second codebook.

In some optional embodiments, dimensions of $W_1$ are X*L, L≤X, X is used to indicate the quantity of CSI-RS ports, and $\tilde{L}$ is a quantity of selected CSI-RS ports.

In a specific application scenario, in different polarization directions, quantities of ports selected by the terminal may be the same, and sequence numbers of the selected ports are also the same.

Alternatively, in different polarization directions, quantities of ports selected by the terminal may be the same, and sequence numbers of the selected ports are different.

Alternatively, in different polarization directions, quantities of ports selected by the terminal are different, and sequence numbers of the selected ports are also different.

Based on different application scenarios, embodiments of this application provide the following several possible designs of W1.

For example, in different polarization directions, quantities of ports selected by the terminal are the same, and sequence numbers of the selected ports are the same. $W_1$ satisfies the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{where}$$

$$E_{\frac{X}{2} \times \tilde{L}} = \begin{bmatrix} e^{(\frac{X}{2})}_{mod\left(m_1, \frac{X}{2}\right)} & e^{(\frac{X}{2})}_{mod\left(m_2, \frac{X}{2}\right)} & \ldots & e^{(\frac{X}{2})}_{mod\left(m_{\tilde{L}-1}, \frac{X}{2}\right)} \end{bmatrix}.$$

X is the quantity of CSI-RS ports, $\tilde{L}$ is a quantity of CSI-RS ports selected in one polarization direction, $E_{\frac{X}{2} \times \tilde{L}}$ is a matrix consisting of $e^{(\frac{X}{2})}_{mod\left(i, \frac{X}{2}\right)}, \quad e^{(\frac{X}{2})}_{mod\left(i, \frac{X}{2}\right)}$ is a vector whose length is X/2, a $\left(mod\left(i, \frac{X}{2}\right)\right)^{th}$ element in elements included in the vector is 1 and other elements are 0, i=$m_1, m_2, \ldots, m_{\tilde{L}-1}$, and i is an integer greater than or equal to 0.

X is a quantity, sent by the base station, of CSI-RS ports, $\tilde{L}$ is a quantity of CSI-RS ports selected by the terminal in one polarization direction, and the $\left(\bmod\left(i, \frac{X}{2}\right)\right)^{th}$ element in $e^{\left(\frac{X}{2}\right)}_{\bmod\left(i, \frac{X}{2}\right)}$ is 1, and may indicate to select a corresponding CSI-RS port.

Since the quantities of the ports are the same and the sequence numbers of the ports are the same, it may be considered that once a port in one polarization direction is selected, a port in another polarization direction is also selected. This implementation is relatively simple.

As a variation of W1, $W_1$ satisfies the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{where}$$

$$E_{\frac{X}{2} \times \tilde{L}} = \begin{bmatrix} e^{\left(\frac{X}{2}\right)}_{\bmod\left(m, \frac{X}{2}\right)} & e^{\left(\frac{X}{2}\right)}_{\bmod\left(m+1, \frac{X}{2}\right)} & \cdots & e^{\left(\frac{X}{2}\right)}_{\bmod\left(m+\tilde{L}-1, \frac{X}{2}\right)} \end{bmatrix},$$

which indicates that the CSI-RS ports selected by the terminal may be continuous.

For example, in different polarization directions, quantities of ports selected by the terminal are the same, and sequence numbers of the selected ports are different. $W_1$ satisfies the following formula:

$$W_1 = \begin{bmatrix} E_{\frac{X}{2} \times \tilde{L}} & 0 \\ 0 & E_{\frac{X}{2} \times \tilde{L}} \end{bmatrix}, \text{where}$$

$$E_{\frac{X}{2} \times \tilde{L}} = \begin{bmatrix} e^{\left(\frac{X}{2}\right)}_{\bmod\left(m_1, \frac{X}{2}\right)} & e^{\left(\frac{X}{2}\right)}_{\bmod\left(m_2, \frac{X}{2}\right)} & \cdots & e^{\left(\frac{X}{2}\right)}_{\bmod\left(m_{\tilde{L}-1}, \frac{X}{2}\right)} \end{bmatrix}, \text{and}$$

$$\overline{E}_{\frac{X}{2} \times \tilde{L}} = \begin{bmatrix} e^{\left(\frac{X}{2}\right)}_{\bmod\left(n_1, \frac{X}{2}\right)} & e^{\left(\frac{X}{2}\right)}_{\bmod\left(n_2, \frac{X}{2}\right)} & \cdots & e^{\left(\frac{X}{2}\right)}_{\bmod\left(n_{\tilde{L}-1}, \frac{X}{2}\right)} \end{bmatrix},$$

where X is the quantity of CSI-RS ports, and $\tilde{L}$ is a quantity of CSI-RS ports selected in one polarization direction;

$E_{\frac{X}{2} \times \tilde{L}}$ is a matrix consisting of $e^{\left(\frac{X}{2}\right)}_{\bmod\left(i, \frac{X}{2}\right)}, \quad e^{\left(\frac{X}{2}\right)}_{\bmod\left(i, \frac{X}{2}\right)}$ is a vector whose length is X/2, a $\left(\bmod\left(i, \frac{X}{2}\right)\right)^{th}$ element in elements included in the vector is 1 and other elements are 0, i=$m_1$, $m_2$, $m_{\tilde{L}-1}$, and i is an integer greater than or equal to 0; and $\overline{E}_{\frac{X}{2} \times \tilde{L}}$ is a matrix consisting of $e^{\left(\frac{X}{2}\right)}_{\bmod\left(i, \frac{X}{2}\right)}, \quad e^{\left(\frac{X}{2}\right)}_{\bmod\left(i, \frac{X}{2}\right)}$ is a vector whose length is X/2, a $\left(\bmod\left(i, \frac{X}{2}\right)\right)^{th}$ element in elements included in the vector is 1 and other elements are 0, i=$n_1$, $n_{\tilde{L}-1}$, and i is an integer greater than or equal to 0.

As a variation of W1, $W_1$ satisfies the following formula:

$$W_1 = \begin{bmatrix} E_{\frac{X}{2} \times \tilde{L}} & 0 \\ 0 & \overline{E}_{\frac{X}{2} \times \tilde{L}} \end{bmatrix}, \text{where}$$

$$E_{\frac{X}{2} \times \tilde{L}} = \begin{bmatrix} e^{\left(\frac{X}{2}\right)}_{\bmod\left(m, \frac{X}{2}\right)} & e^{\left(\frac{X}{2}\right)}_{\bmod\left(m+1, \frac{X}{2}\right)} & \cdots & e^{\left(\frac{X}{2}\right)}_{\bmod\left(m+\tilde{L}-1, \frac{X}{2}\right)} \end{bmatrix}, \text{and}$$

$$\overline{E}_{\frac{X}{2} \times \tilde{L}} = \begin{bmatrix} e^{\left(\frac{X}{2}\right)}_{\bmod\left(n, \frac{X}{2}\right)} & e^{\left(\frac{X}{2}\right)}_{\bmod\left(n+1, \frac{X}{2}\right)} & \cdots & e^{\left(\frac{X}{2}\right)}_{\bmod\left(n+\tilde{L}-1, \frac{X}{2}\right)} \end{bmatrix}.$$

In a possible implementation, in different polarization directions, quantities of ports selected by the terminal are different, and sequence numbers of the selected ports are different. $W_1$ may be selected from a matrix. For example, W1 is a subset of $F_{X \times X}$, dimensions of $F_{X \times X}$ are X*X and, $F_{X \times X} = [e^{(X)}_0 \ e^{(X)}_1 \ \ldots \ e^{(X)}_{(X-1)}]$. For example, $e^{(X)}_i$ is a vector whose length is X, an $i^{th}$ element in $F_{X \times X}$ is 1 and all remaining elements are 0, and i=0, 1, . . . , X−1.

As a variation of W1, $W_1$ satisfies the following formula:

$W_1 = [e_{mod(m,X)}^{(X)}, \ldots, e_{mod(m+(L-1),X)}^{(X)}]$, which indicates that the CSI-RS ports selected by the terminal may be continuous.

Figure 5:
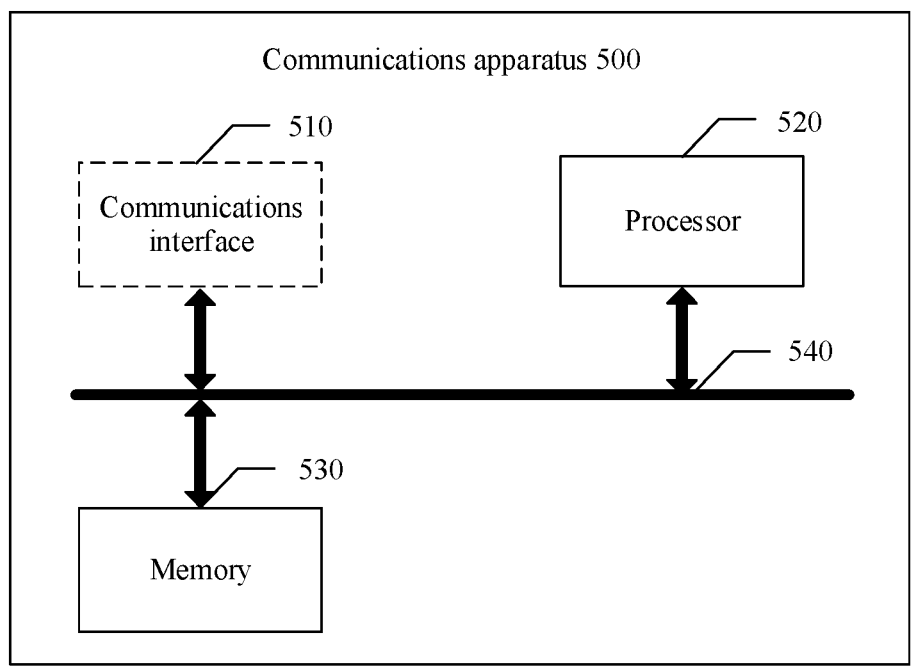
FIG. 5 is a schematic diagram of another structure of a communications apparatus according to an embodiment of this application.

FIG. 5 shows a communications apparatus 500 according to an embodiment of this application. The communications apparatus 500 may be a terminal, and may implement a function of the terminal in the methods provided in embodiments of this application. Alternatively, the communications apparatus 500 may be a network device, and may implement a function of the network device in the methods provided in embodiments of this application. Alternatively, the communications apparatus 500 may be an apparatus that may support a terminal in implementing a corresponding function in the methods provided in embodiments of this application, or may be an apparatus that may support a network device in implementing a corresponding function in the methods provided in embodiments of this application. The communications apparatus 500 may be a chip system. In embodiments of this application, the chip system may include a chip, or may include a chip and another discrete component.

In hardware implementation, the sending unit 410 and the receiving unit 420 may be a transceiver, and the transceiver is integrated into the communications apparatus 500 to form a communications interface 510.

The communications apparatus 500 includes at least one processor 520, configured to implement or support the communications apparatus 500 in implementing the function of the terminal or the network device in the methods provided in embodiments of this application. For details, refer to the detailed description in the method examples. Details are not described herein again.

The communications apparatus 500 may further include at least one memory 530, configured to store program instructions and/or data. The memory 530 is coupled to the processor 520. Coupling in embodiments of this application is indirect coupling or a communications connection between apparatuses, units, or modules, and may be in an electrical, mechanical, or another form, and is used for information exchange between the apparatuses, units, or modules. The processor 520 may cooperate with the memory 530. The processor 520 may execute the program instructions and/or the data stored in the memory 530, so that the communications apparatus 500 implements corresponding methods. At least one of the at least one memory may be included in the processor.

The communications apparatus 500 may further include the communications interface 510, configured to communicate with another device via a transmission medium, so that an apparatus in the communications apparatus 500 can communicate with the another device. For example, when the communications apparatus is an IAB node, the another device is a network device. Alternatively, when the communications apparatus is a network device, the another device is a terminal. The processor 520 may send and receive data through the communications interface 510. The communications interface 510 may be specifically a transceiver.

A specific connection medium between the communications interface 510, the processor 520, and the memory 530 is not limited in this embodiment of this application. In this embodiment of this application, the memory 530, the processor 520, and the communications interface 510 are connected through a bus 540 in FIG. 5. The bus is represented by a thick line in FIG. 5. A manner of connection between other components is merely an example for description, and is not limited thereto. Buses may be classified into an address bus, a data bus, a control bus, and the like. For ease of representation, only one thick line is used to represent the bus in FIG. 5, but this does not mean that there is only one bus or only one type of bus.

In embodiments of this application, the processor 520 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The methods disclosed with reference to embodiments of this application may be directly performed and completed by using a hardware processor, or may be performed and completed by using a combination of hardware and software modules in the processor.

In this embodiment of this application, the memory 530 may be a non-volatile memory such as a hard disk (HD) or a solid-state drive (SSD), or may be a volatile memory such as a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store program instructions and/or data.

Figure 6:
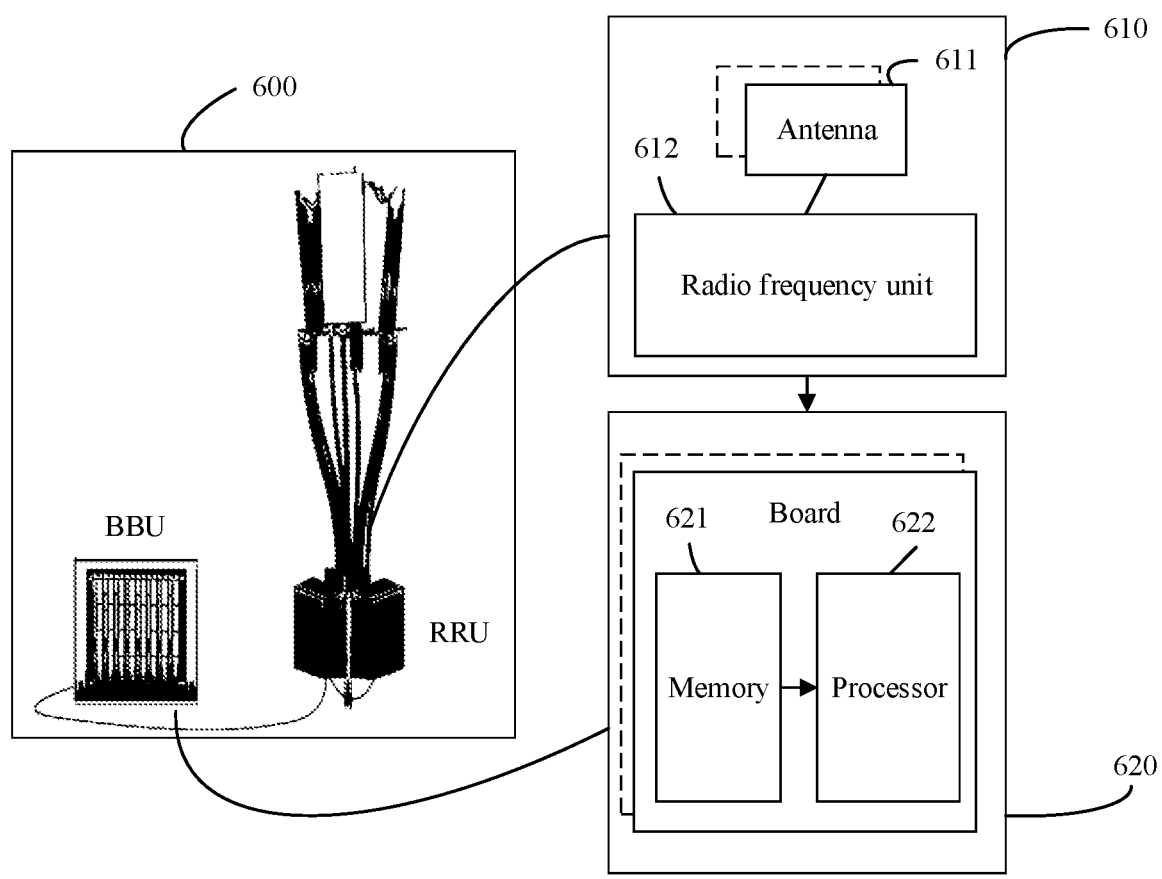
FIG. 6 is a schematic diagram of a structure of a communications apparatus according to an embodiment of this application.

FIG. 6 is a simplified schematic diagram of a structure of a communications apparatus. For ease of understanding and illustration, in FIG. 6, an example in which the communications apparatus is a network device, and the network device is a base station is used. The base station may be used in the system shown in FIG. 1, may be the network device in FIG. 1, and performs functions of the network device in the foregoing method embodiments. The network device 600 may include one or more radio frequency units, such as a remote radio unit (RRU) 610 and one or more baseband units (BBUs) (which may also be referred to as a digital unit (DU)) 620. The RRU 610 may be referred to as a communications module, and corresponds to the sending unit 410 and the receiving unit 420 in FIG. 4. Optionally, the communications module may also be referred to as a transceiver, a transceiver circuit, a transceiver, or the like, and may include at least one antenna 611 and a radio frequency unit 612. The RRU 610 is configured to: receive and send a radio frequency signal, and perform conversion between a radio frequency signal and a baseband signal. For example, the RRU 610 is configured to send indication information to a terminal device. The BBU 620 is configured to: perform baseband processing, control a base station, and the like. The RRU 610 and the BBU 620 may be physically disposed together, or may be physically disposed separately, that is, a distributed base station.

The BBU 620 is a control center of the base station, and may also be referred to as a processing module. The BBU 620 may correspond to the processing module 730 in FIG.

4, and is configured to implement a baseband processing function such as channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 620 may include one or more boards, and a plurality of boards may jointly support a radio access network (for example, an LTE network) in a single access standard, or may separately support radio access networks (for example, an LTE network, a 5G network, or another network) in different access standards. The BBU 620 further includes a memory 621 and a processor 622. The memory 621 is configured to store necessary instructions and data. The processor 622 is configured to control the base station to perform a necessary action, for example, configured to control the base station to execute the operation procedure related to the network device in the foregoing method embodiments. The memory 621 and the processor 622 may serve the one or more boards. In other words, a memory and a processor may be disposed on each board. Alternatively, a plurality of boards may share a same memory and a same processor. In addition, a necessary circuit may further be disposed on each board.

An embodiment of this application further provides a communications apparatus. The communications apparatus may be a terminal device, or may be a circuit. The communications apparatus may be configured to perform an action performed by the terminal device in the foregoing method embodiments.

Figure 7:
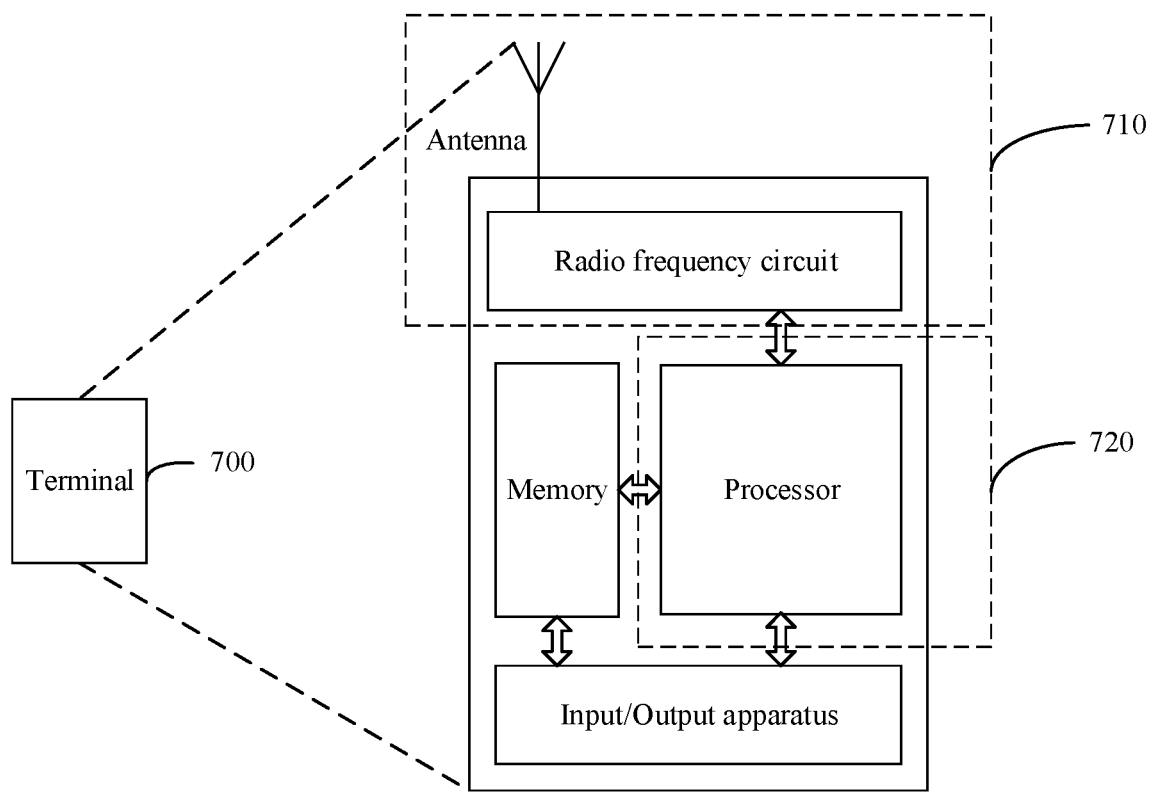
FIG. 7 is a schematic diagram of a structure of another communications apparatus according to an embodiment of this application.

FIG. 7 is a simplified schematic diagram of a structure of a terminal. For ease of understanding and illustration, in FIG. 7, a mobile phone is used as an example of the terminal device. As shown in FIG. 7, the terminal device includes a processor, a memory, a radio frequency circuit, an antenna, and an input/output apparatus. The processor is configured to: process a communications protocol and communications data, control the on-board unit, execute a software program, and process data of the software program. The memory is configured to store the software program and data. The radio frequency circuit is configured to perform conversion between a baseband signal and a radio frequency signal, and process the radio frequency signal. The antenna is configured to receive and send a radio frequency signal in a form of an electromagnetic wave. The input/output apparatus, for example, a touchscreen, a display, or a keyboard, is configured to: receive data entered by a user, and output data to the user. It should be noted that some types of devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 7 shows only one memory and one processor. In an actual device product, there may be one or more processors and one or more memories. The memory may also be referred to as a storage medium, a storage device, or the like. The memory may be independent of the processor, or may be integrated with the processor. This is not limited in embodiments of this application.

In this embodiment of this application, the antenna and the radio frequency circuit that have receiving and sending functions may be considered as a transceiver unit of the apparatus, and the processor having a processing function may be considered as a processing unit of the apparatus. As shown in FIG. 7, the apparatus may include a transceiver unit 710 and a processing unit 720. The transceiver unit 710 may also be referred to as a transceiver, a transceiver machine, a transceiver apparatus, or the like. The processing unit 720 may also be referred to as a processor, a processing board, a processing module, a processing apparatus, or the like. Optionally, a component that is in the transceiver unit 710 and that is configured to implement a receiving function may be considered as a receiving unit, and a component that is in the transceiver unit 710 and that is configured to implement a sending function may be considered as a sending unit. That is, the transceiver unit 710 includes the receiving unit and the sending unit. Sometimes, the transceiver unit 710 may also be referred to as a transceiver machine, a transceiver, a transceiver circuit, or the like. Sometimes, the receiving unit may also be referred to as a receiver machine, a receiver, a receiver circuit, or the like. The sending unit sometimes may also be referred to as a transmitter machine, a transmitter, a transmit circuit, or the like.

It should be understood that the transceiver unit 710 is configured to perform a sending operation and a receiving operation on a terminal device side in the foregoing method embodiments, and the processing unit 720 is configured to perform an operation other than the sending and receiving operations of the terminal device in the foregoing method embodiments.

For example, in an implementation, the transceiver unit 710 may be configured to perform S101 and S102 in the embodiment shown in FIG. 3, and/or configured to support another process of the technology described in this specification.

When the communications apparatus is a chip apparatus or circuit, the apparatus may include a transceiver unit and a processing unit. The transceiver unit may be an input/output circuit and/or a communications interface. The processing unit is an integrated processor, a microprocessor, or an integrated circuit.

Figure 8:
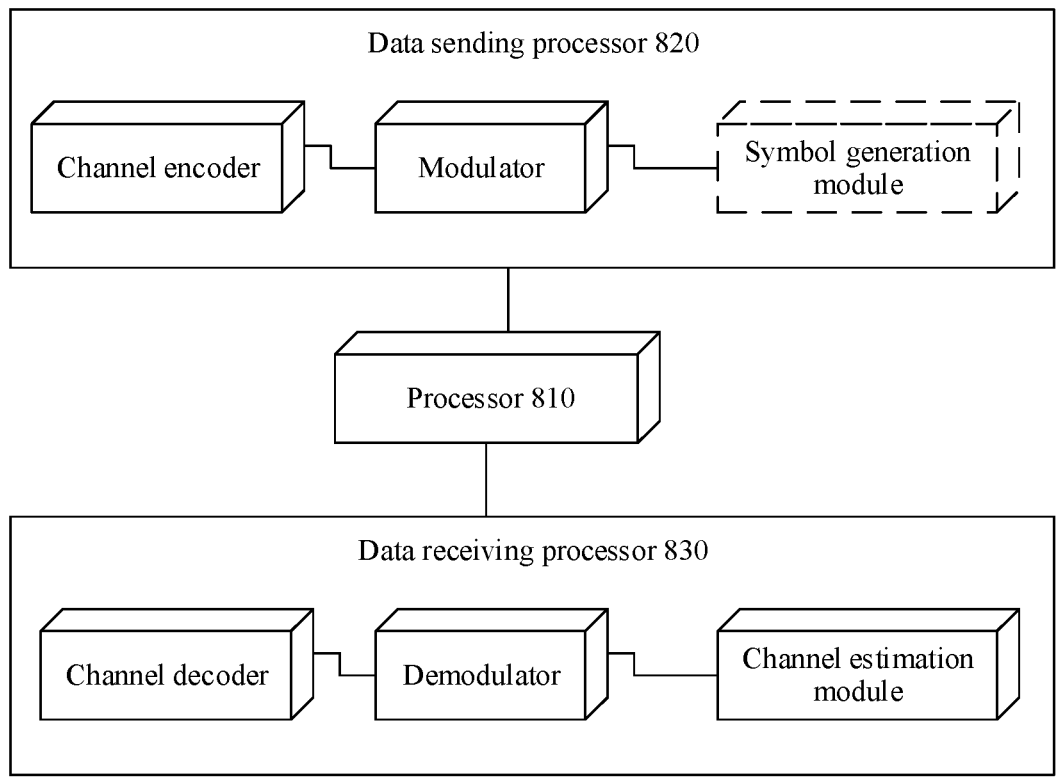
FIG. 8 is a schematic diagram of another structure of another communications apparatus according to an embodiment of this application.

In this embodiment, refer to an apparatus shown in FIG. 8. In an example, the apparatus may implement functions similar to those of the processing unit 430 in FIG. 4. In FIG. 8, the apparatus includes a processor 810, a data sending processor 820, and a data receiving processor 830. The processing unit 430 in the foregoing embodiment may be the processor 810 in FIG. 8, and completes a corresponding function. The processing unit 430 in the foregoing embodiment may be the data sending processor 820 and/or the data receiving processor 830 in FIG. 8. Although FIG. 8 shows a channel encoder and a channel decoder, but it may be understood that these modules do not constitute a limit to this embodiment, and are merely examples.

Figure 9:
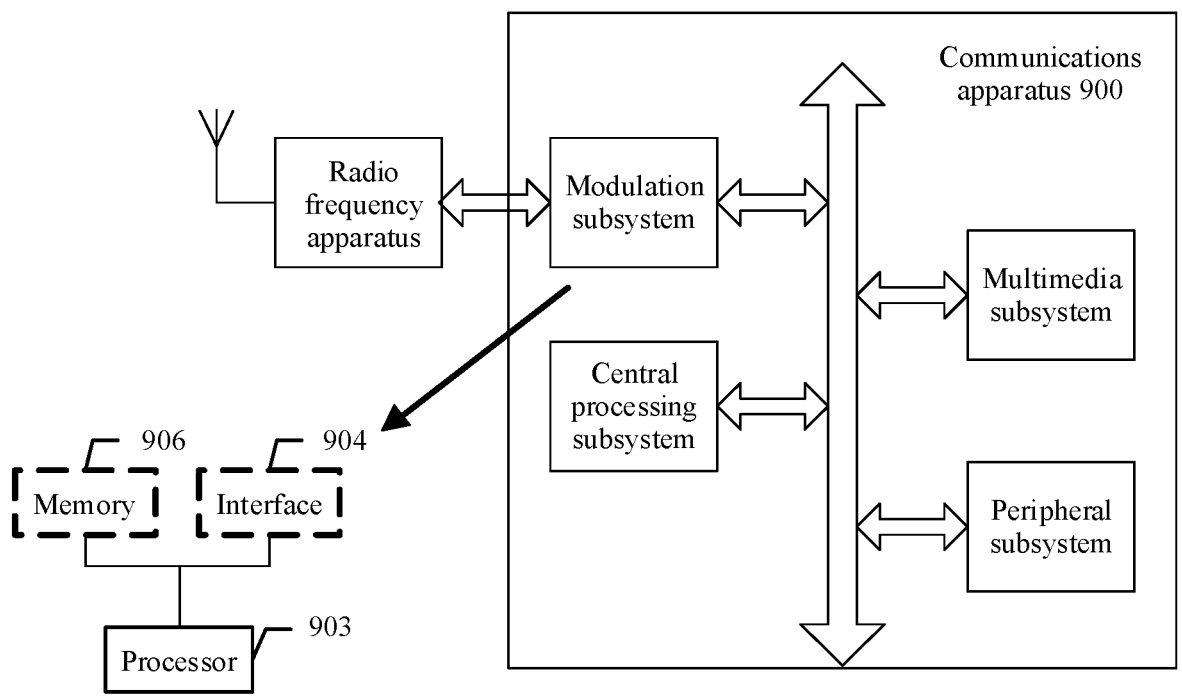
FIG. 9 is a schematic diagram of still another structure of another communications apparatus according to an embodiment of this application.

FIG. 9 shows another form of this embodiment. A communications apparatus 900 includes modules such as a modulation subsystem, a central processing subsystem, and a peripheral subsystem. The communications apparatus in this embodiment may be used as the modulation subsystem. Specifically, the modulation subsystem may include a processor 903 and an interface 904. The processor 903 completes functions of the foregoing processing unit 430, and the interface 904 completes functions of the foregoing sending unit 410 and receiving unit 420. In another variation, the modulation subsystem includes a memory 906, a processor 903, and a program that is stored in the memory 906 and that can be run on the processor. When executing the program, the processor 903 implements the methods performed by the terminal device in the foregoing method embodiments. It should be noted that the memory 906 may be nonvolatile or volatile. The memory 906 may be located in the modulation subsystem, or may be located in the processing apparatus 900, provided that the memory 906 can be connected to the processor 903.

An embodiment of this application further provides a communications system. Specifically, the communications system includes a base station and a terminal device, or may further include more base stations and more terminals. For example, the communications system includes a base station and a terminal that are configured to implement related functions in FIG. 2.

The base station is configured to implement related functions of the network part in FIG. 3. The terminal is configured to implement related functions of the terminal in FIG. 3. For details, refer to the related description in the method embodiments. Details are not described herein again.

An embodiment of this application further provides a computer-readable storage medium, including instructions. When the instructions are run on a computer, the computer is enabled to perform the method performed by the base station or the terminal in FIG. 3.

An embodiment of this application further provides a computer program product, including computer program code. When the computer program code is run on a computer, the computer is enabled to perform the method performed by the base station or the terminal in FIG. 3.

An embodiment of this application provides a chip system. The chip system includes a processor, may further include a memory, and is configured to implement functions of the base station and the terminal in the foregoing methods. The chip system may include a chip, or may include a chip and another discrete component.

It should be understood that the terms "system" and "network" may be used interchangeably in embodiments of this application. "At least one" means one or more, and "a plurality of" means two or more. The term "and/or" describes an association relationship between associated objects and represents that three relationships may exist. For example, A and/or B may represent the following three cases: Only A exists, both A and B exist, and only B exists. The A and the B may be singular or plural. The character "/" generally represents an "or" relationship between the associated objects. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first message and a second message are merely intended to distinguish between different messages, but do not indicate that the two messages are different in a priority, a sending sequence, or importance.

All or some of the methods in embodiments of this application may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It will be appreciated that a person skilled in the art can make various modifications and variations to this application without departing from the scope of this application. This application is intended to cover these modifications and variations provided that they fall within the scope of protection defined by the following claims and their equivalent technologies.

What is claimed is:

1. A communications method, comprising:
receiving, by a terminal, first indication information from a network device, wherein the first indication information indicates a type of a right multiplication matrix in a first codebook, wherein the first codebook satisfies a formula $W=W_1\tilde{W}_2W_f^H$, where W is the first codebook, $W_1$ is a port selection matrix, $\tilde{W}_2$ is a linear superposition coefficient matrix, $W_f^H$ is a conjugate transpose of $W_f$, and $W_f$ is the right multiplication matrix; and
determining, by the terminal, channel state information based on the first indication information.

2. The method according to claim 1, wherein the first indication information indicates that the type of the right multiplication matrix $W_f$ is a port selection matrix.

3. The method according to claim 1, wherein the first indication information indicates that the type of the right multiplication matrix $W_f$ is one specific column vector.

4. The method according to claim 3, wherein the one specific column vector is a column vector in which all elements are 1.

5. The method according to claim 1, wherein the first indication information indicates that the type of the right multiplication matrix $W_f$ is a discrete Fourier transform (DFT) matrix, and the DFT matrix comprises a column vector in which all elements are 1.

6. The method according to claim 5, wherein the first indication information further indicates the column vector in which all elements are 1.

7. The method according to claim 5, wherein the method further comprises:

receiving, by the terminal, second indication information from the network device, wherein the second indication information indicates the column vector in which all elements are 1.

8. The method according to claim 1, wherein $W_1$ is for selecting one or more channel state information reference signal (CSI-RS) port groups, and $W_f$ is for selecting one or more CSI-RS ports of the one or more CSI-RS port groups.

9. A communications apparatus, comprising:
at least one processor; and
one or more memories coupled to the at least one processor and storing programming instructions;
wherein the at least one processor is configured to execute the programming instructions to facilitate the following being performed by the communication apparatus:
receiving first indication information from a network device, wherein the first indication information indicates a type of a right multiplication matrix in a first codebook, wherein the first codebook satisfies a formula $W=W_1\tilde{W}_2W_f^H$, where W is the first codebook, $W_1$ is a port selection matrix, $\tilde{W}_2$ is a linear superposition coefficient matrix, $W_f^H$ is a conjugate transpose of $W_f$, and $W_f$ is the right multiplication matrix; and
determining channel state information based on the first indication information.

10. The communications apparatus according to claim 9, wherein the first indication information indicates that the type of the right multiplication matrix $W_f$ is a port selection matrix.

11. The communications apparatus according to claim 9, wherein the first indication information indicates that the type of the right multiplication matrix $W_f$ is one specific column vector.

12. The communications apparatus according to claim 11, wherein the one specific column vector is a column vector in which all elements are 1.

13. The communications apparatus according to claim 9, wherein the first indication information indicates that the type of the right multiplication matrix $W_f$ is a discrete Fourier transform (DFT) matrix, and the DFT matrix comprises a column vector in which all elements are 1.

14. The communications apparatus according to claim 13, wherein the first indication information further indicates the column vector in which all elements are 1.

15. The communications apparatus according to claim 13, wherein the at least one processor is further configured to execute the programming instructions to facilitate the following being performed by the communication apparatus:
receiving second indication information from the network device, wherein the second indication information indicates the column vector in which all elements are 1.

16. The communications apparatus according to claim 9, wherein $W_1$ is for selecting one or more channel state information reference signal (CSI-RS) port groups, and $W_f$ is for selecting one or more CSI-RS ports of the one or more CSI-RS port groups.

17. The communications apparatus according to claim 9, wherein the communications apparatus is a terminal device or a chip.

18. A non-transitory computer-readable storage medium having processor-executable instructions stored thereon, wherein the processor-executable instructions, when executed, facilitate performance of the following:
receiving first indication information from a network device, wherein the first indication information indicates a type of a right multiplication matrix in a first codebook, wherein the first codebook satisfies a formula $W=W_1\tilde{W}_2W_f^H$, where W is the first codebook, $W_1$ is a port selection matrix, $\tilde{W}_2$ is a linear superposition coefficient matrix, $W_f^H$ is a conjugate transpose of $W_f$, and $W_f$ is the right multiplication matrix; and
determining channel state information based on the first indication information.

19. The non-transitory computer-readable storage medium according to claim 18, wherein the first indication information indicates that the type of the right multiplication matrix $W_f$ is one specific column vector.

20. The non-transitory computer-readable storage medium according to claim 19, wherein the one specific column vector is a column vector in which all elements are 1.

21. The non-transitory computer-readable storage medium according to claim 18, wherein the first indication information indicates that the type of the right multiplication matrix $W_f$ is a discrete Fourier transform (DFT) matrix, and the DFT matrix comprises a column vector in which all elements are 1.

22. The non-transitory computer-readable storage medium according to claim 21, wherein the first indication information further indicates the column vector in which all elements are 1.

* * * * *